United States Patent
Tanioka et al.

(10) Patent No.: US 6,949,281 B1
(45) Date of Patent: Sep. 27, 2005

(54) VARNISH COMPOSITION AND LIQUID-CRYSTAL DISPLAY ELEMENT

(75) Inventors: Satoshi Tanioka, Chiba (JP); Kumiko Fukui, Chiba (JP); Shizuo Murata, Chiba (JP); Hiroshi Ono, Chiba (JP); Itsuo Shimizu, Chiba (JP)

(73) Assignee: Chisso Corporation, Osaka (JP)

( * ) Notice: Subject to any disclaimer, the term of this patent is extended or adjusted under 35 U.S.C. 154(b) by 255 days.

(21) Appl. No.: 10/018,540

(22) PCT Filed: Jun. 26, 2000

(86) PCT No.: PCT/JP00/04180

§ 371 (c)(1),
(2), (4) Date: Dec. 20, 2001

(87) PCT Pub. No.: WO01/00733

PCT Pub. Date: Jan. 4, 2001

(30) Foreign Application Priority Data

Jun. 25, 1999 (JP) .......................... 11/179949

(51) Int. Cl.$^7$ ............................... C09K 19/00
(52) U.S. Cl. ................... 428/125; 524/104; 252/299.01
(58) Field of Search ................ 428/1.1, 1.2, 1.25, 428/1.26, 1.27, 1.6, 1.28, 1.21; 299/299.01; 524/104, 106

(56) References Cited

U.S. PATENT DOCUMENTS 5,783,656 A * 7/1998 Kimura et al. .............. 528/353
5,907,005 A * 5/1999 Shimizu ..................... 524/104

FOREIGN PATENT DOCUMENTS

| JP | 7-286134 | 10/1995 |
| JP | 3-246515 | 9/1999 |
| JP | 11-264981 | 9/1999 |

* cited by examiner

Primary Examiner—Mark F. Huff
Assistant Examiner—Jennifer R. Sadula
(74) Attorney, Agent, or Firm—McDermott, Will & Emery

(57) ABSTRACT

An object of the present invention is to provide a varnish composition which can achieve totally and with good balance the improvement in various properties including electrical properties such as residual charge, a voltage holding ratio and image sticking, a pre-tilt angle, coating property, alignment property, and so on, which are desired for a liquid crystal aligning film formed. The varnish composition comprises polymer ingredients containing polyamic acid B represented by formula (1), polyamic acid A represented by formula (2) having a side chain of not less than 3 carbon atoms and N-substituted polyamide represented by formula (3), and a solvent for dissolving the polymer ingredients. The varnish composition contains 0.1 to 40% by weight of the polymer ingredients

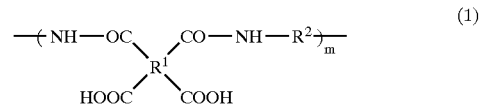

(1)

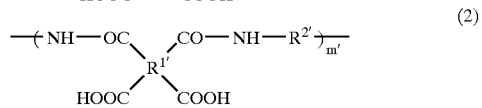

(2)

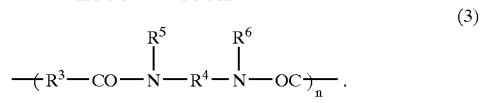

(3)

21 Claims, 3 Drawing Sheets

VARNISH COMPOSITION AND LIQUID-CRYSTAL DISPLAY ELEMENT

TECHNICAL FIELD

This invention relates to varnish compositions. More particularly, it relates to varnish compositions suitable as materials for the preparation of an insulating coat and a protective coat, etc. in the field of other electronic materials, including a liquid crystal aligning film for a liquid crystal display element.

BACKGROUND ART

In a liquid crystal display element, a display element using a nematic liquid crystal is now prevailing. Display elements by various systems are put in practical use, for example, a matrix TN element in which a liquid crystal molecule is twisted 90 degrees, a STN element in which a liquid crystal molecule is usually twisted 180 degrees or more, a TFT liquid crystal display element using a thin film transistor, and an IPS (In Plane Switching) mode liquid crystal display element having improved viewing angle properties. The progress of liquid crystal display elements is not limited to only these modes, but active efforts to improve peripheral materials have been made towards the improvement in characteristics of liquid crystal display elements.

A liquid crystal aligning film is one of important elements concerning the display quality of a liquid crystal display element, and its role becomes large as high quality of a display element is required.

Presently, mainly used materials for the liquid crystal aligning film are polyamic acid aligning agents used after imidization of polyamic acid, and soluble polyimide aligning agents. According to prior references, a variety of other high-molecular aligning films have been investigated. However, almost of them have not been put in practical use in light of heat resistance, chemical (liquid crystal) resistance, coating properties, electrical properties, display performance, alignment stability of liquid crystal molecule, etc.

In addition to polyimides, polyamides and other polyamides wherein H in an amide group (CONH) is substituted by other group have been investigated, but they have drawbacks in the alignment property, electrical properties of liquid crystal elements, etc. There are aligning agents containing polyamic acids and polyamides, but they have drawbacks in the image sticking, residual charge, voltage holding ratio, etc.

Thus, conventional liquid crystal aligning films have not fulfilled the required properties totally and with good balance.

BRIEF DESCRIPTION OF DRAWINGS

A more complete appreciation of the invention will be readily obtained as the same become better understood by reference to the following detailed description when considered in connection with the accompanying drawings, wherein.

DISCLOSURE OF INVENTION

An object of the present invention is to provide a varnish composition which can overcome the drawbacks of prior art as mentioned above and can achieve totally and with good balance the improvement in various properties including electrical properties such as residual charge, a voltage holding ratio and image sticking, a pre-tilt angle, coating property, alignment property, and so on, which are desired for a liquid crystal aligning film formed.

Some of the above-mentioned problems are further discussed. Regarding the electrical properties, an image sticking phenomenon poses especially a problem in a TFT liquid crystal display element, for which the solution is required in the first place.

In the TFT liquid crystal display element, there is a phenomenon wherein an image remains on the screen even after the voltage has been turned off after being once turned on, so-called "image sticking phenomenon". This phenomenon is considered due to the fact that an applied voltage accumulates a charge and the accumulated charge produces an image sticking, and an improvement in drawback of such image sticking has been required firstly.

As an evaluation method of image sticking, there is generally employed a method of evaluating the image sticking by the width of a hysteresis (difference of voltage) in the hysteresis curve of C-V curve (capacitance-voltage curve), as mentioned later. However, since the evaluation result by this method may not often correspond to the image sticking phenomenon of an actual display element, the present invention decided to perform further visual evaluation, in addition to evaluation with the above-mentioned C-V curve.

With regard to the electrical properties, there is a problem in voltage holding ratio, for which the solution is required.

Figure 3:
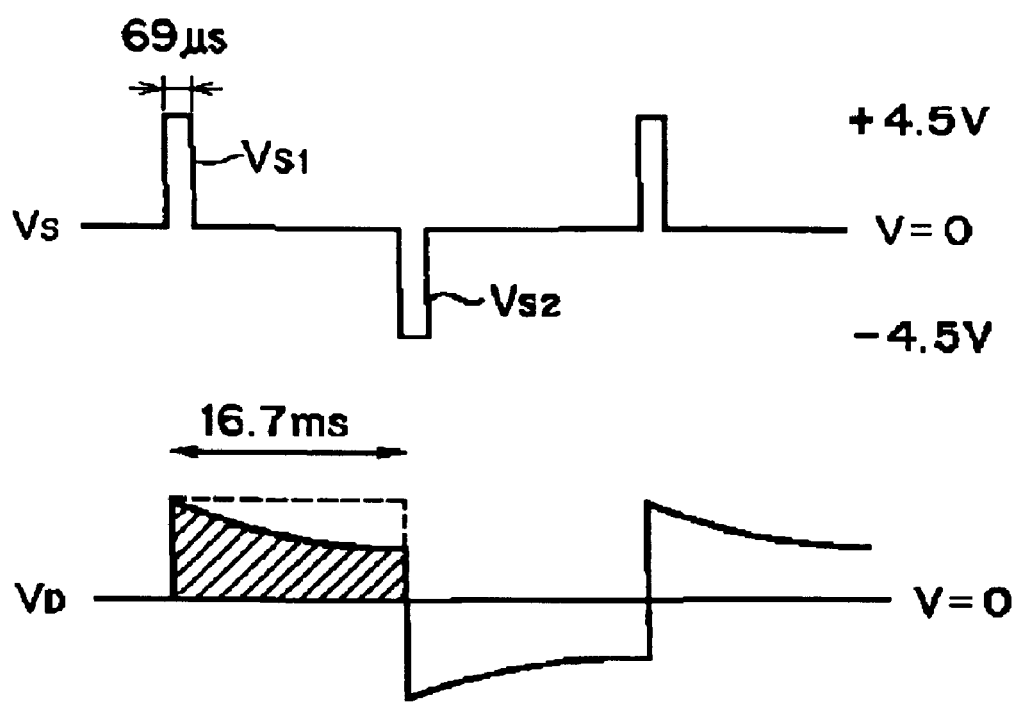
FIG. 3 is a diagram showing a square wave Vs of a gate pulse width 69 µs, a frequency of 60 Hz, an amplitude of ±4.5 V, and a wave form Vd read from an oscilloscope when Vs is applied to the source of the circuit shown in FIG. 2.

Although the image display is performed by applying voltage to a liquid crystal display element, application of this voltage is carried out by repeating a series of cycles including voltage application (ON), voltage OFF after a lapse of short time, short time application of reverse voltage after a lapse of a fixed time and voltage OFF after a lapse of short time, for example as shown in FIG. 3 of the drawings, which is not continuous application.

Although it is desirable to maintain the voltage at the time of voltage OFF in the same level as that at the time of voltage ON, in order to optimize the image display, this is actually impossible and a certain amount of voltage drop is not avoided. If this voltage drop is large, the reduction in the contrast of a display image will be caused especially in TN type TFT or an IPS element, and a problem will be increased.

Therefore, these disadvantages are required to remove by improving liquid crystal materials, structure of display elements and materials for aligning films, but it is not yet attained sufficiently.

In connection with the pre-tilt angle, there is also a problem of domain occurrence. Although the rising direction of a liquid crystal molecule needs to be the same direction within a liquid crystal display element, when the portion to which the rising direction becomes reverse exists, a stripe referred to as "domain" occurs in the boundary, and may deteriorate display properties. Since this problem is often due to excessively small pre-tilt angle of a liquid crystal molecule, it is desirable to provide a suitable pre-tilt angle with the liquid crystal molecule to solve the problem.

The pre-tilt angle is suitable in the order of 3 to 12 degrees, preferably 3 to 8 degrees for a TN type TFT element. Approximately 1 degree may be suitable for an IPS type element, since a liquid crystal molecule moves horizontally to a substrate and exceptionally large angle is not needed.

With regard to the coating properties of the composition, poor properties worsen the production yield of display element. Therefore, this is a serious problem before discussing the display characteristics of a display element.

To achieve the above-mentioned object, the present invention includes the following constructions.

(1) A varnish composition which comprises polymer ingredient containing polyamic acid B represented by formula (1), polyamic acid A represented by formula (2) having a side chain of not less than 3 carbon atoms and N-substituted polyamide represented by formula (3), and a solvent for dissolving the polymer ingredient, and then the varnish composition contains 0.1 to 40% by weight of the polymer ingredients.

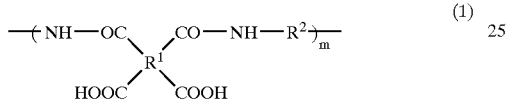

(1)

wherein $R^1$ is a tetravalent organic radical derived from tetracarboxylic acids, $R^2$ is a divalent organic radical derived from diamines, and m is a natural number.

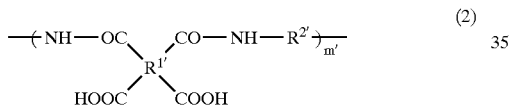

(2)

wherein $R^{1'}$ is a tetravalent organic radical derived from tetracarboxylic acids, $R^{2'}$ is a divalent organic radical derived from diamines, at least one of the tetravalent and divalent organic radicals has a side chain of not less than 3 carbon atoms, and m' is a natural number.

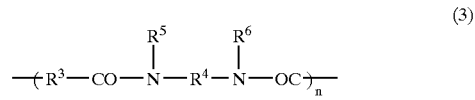

(3)

wherein $R^3$ is a divalent organic radical derived from dicarboxylic acids, $R^4$ is a divalent organic radical derived from diamines, $R^5$ and $R^6$ represent a monovalent organic radical or hydrogen, in which the percentage of the substitution of the monovalent organic radical is not less than 30% and said organic radical may be plural species, and n is a natural number.

(2) The varnish composition defined in item (1) wherein the polymer ingredient contains 10 to 99.8% by weight of the polyamic acid B represented by formula (1), and 0.2 to 90% by weight of the combination of the polyamic acid A represented by formula (2) and the N-substituted polyamide represented by formula (3), based on the total amount of polymer ingredient.

(3) The varnish composition defined in item (1) wherein the polymer ingredient contains the polyamic acid B repre-sented by formula (1) in the range of 40 to 98% by weight, the polyamic acid A represented by formula (2) and the N-substituted polyamide represented by formula (3), in the range of 1 to 59% by weight respectively, based on the total amount of polymer ingredient.

(4) The varnish composition defined in any one of items (1) to (3) wherein $R^1$ in the formula (1) contains as an essential component a tetravalent organic radical derived from alicyclic tetracarboxylic acids.

(5) The varnish composition defined in any one of items (1) to (3) wherein $R^1$ in the formula (1) contains 10 to 100 mole % of a tetravalent organic radical of alicyclic system, based on the total amount of the tetravalent organic radical $R^1$ derived from tetracarboxylic acids, and $R^2$ contains as a main component at least one of radicals represented by formula (4).

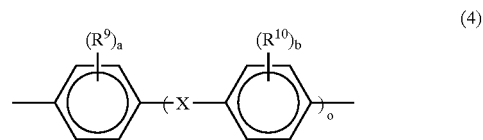

(4)

wherein X represents a single bond, $CH_2$, $CH_2CH_2$, $CH_2CH_2CH_2$, $CH_2CH_2CH_2CH_2$, or $C(CH_3)_2$, $R^9$ and $R^{10}$ each independently represent hydrogen or a lower alkyl group, a and b are individually 1 to 2, and o is 0 to 3, provided that when o is 2 to 3, each X may be the same or different from each other.

(6) The varnish composition defined in any one of items (1) to (3) wherein $R^1$ in formula (1) contains 10 to 100 mole % of a tetravalent radical derived from cyclobutanetetracarboxylic acids, based on the total amount of the tetravalent organic radical $R^1$ derived from tetracarboxylic acids, and $R^2$ contains as a main component at least one of radicals selected from a divalent radical derived from 4,4'-diaminodiphenyl methane, 4,4'-diaminodiphenylethane, 1,4-bis[2-(4-aminophenyl)ethyl]benzene, 1,4-bis(4-aminophenylmethyl)benzene, 1,3-bis[4-(4-aminophenylmethyl)phenyl]propane, or bis[4-(4-aminophenylmethyl)phenyl]methane.

(7) The varnish composition defined in any one of items (1) to (6) wherein $R^{1'}$ in formula (2) contains as an essential component a tetravalent organic radical derived from aromatic or/and alicyclic or/and aliphatic tetracarboxylic acids.

(8) The varnish composition defined in item (7) wherein $R^{2'}$ in formula (2) is a divalent organic radical having a side chain group of not less than 3 carbon atoms and the content of the radical is 1 to 100 mole % based on the total amount of the divalent organic radical in $R^{2'}$ (9) The varnish composition defined in any one of items (1) to (6) wherein $R^{1'}$ in formula (2) contains as an essential component a tetravalent organic radical derived from pyromellitic acid or/and a cyclobutanetetracarboxylic acid, and $R^{2'}$ contains 1 to 100 mole % of at least one of divalent organic radicals represented by formulas (5-1) to (5-4), (6), (7), or (8) and 99 to 0 mole % of at least one of divalent organic radicals represented by formula (4), based on the total amount of the divalent organic radical in $R^{2'}$.

(5-1)

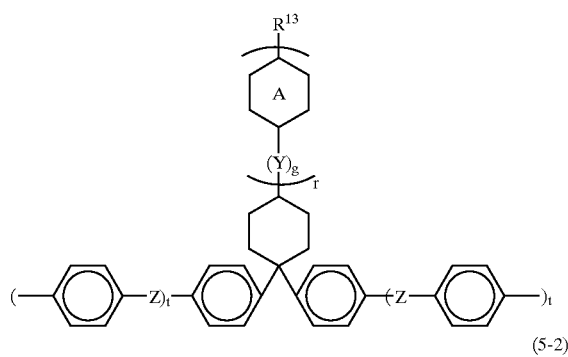

(5-2)

(5-3)

(5-4)

wherein $R^{13}$, $R^{25}$ and $R^{26}$ each independently represent hydrogen or an alkyl group of 1 to 12 carbon atoms, Y represents a single bond or $CH_2$, ring A represents a benzene ring or a cyclohexane ring, Z represents a single bond, $CH_2$, $CH_2CH_2$, or oxygen, r is a positive number of 0 to 3, s is a positive number of 0 to 5, and t is a positive number of 0 to 3, provided that when t is 2 to 3, each Z may be the same or different from each other. Further, a hydrogen on any benzene or cyclohexane ring may be replaced by a lower alkyl group. The steroid skeleton in formulas (5-2) and (5-3) may be the one wherein any ring is reduced, enlarged or cleaved, the one wherein it contains a three-membered ring, the one wherein an unsaturated bond in any position is increased or a decreased, or the one wherein a hydrogen or an alkyl group in any position may be replaced by any monovalent organic group.

(6)

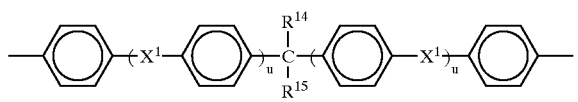

wherein $X^1$ represents a single bond, $CH_2$, $CH_2CH_2$, or oxygen, $R^{14}$ and $R^{15}$ each independently represent hydrogen, an alkyl group or a perfluoroalkyl group of 1 to 12 carbon atoms, at least one of them represents an alkyl group or a perfluoroalkyl group of not less than 3 carbon atoms, and u is 0 to 3, provided that when u is 2 to 3, each $X^1$ may be the same or different from each other. Further, a hydrogen on any benzene ring may be replaced by a lower alkyl group.

(7)

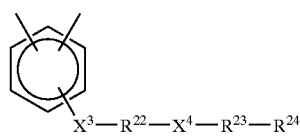

wherein $X^3$ and $X^4$ each independently represent a single bond, O, COO, OCO, NH, CONH, or $(CH_2)_n$, $R^{22}$ and $R^{23}$ each independently represent a single bond, a group of 1 to 3 rings having an aromatic ring or/and an alicyclic ring (When $R^{22}$ or/and $R^{23}$ have 2 or 3 rings, these rings may be bonded with $X^3$ and $X^4$) or a steroid group, $R^{24}$ represents hydrogen, fluorine, hydrocarbon group, fluorinated hydrocarbon group, an alkoxy group, a cyano group or OH group, and n is a positive number of 1 to 5.

(8)

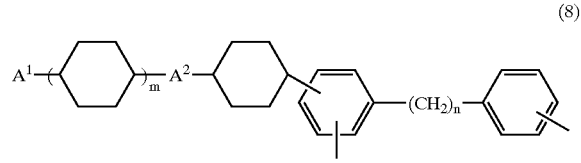

wherein $A^1$ is hydrogen or a straight or branched-chain alkyl group of 1 to 12 carbon atoms in which one methylene or any non-adjacent methylene may be replaced by oxygen, $A^2$ is a single bond or an alkylene group of 1 to 5 carbon atoms in which one methylene or any non-adjacent methylene may be replaced by oxygen, m is 0 to 3, and n is 1 to 5.

(4)

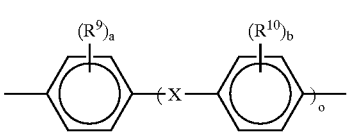

wherein X represents a single bond, $CH_2$, $CH_2CH_2$, $CH_2CH_2CH_2$, $CH_2CH_2CH_2CH_2$, or $C(CH_3)_2$, $R^9$ and $R^{10}$ each independently represent hydrogen or a lower alkyl group, a and b are 1 to 2 respectively, and o is 0 to 3, provided that when o is 2 to 3, each X may be the same or different from each other.

(10) The varnish composition defined in any one of items (1) to (9) wherein $R^3$ in formula (3) contains as a main component a divalent organic radical derived from aromatic or/and alicyclic or/and aliphatic dicarboxylic acids, $R^4$ contains as a main component a divalent organic radical derived from aromatic or/and alicyclic or/and aliphatic diamines, $R^5$ and $R^6$ represent a monovalent organic radical or hydrogen in which a percentage of the substitution of the monovalent organic radical is not less than 50%, the organic radical may be plural species, and at least one of $R^3$, $R^4$, $R^5$, or $R^6$ is a radical having a side chain group of not less than 3 carbon atoms, and n is a natural number.

(11) The varnish composition defined in item (10) wherein $R^4$ in formula (3) is a diamine radical having a side chain group of not less than 3 carbon atoms, the content of which is 1 to 100 mole % based on the total amount of the diamine radicals $R^4$, and $R^5$ and $R^6$ represent the monovalent organic radical, the percentage of the substitution of which is not less than 70%.

(12) The varnish composition defined in any one of items (1) to (9) wherein $R^3$ in formula (3) contains as a main component at least one of divalent organic radicals derived from a dicarboxylic acid selected from terephthalic acid, isoterephthalic acid, 1,4-cyclohexanedicarboxylic acid, 4,4'-biphenyldicarboxylic acid, 4,4'-diphenylmethanedicarboxylic acid, 4,4'-diphenylethanedicarboxylic acid, 4,4'-diphenylpropanedicarboxylic acid, 4,4'-diphenylhexafluoropropanedicarboxylic acid, 2,2-bis(phenyl) propanedicarboxylic acid, 4,4'-terphenyldicarboxylic acid, 2,6-naphthalenedicarboxylic acid, or 2,5-pyridinedicarboxylic acid, $R^4$ contains 1 to 100 mole % of at least one of divalent organic radicals represented by formulas (5-1) to (5-4), (6), (7), or (8) and 99 to 0 mole % of at least one of divalent organic radicals represented by formula (4), based on the total amount of the divalent organic radical $R^4$, and $R^5$ and $R^6$ contain at least one of monovalent organic radicals selected from a lower alkyl group, phenyl, benzyl, cyclohexyl, cyclohexylmethyl, naphthyl, or 9-anthrylmethyl, the percentage of the substitution of which is not less than 80%.

(5-1)

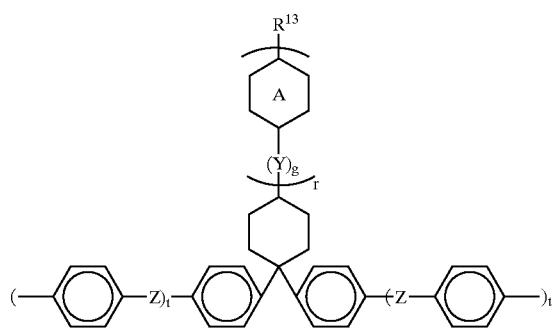

-continued (5-2)

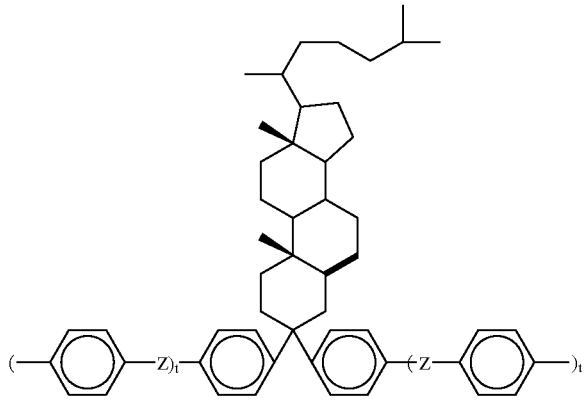

(5-3)

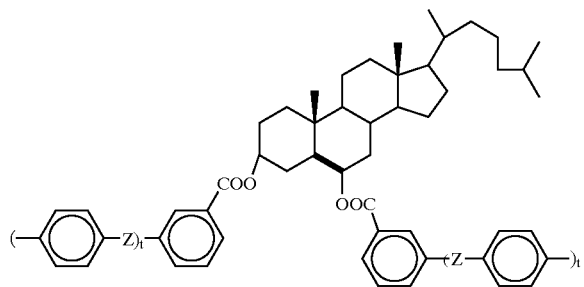

(5-4)

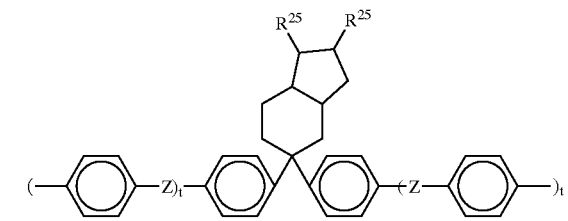

wherein $R^{13}$, $R^{25}$ and $R^{26}$ each independently represent hydrogen or an alkyl group of 1 to 12 carbon atoms, Y represents a single bond or $CH_2$, ring A represents a benzene ring or a cyclohexane ring, Z represents a single bond, $CH_2$, $CH_2CH_2$, or oxygen, r is a positive number of 0 to 3, s is a positive number of 0 to 5, t is a positive number of 0 to 3, provided that when t is 2 to 3, each Z may be the same or different from each other. Further, a hydrogen atom on any benzene or cyclohexane ring may be replaced by a lower alkyl group. The steroid skeleton in formulas (5-2) and (5-3) may be the one wherein any ring is reduced, enlarged or cleaved, the one wherein it contains a three-membered ring, the one wherein an unsaturated bond in any position is increased or decreased or the one wherein a hydrogen or an alkyl group in any position may be replaced by any monovalent organic group.

(6)

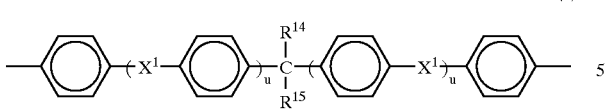

wherein $X^1$ represents a single bond, $CH_2$, $CH_2CH_2$ or oxygen, $R^{14}$ and $R^{15}$ each independently represent hydrogen, an alkyl group or a perfluoroalkyl group of 1 to 12 carbon atoms in which at least one of them represents an alkyl group or a perfluoroalkyl group of not less than 3 carbon atoms, and u is 0 to 3, provided that when u is 2 to 3, each $X^1$ may be the same or different from each other. Further, hydrogen on any benzene ring may be replaced by a lower alkyl group.

(7)

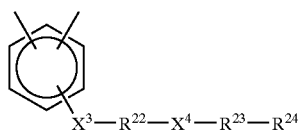

wherein $X^3$ and $X^4$ each independently represent a single bond, O, COO, OCO, NH, CONH, or $(CH_2)_n$, $R^{22}$ and $R^{23}$ each independently represent a single bond, a group of 1 to 3 rings having an aromatic ring or/and an alicyclic ring (When $R^{22}$ or/and $R^{23}$ have 2 or 3 rings, these rings may be bonded with $X^3$ and $X^4$) or a steroid group, $R^{24}$ represents hydrogen, fluorine, hydrocarbon group, fluorinated hydrocarbon group, an alkoxy group, a cyano group or OH group, and n is a positive number of 1 to 5.

(8)

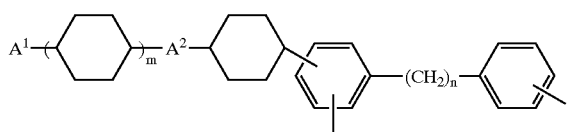

wherein $A^1$ is hydrogen or a straight- or branched-chain alkyl group of 1 to 12 carbon atoms in which a methylene or any non-adjacent methylene may be replaced by oxygen, $A^2$ is a single bond or an alkylene group of 1 to 5 carbon atoms in which a methylene or any non-adjacent methylene may be replaced by oxygen, m is 0 to 3 and n is 1 to 5.

(4)

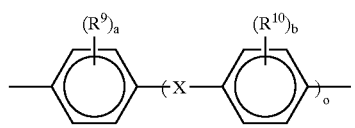

wherein X represents a single bond, $CH_2$, $CH_2CH_2$, $CH_2CH_2CH_2$, $CH_2CH_2CH_2CH_2$ or $C(CH_3)_2$, $R^9$ and $R^{10}$ each independently represent hydrogen or a lower alkyl group, a and b are individually 1 to 2, and o is 0 to 3, provided that when o is 2 to 3, each X may be the same or different from each other.

(13) A varnish composition for a liquid crystal aligning film defined in any one of items (1) to (12).
(14) A liquid crystal display element using a varnish composition defined in item (13).
(15) A liquid crystal display element wherein a liquid crystal composition containing at least one of liquid crystalline compounds represented by formulas (9), (10) and (11) is applied to the liquid crystal display element defined in item (14).

(9)

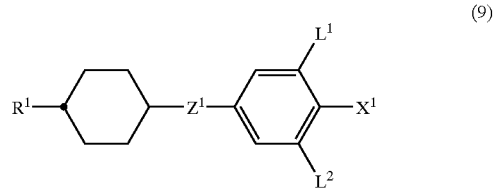

(10)

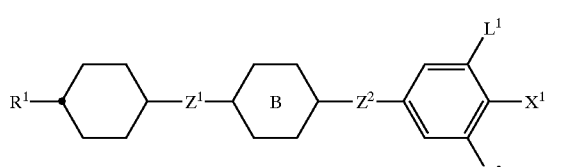

(11)

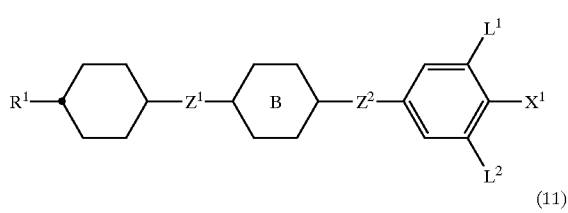

wherein $R^1$ represents an alkyl group of 1 to 10 carbon atoms in which any non-adjacent methylene may be replaced by —O— or —CH=CH— in which any hydrogen may be replaced by fluorine; $X^1$ represents fluorine, chlorine, —$OCF_3$, —$OCF_2H$, —$CF_3$, —$CF_2H$, —$CFH_2$, —$OCF_2CF_2H$, or —$OCF_2CFHCF_3$; $L^1$ and $L^2$ each independently represent hydrogen or fluorine; $Z^1$ and $Z^2$ each independently represent 1,2-ethylene, 1,4-butylene, —COO—, —$CF_2O$—, —$OCF_2$—, —CH=CH—, or a single bond; ring B represents trans-1,4-cyclohexylene, 1,3-dioxane-2,5-diyl or 1,4-phenylene in which hydrogen may be replaced by fluorine; ring C represents trans-1,4-cyclohexylene or 1,4-phenylene in which hydrogen may be replaced by fluorine.
(16) A liquid crystal display element wherein a liquid crystal composition containing at least one of liquid crystalline compounds represented by formulas (12) and (13) is applied to the liquid crystal display element defined in item (14).

(12)

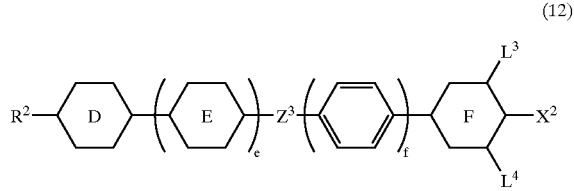

(13)

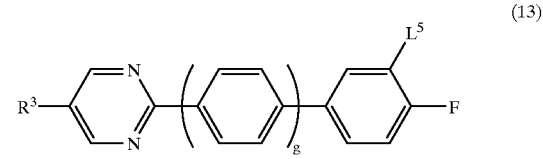

wherein $R^2$ and $R^3$ each independently represent an alkyl group of 1 to 10 carbon atoms in which any non-adjacent methylene may be replaced by —O— or —CH=CH— in which any hydrogen may be replaced by fluorine; $x^2$ represents —CN or —C≡C—CN; ring D represents trans-1,4- cyclohexylene, 1,4-phenylene, 1,3-dioxane-2,5-diyl, or pyrimidine-2,5-diyl; ring E represents trans-1,4-cyclohexylene, pyrimidine-2,5-diyl or 1,4-phenylene in which hydrogen may be replaced by fluorine; ring F represents tran-1,4-cyclohexylene or 1,4-phenylene, $Z^3$ represents 1,2-ethylene, —COO— or a single bond; $L^3$, $L^4$ and $L^5$ each independently represent hydrogen or fluorine; e, f and g each independently represent 0 or 1.

(17) A liquid crystal display wherein a liquid crystal composition containing at least one of liquid crystalline compounds represented by formulas (14), (15) and (16) is applied to the liquid crystal display element defined in item (14).

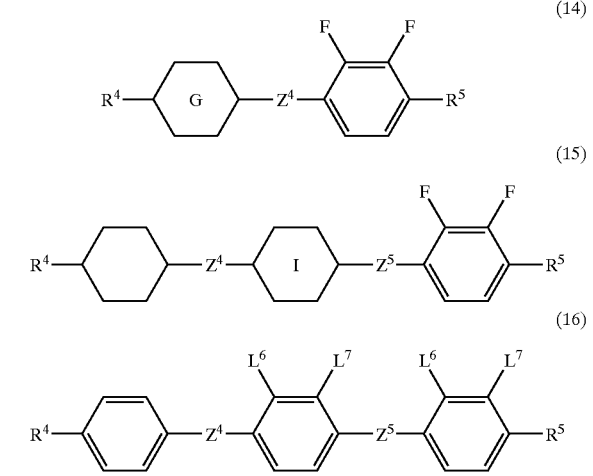

wherein $R^4$ and $R^5$ each independently represent an alkyl group of 1 to 10 carbon atoms in which any non-adjacent methylene may be replaced by —O— or —CH=CH— and any hydrogen may be replaced by fluorine; rings G and I each independently represent trans-1,4-cyclohexylene or 1,4-phenylene; $L^6$ and $L^7$ each independently represent hydrogen or fluorine, but does not represent hydrogen at the same time; $Z^4$ and $Z^5$ each independently represent 1,2-ethylene, —COO— or a single bond.

(18) A liquid crystal display element wherein a liquid crystal composition containing as a first component at least one of liquid crystalline compounds represented by formulas (9), (10) and (11) and as a second component at least one of liquid crystalline compounds represented by formulas (17), (18) and (19) is applied to the liquid crystal display element defined in item (14).

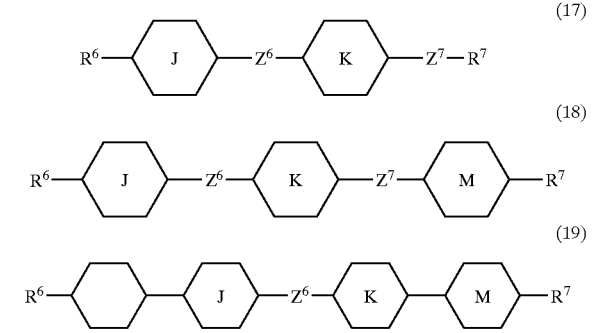

wherein $R^6$ and $R^7$ each independently represent an alkyl group of 1 to 10 carbon atoms in which any non-adjacent methylene may be replaced by —O— or —CH=CH— and any hydrogen may be replaced by fluorine; ring J, ring K and ring M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH—, or a single bond.

(19) A liquid crystal display element wherein a liquid crystal composition containing as a first component at least one of liquid crystalline compounds represented by formulas (12) and (13) defined in item (16) and as a second component at least one of liquid crystalline compounds represented by formulas (17), (18) and (19) defined in item (18) is applied to the liquid crystal display element defined in item (14).

(20) A liquid crystal display element wherein a liquid crystal composition containing as a first component at least one of liquid crystalline compounds represented by formulas (14), (15) and (16) defined in item (17) and as a second component at least one of liquid crystalline compounds represented by formulas (17), (18) and (19) defined in item (18) is applied to the liquid crystal display element defined in item (14).

(21) A liquid crystal display element wherein a liquid crystal composition containing as a first component at least one of liquid crystalline compounds represented by formulas (9), (10) and (11) defined in item (15), as a second component at least one of liquid crystalline compounds represented by formulas (12) and (13) defined in item (16), and as a third component at least one of liquid crystalline compounds represented by formulas (17), (18) and (19) defined in item (18) is applied to the liquid crystal display element defined in item (14).

(22) The liquid crystal display element defined in any one of items (15) to (21) wherein the liquid crystal composition further contains an optically active compound.

BEST MODE FOR CARRYING OUT THE INVENTION

In the varnish composition of the present invention, the polyamic acid B represented by formula (1) which is one of the polymer ingredients is preferably the component having no side chain group of not less than 3 carbon atoms in the polymer ingredient. If the polyamic acid B is an ingredient having a side chain group of not less than 3 carbon atoms like other polymers, the effect of the present invention is difficult to be obtained in electrical properties of the mixed system, which is not preferable.

In the polyamic acid B, $R^1$ represents the tetravalent organic radical derived from tetracarboxylic acids or tetracarboxylic acid dianhydrides which are sometimes called generically "tetracarboxylic acids". This $R_1$, is selected broadly from tetravalent organic radicals of known tetracarboxylic acids, but preferably is that which contains as an essential component a tetravalent organic radical derived from alicyclic tetracarboxylic acids in an amount of not less than 10 mole %.

For the aligning agent for TFT element, a combined use of tetravalent organic radicals derived from alicyclic tetracarboxylic acids and aromatic tetracarboxylic acids is particularly preferable, since it produces the effect of more improving display characteristics of liquid crystal display element (for example, more reduced residual charge and image sticking, and increased voltage holding ratio). In this case, the proportion of the alicyclic system to the aromatic system is suitably in the range of 10/90 mole % to 90/10 mole %, more preferably 70/30 mole % to 10/90 mole %.

For the aligning agent for STN element, a combined use of tetravalent organic radicals derived from alicyclic tetracarboxylic acids and aliphatic tetracarboxylic acids is particularly preferable, since it can achieve the effect of reducing an electric current of the element and improving the reliability. In this case, the proportion of the alicyclic tetracarboxylic acids to the aliphatic tetracarboxylic acids is preferably in the range of 10/90 to 90/10, more preferably 70/30 to 30/70.

For tetracarboxylic acids providing $R^1$, generally known acids are extensively suitable in such sense.

Of these, examples of alicyclic tetracarboxylic acids can include cyclobutane tetracarboxylic dianhydride, cyclopentane tetracarboxylic dianhydride, bicycloheptane tetracarboxylic dianhydride, bicyclo[2,2,2]octo-7-ene-2,3,5,6-tetracarboxylic dianhydride, cyclohexane-1,2,5,6-tetracarboxylic dianhydride, 3,4-dicarboxy-1,2,3,4-tetrahydronaphthalene-1-succinic dianhydride, 3,3'-bicyclohexyl-1,1', 2,2'-tetracarboxylic dianhydride, 2,3,5-tricarboxycyclopentylacetic dianhydride, 5-(2,5-dioxotetrahydrofural)-3-methyl-3-cyclohexene-1,2-dicarboxylic dianhydride, 1,3,3a,4,5,9b-hexahydro-5-tetrahydro-2,5-dioxo-3-furanyl)-naphtho[1,2-c]-furan-1,3-dione, 3,5,6-tricarboxynorbornane-2-acetic dianhydride, 2,3,4,5-tetrahydrofuran tetracarboxylic dianhydride, tetracyclo[6.2.1$^{1,3}$. 0$^{2,7}$]dodecane-4,5,9,10-tetracarboxylic dianhydride, and these compounds partially substituted with a lower alkyl group such as a methyl group and/or an ethyl group. Particularly preferable are cyclobutane tetracarboxylic dianhydride, cyclopentane tetracarboxylic dianhydride and cyclohexane tetracarboxylic dianhydride.

Examples of aromatic tetracarboxylic acids include pyromellitic dianhydride, 3,3', 4,4'-diphenyltetracarboxylic dianhydride, 3,3', 4,4'-benzophenonetetracarboxylic dianhydride, naphthalic dianhydrides (2,3,6,7-naphthalic dianhydride, etc.), 3,3'-4,4'-diphenylsulfonetetracarboxylic dianhydride, 3,3', 4,4'-diphenylether tetracarboxylic dianhydride, 3,3', 4,4'-dimethyldiphenylsilane tetracarboxylic dianhydride, 4,4'-bis(3,4-dicarboxyphenoxy) diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3', 4,4'-perfluoropropyridenediphthalic dianhydride, 3,3', 4,4'-biphenyltetracarboxylic dianhydride, bis(phthalic) phenylsulfine oxide dianhydride, p-phenylene-bis (triphenylphthalic)dianhydride, m-phenylene-bis (triphenylphthalic)dianhydride, bis(triphenylphthalic)-4,4'-diphenylether dianhydride, and bis(triphenylphthalic)-4,4'-diphenylmethane dianhydride. Particularly preferable are acid dianhydrides consisting of a phenyl group such as pyromellitic dianhydride, biphenyltetracarboxylic dianhydride and terphenyltetracarboxylic dianhydride, and tetracarboxylic dianhydrides consisting of a phenyl group and an aliphatic group such as 2,2-diphenylpropane tetracarboxylic dianhydride. These preferred compounds are those with the structure not containing oxygen and sulfur atoms which may have an adverse effect on the electrical properties of liquid crystal element.

Examples of aliphatic tetracarboxylic acids used in combination with alicyclic tetracarboxylic acids can include ethane tetracarboxylic acid dianhydrides, butane tetracarboxylic acid dianhydrides or the like.

Combining pyromellitic acid dianhydride which is a suitable example of the aromatic system with cyclobutane tetracarboxylic acid dianhydride which is a suitable example of the alicyclic tetracarboxylic acid can obtain $R^1$ derived from tetracarboxylic acids which is most typical constitution in the present invention, which can constitute $R^1$ in the polyamic acid B component especially suitable for an aligning agent for TFT. Further, combining butane tetracarboxylic acid dianhydride which is one of suitable examples of the aliphatic system with cyclobutane tetracarboxylic acid dianhydride can constitute $R^1$ in the polyamic acid B component especially suitable for an aligning agent for STN.

$R^2$ in the formula (1) represents a divalent organic radical derived from diamines, examples of diamines providing such divalent organic radicals can include aromatic diamines such as 4,4'-diaminodiphenylether, 4,4'-diaminodiphenylsulfide, 4,4'-diaminodiphenylsulfone, 4,4'-diaminobiphenyl, 3,3'-dimethoxybenzidine, 4,4'-diaminobenzanilide, 1,5-diaminonaphthalene, 3,3'-diaminobenzophenone, 3,4,'-diaminobenzophenone, 4,4'-diaminobenzophenone, 1,4-bis(4-aminophenoxy)benzene, 1,3-bis(4-aminophenoxy)benzene, 2,2-bis(4-aminophenoxy)propane, 2,2-bis[4-(4-aminophenoxy) phenyl]propane, bis[4-(4-aminophenoxy)phenyl]sulfone, bis[4-(4-aminophenoxy)phenyl]sulfide, bis[4-(4-aminophenoxy)phenyl]methane, 2,7-diaminofluorene, 9,9-bis(4-aminophenyl)fluorene, 9,10-bis(4-aminophenyl) anthracene, 4,4'-(1,4-phenylenediisopropylidene)bisaniline, 4,4'-(1,3-phenylenediisopropylidene)bisaniline, p-xylylenediamine, m-xylylenediamine; aliphatic diamines such as ethylenediamine, propylenediamine, tetramethylenediamine, pentamethylenediamine, hexamethylenediamine, heptamethylenediamine, octamethylenediamine, nonamethylenediamine, and heptamethylenediamine; alicyclic diamines such as 1,4-diaminocyclohexane, 1,3-diaminocyclobutane, 1,4-bis (aminomethyl)cyclohexane, 4,4'-diaminodicyclohexylmethane, 4,4'-diaminodicyclohexylethane isophoronediamine, norbornanediamine, tetrahydrodicyclopentadienylenediamine, hexahydro-4,7-methanoindanylenedimethylenediamine, and tricyclo [6.2.1.0$^{2,7}$]-undecylenedimethyldiamine; and heterocyclic diamines such as 2,3-diaminopyridine, 2,6-diaminopyridine, 3,4-diaminopyridine, 2,4-diaminopyridine, diaminopyridine, and diaminopiperazine; and the like.

Diamines providing $R^2$ in the divalent organic radical are extensively selected from known diamine compounds, but they are preferably divalent organic radicals derived from diamines containing singly an aromatic structure unit such as phenyl group or containing in combination an aromatic structure unit and an aliphatic structure unit (also containing an alicyclic system), or a divalent organic radical derived from diamines containing an alicyclic structure unit and an aliphatic (linear) structure unit, furthermore with the structure containing no oxygen such as ester and ether groups which tends to cause the lowering in electrical properties of liquid crystal display element.

Typical diamines providing such divalent organic radical can include those represented by formula (20).

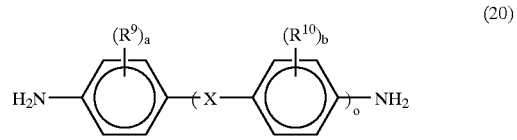

wherein X represents a single bond, $CH_2$, $CH_2CH_2$, $CH_2CH_2CH_2$, $CH_2CH_2CH_2CH_2$ or $C(CH_3)_2$, $R^9$ and $R^{10}$ each independently represent hydrogen or a lower alkyl group, preferably methyl, a and b are individually 1 to 2, o is 0 to 3, provided that when o is 2 to 3, each X may be the same or different form each other.

Specific examples of diamines represented by formula (20) are recited below, part of which is also included in the above-listed diamines.

Compounds wherein o is 0:
p-phenylenediamine, m-phenylenediamine, o-phenylenediamine Compounds wherein o is 1: 4,4'-diaminobiphenyl, 4,4'-diaminodiphenylmethane, 4,4'-diaminodiphenylethane, 3,3'-dimethylbenzidine, 1,3-bis(4-aminophenyl)propane, 2,2-bis(4-aminophenyl)propane, bis(4-amino-3-methylphenyl)methane, bis(4-amino-2-methylphenyl)methane, 1,2-bis(4-amino-3-methylphenyl)ethane, 1,3-bis(4-amino-3-methylphenyl)propane, 1,2-bis(4-amino-2-methylphenyl)ethane, 1,3-bis(4-amino-2-methylphenyl)propane, etc.

Compounds wherein o is 2:
1,4-bis(4-aminophenyl)benzene, 1,4-bis[(4-aminophenyl)methyl]benzene, 1,4-bis[(3-aminophenyl)methyl]benzene, 1,4-bis[(4-aminophenyl)ethyl]benzene, 1,4-bis[(3-aminophenyl)ethyl]benzene, 1,4-bis[(4-amino-3-methyl-phenyl)methyl]benzene, 1,4-bis[(4-amino-3-methyl-phenyl)ethyl]benzene, etc.

Compounds wherein o is 3:
4,4'-(4-aminophenyl)biphenyl, bis[(4-(4-aminophenylmethyl)phenyl]methane, bis[(4-(4-aminophenylmethyl)phenyl]ethane, bis[(4-(3-aminophenylmethyl)phenyl]methane, bis[(4-(3-aminophenylmethyl)phenyl]ethane, 2,2-bis[(4-{4-aminophenylmethyl)phenyl]propane, 2,2-bis[(4-{3-aminophenylmethyl)phenyl)propane, etc.

The polymer of formula (1) is prepared by reacting the above-mentioned tetracarboxylic acids and diamines as starting materials. In this reaction, in addition to the above starting materials, there can be used together monocarboxylic acid anhydrides and/or monoamine compounds to form a reaction end in the polyamic acid, and aminosilicon and diaminosilicon compounds, diaminosiloxane compounds, etc. which are effective for improving an adhesion of the resulting liquid crystal aligning film to a substrate.

Specific examples of such aminosilicon compounds can include p-aminophenyltrimethoxysilane, p-aminophenyltriethoxysilane, m-aminophenyltrimethoxysilane, m-aminophenyltriethoxysilane, aminopropyltrimethoxysilane, and aminopropyltriethoxysilane, etc. Specific examples of diaminosilicon compounds can include 1,3-bis(3-aminopropyl)-1,1,3,3-tetraphenyldisiloxane, 1,3-bis(3-aminopropyl)-1,1,3,3-tetramethyldisiloxane, and 1,3-bis(4-aminobutyl)-1,1,3,3-tetramethyldisiloxane, etc. These compounds can be used also in the polyamic acid A and N-substituted polyamides which will be mentioned later.

As one of other polymer ingredients, the polyamic acid A represented by formula (2) is used. $R^{1'}$ in the formula (2) is the radicals of tetracarboxylic acids and these radicals preferably contain as an essential component the aromatic or/and alicyclic radicals, but they may be used in combination with a radical derived from aliphatic (linear) tetracarboxylic acids.

Since the aliphatic (linear) component may be harmful to the alignment property of liquid crystal, its combined use should be made in the amount of the range which does not cause trouble to the alignment property of liquid crystal.

Preferably, these radicals of tetracarboxylic acids have the structure containing no oxygen or sulfur atom in the skeleton. However, they may have the structure containing these atoms, since its influence is little so far as the amount of polyamic acid A incorporated is not dominant.

Thus, tetracarboxylic acids providing $R^{1'}$ are compounds broader in the range of selection than tetracarboxylic acids providing $R^{1}$, specific examples of which are substantially identical with those of tetracarboxylic acids providing $R^{1}$ as recited above.

Since polyamic acid A is required to have a function giving a pre-tilt angle to the liquid crystal, it is necessary to provide a side chain group of not less than 3 carbon atoms with at least the above-mentioned $R^{1'}$ or the after-mentioned $R^{2'}$ Examples of the side chain group can include the group of the structure represented by the following formula (21).

$$-X^3-R^{22}-X^4-R^{23}-R^{24} \quad (21)$$

wherein $X^3$ and $X^4$ each independently represent a single bond, O, COO, OCO, NH, CONH, or $(CH_2)_n$, $R^{22}$ and $R^{23}$ each independently represent a single bond, a group of 1 to 3 rings having an aromatic ring or/and an alicyclic ring (when $R^{22}$ or/and $R^{23}$ have 2 or 3 rings, these rings may be linked with $X^3$ or $X^4$) or a steroid group, $R^{24}$ represents hydrogen, fluorine, hydrocarbon group, fluorohydrocarbon group, an alkoxy group, a cyano group or OH group, n is a positive number of 1 to 5.

Examples of steroid skeletons in the steroid group can include choresteryl, androsteryl, β-choresteryl, epiandrosteryl, erygosteryl, estryl, 11α-hydroxymethylsteryl, 11α-progesteryl, lanosteryl, melatolanyl, methyltestorosteryl, norethisteryl, pregnenonyl, β-sitosteryl, stigmasteryl, testosteryl, cholesterol acetic esters or the like.

Diamines providing $R^{2'}$ may be identical with diamines providing the above-mentioned $R^2$ when $R^{1'}$ is the radical of tetracarboxylic acids having a side chain group of not less than 3 carbon atoms. They may be used in combination with diamines having a side chain group of not less than 3 carbon atoms.

On the other hand, when $R^{1'}$ is the radical of tetracarboxylic acids having no side chain group of not less than 3 carbon atoms, it is necessary that diamines providing $R^{2'}$ are those having a side chain group of not less than 3 carbon atoms. Although the side chain group refer to likewise the group represented by the formula (21), specific diamines can include those which have an aliphatic hydrocarbon, a hydrocarbon containing an alicyclic structure, a hydrocarbon containing an aromatic structure, a group having a siloxane group, a group having a steroid skeleton, respectively having a group of not less than 3 carbon atoms in a side chain, or their combined side chain groups.

Part of these hydrocarbons may be replaced by other atoms such as oxygen, but it is preferable that they do not contain an oxygen or sulfur atom such as O, CO, COO, S, $SO_2$, etc. The alicyclic hydrocarbon group and aromatic hydrocarbon group may have a substituent such as alkyl, alkoxy, halogen, OH, etc.

$R^{2'}$ may be used in combination with the radical having no side chain group, in addition to such radical having a side chain group. Especially, it is preferable to use $R^{2'}$ in combination with at least one of diamines composed of only the aromatic ring such as by the formula (20), or both the aromatic ring and aliphatic system (including alicyclic system) in light of the electrical and display properties of liquid crystal display elements.

Specific examples of diamines providing $R^{2'}$ having a side chain group can include diamine compounds represented by the following formulas (22-1) to (22-4), (23), (24) and (25).

(22-1)
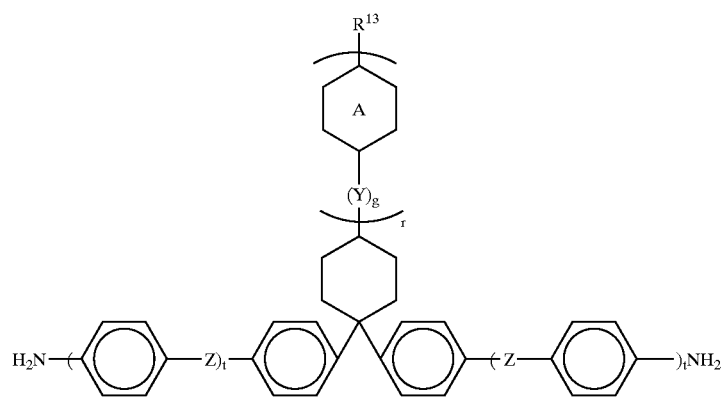
(22-2)
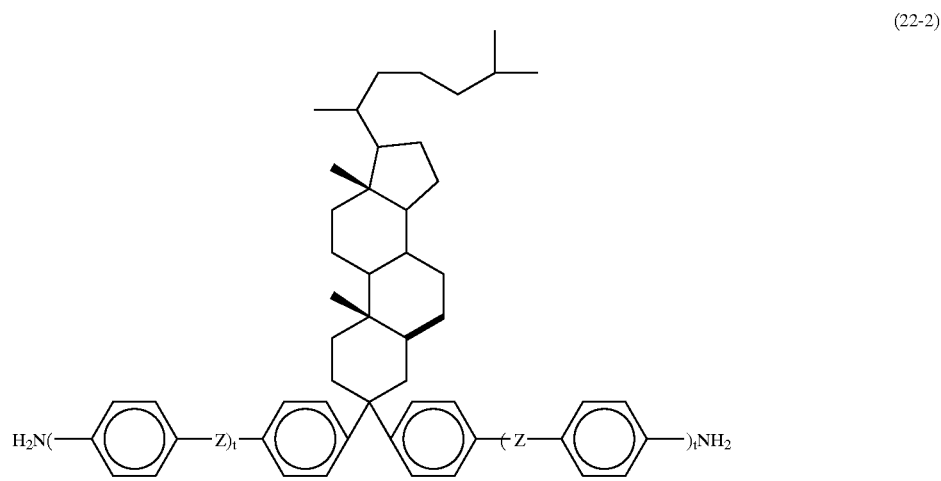
(22-3)
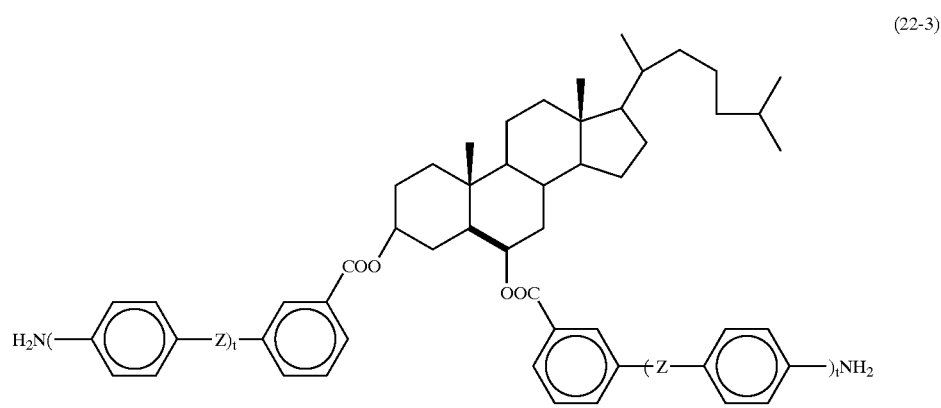
(22-4)
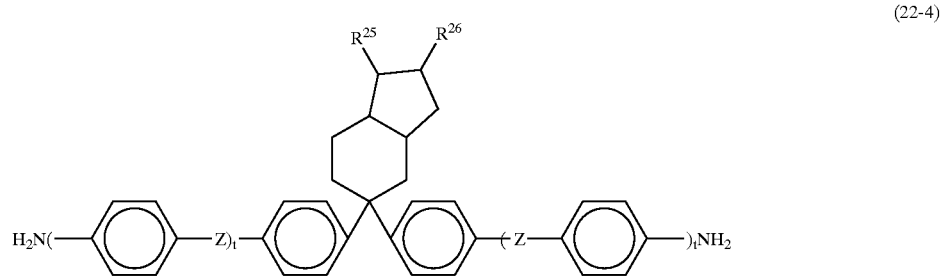

wherein $R^{13}$, $R^{25}$ and $R^{26}$ each independently represent hydrogen or an alkyl group of 1 to 12 carbon atoms, Y is a single bond or $CH_2$, ring A represents a benzene ring or a cyclohexane ring, Z represents a single bond, $CH_2$, $CH_2CH_2$, or oxygen, r is a positive number of 0 to 3, s is a positive number of 0 to 5, t is a positive number of 0 to 3, provided that when t is 2 to 3, each Z may be the same or different from each other. Further, hydrogen on any benzene or cyclohexane ring may be replaced by a lower alkyl group. The steroid skeleton in the formulas (22-2) and (22-3) may be the one wherein any ring is reduced, enlarged or cleaved, the one wherein it contain a three-membered ring, the one wherein an unsaturated bond in any position is increased or decreased or the one wherein hydrogen or alkyl in any position is replaced by any monovalent organic group.

(23)

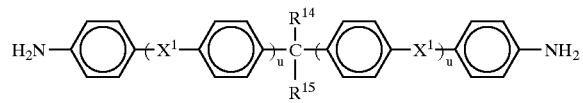

wherein $X^1$, $R^{14}$, $R^{15}$ and u have the same meanings as defined above, and hydrogen on any benzene ring may be replaced by a lower alkyl group, as mentioned above.

(24)

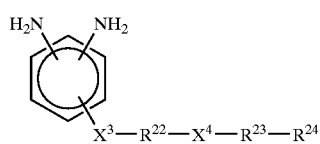

wherein $X^3$ and $X^4$ each independently represent a single bond, O, COO, OCO, NH, CONH, or $(CH_2)_n$, $R^{22}$ and $R^{23}$ each independently represent a single bond, a group having 1 to 3 rings an aromatic ring and/or an alicyclic ring (when $R^{22}$ and $R^{23}$ have 2 or 3 rings, these rings may be bonded with $X^3$ or $X^4$) or a steroid group, $R^{24}$ represents hydrogen, fluorine, hydrocarbon group, fluorohydrocarbon group, alkoxy, cyano or OH, and n is a positive number of 1 to 5.

(25)

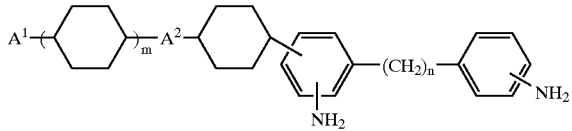

wherein $A^1$ is hydrogen or a straight or branched-chain alkyl group of 1 to 12 carbon atoms in which any non-adjacent, two or more methylenes may be replaced by oxygen, $A^2$ is a single bond or alkylene of 1 to 5 carbon atoms in which any non-adjacent, two or more methylenes may be replaced by oxygen, m is 0 to 3 and n is 1 to 5.

As specific examples of such diamine compounds, those represented by formula (22-1) can be recited below.
Compounds wherein Z=oxygen, r=0 and t=1:
1,1-bis[4-(4-aminophenoxy)phenyl]cyclohexane, 1,1-bis[4-(4-aminophenoxy)phenyl]-4-methylcyclohexane, 1,1-bis[4-(4-aminophenoxy)phenyl]-4-ethylcyclohexane, 1,1-bis[4-(4-aminophenoxy)phenyl]-4-n-propylcyclohexane, 1,1-bis[4-(4-aminophenoxy)phenyl]-4-n-butylcyclohexane, 1,1-bis[4-(4-aminophenoxy)phenyl]-4-n-pentylcyclohexane, 1,1-bis[4-(4-aminophenoxy)phenyl]-4-n-hexylcyclohexane, 1,1-bis[4-(4-aminophenoxy)phenyl]-4-n-heptylcyclohexane, 1,1-bis[4-(4-aminophenoxy)phenyl]-4-n-octylcyclohexane, 1,1-bis[4-(4-aminophenoxy)phenyl]-4-n-nonylcyclohexane, 1,1-bis[4-(4-aminophenoxy)phenyl]-4-n-decylcyclohexane, 1,1-bis[4-(4-aminophenoxy)phenyl]-4-n-undecylcyclohexane, 1,1-bis[4-(4-aminophenoxy)phenyl]-4-n-dodecylcyclohexane, 1,1-bis[4-(4-aminophenoxy)phenyl]-4-n-tridecylcyclohexane, 1,1-bis[4-(4-aminophenoxy)phenyl]-4-n-tetradecylcyclohexane, and 1,1-bis[4-(4-aminophenoxy)phenyl]-4-n-pentadecylcyclohexane.
Compounds wherein r, t=0:
1,1-bis(4-aminophenyl)cyclohexane, 1,1-bis(4-aminophenyl)-4-methylcyclohexane, 1,1-bis(4-aminophenyl)-4-ethylcyclohexane, 1,1-bis(4-aminophenyl)-4-n-propylcyclohexane, 1,1-bis(4-aminophenyl)-4-n-butylcyclohexane, 1,1-bis(4-aminophenyl)-4-n-pentylcyclohexane, 1,1-bis(4-aminophenyl)-4-n-hexylcyclohexane, 1,1-bis(4-aminophenyl)-4-n-heptylcyclohexane, 1,1-bis(4-aminophenyl)-4-n-octylcyclohexane, 1,1-bis(4-aminophenyl)-4-n-nonylcyclohexane, 1,1-bis(4-aminophenyl)-4-n-decylcyclohexane, 1,1-bis(4-aminophenyl)-4-n-undecylcyclohexane, 1,1-bis(4-aminophenyl)-4-n-dodecylcyclohexane, 1,1-bis(4-aminophenyl)-4-n-tridecylcyclohexane, 1,1-bis(4-aminophenyl)-4-n-tetradecylcyclohexane, and 1,1-bis(4-aminophenyl)-4-n-pentadecylcyclohexane.
Compounds wherein A=cyclohexyl, r=1, s, t=0 : 1,1-bis(4-aminophenyl)-4-cyclohexylcyclohexane, 1,1-bis(4-aminophenyl)-4-(4-methyl-trans-cyclohexyl)cyclohexane, 1,1-bis(4-aminophenyl)-4-(4-ethyl-trans-cyclohexyl)cyclohexane, 1,1-bis(4-aminophenyl)-4-(4-n-propyl-trans-cyclohexyl)cyclohexane, 1,1-bis(4-aminophenyl)-4-(4-n-butyl-trans-cyclohexyl)cyclohexane, 1,1-bis(4-aminophenyl)-4-(4-n-pentyl-trans-cyclohexyl)cyclohexane, 1,1-bis(4-aminophenyl)-4-(4-n-hexyl-trans-cyclohexyl)cyclohexane, 1,1-bis(4-aminophenyl)-4-(4-n-heptyl-trans-cyclohexyl)cyclohexane, 1,1-bis(4-aminophenyl)-4-(4-n-octyl-trans-cyclohexyl)cyclohexane, 1,1-bis(4-aminophenyl)-4-(4-n-nonyl-trans-cyclohexyl)cyclohexane, 1,1-bis(4-aminophenyl)-4-(4-n-decyl-trans-cyclohexyl)cyclohexane, 1,1-bis(4-aminophenyl)-4-(4-n-undecyl-trans-cyclohexyl)cyclohexane, 1,1-bis(4-aminophenyl)-4-(4-n-docecyl-trans-cyclohexyl)cyclohexane, 1,1-bis(4-aminophenyl)-4-(4-n-tridecyl-trans-cyclohexyl)cyclohexane, 1,1-bis(4-aminophenyl)-4-(4-n-tetradecyl-trans-cyclohexyl)cyclohexane, and 1,1-bis(4-aminophenyl)-4-(4-n-pentadecyl-trans-cyclohexyl)cyclohexane.
Compounds wherein A=cyclohexyl, Z=oxygen, r=1, s=0, and t=1 :
1,1-bis[4-(4-aminophenoxy)phenyl]-4-(cyclohexyl)cyclohexane, 1,1-bis[4-(4-aminophenoxy)phenyl]-4-(4-methylcyclohexyl)cyclohexane, 1,1-bis[4-(4-aminophenoxy)phenyl]-4-(4-ethylcyclohexyl)cyclohexane, 1,1-bis[4-(4-aminophenoxy)phenyl]-4-(4-propylcyclohexyl)cyclohexane, 1,1-bis[4-(4-aminophenoxy)phenyl]-4-(4-butylcyclohexyl)cyclohexane, 1,1-bis[4-(4-aminophenoxy)phenyl]-4-(4-pentylcyclohexyl)cyclohexane, 1,1-bis[4-(4-aminophenoxy)phenyl]-4-(4-hexylcyclohexyl)cyclohexane, 1,1-bis[4-(4-aminophenoxy)phenyl]-4-(4-heptylcyclohexyl)cyclohexane, and 1,1-bis[4-(4-aminophenoxy)phenyl]-4-(4-octylcyclohexyl)cyclohexane.

Compounds wherein A=cyclohexyl, Y=CH$_2$, r, s=1, and t=0:
1,1-bis(4-aminophenyl)-4-(cyclohexylmethyl)cyclohexane, 1,1-bis(4-aminophenyl)-4-[(4-methylcyclohexyl) methyl]cyclohexane, 1,1-bis(4-aminophenyl)-4-[(4-ethylcyclohexyl)methyl]cyclohexane, 1,1-bis(4-aminophenyl)-4-[(4-propylcyclohexyl)methyl]cyclohexane, 1,1-bis(4-aminophenyl)-4-[(4-butylcyclohexyl)methyl]cyclohexane, 1,1-bis(4-aminophenyl)-4-[(4-pentylcyclohexyl)methyl]cyclohexane, 1,1-bis(4-aminophenyl)-4-[(4-hexylcyclohexyl)methyl]cyclohexane, 1,1-bis(4-aminophenyl)-4-[(4-heptylcyclohexyl)methyl]cyclohexane, and 1,1-bis(4-aminophenyl)-4-[(4-octylcyclohexyl)methyl]cyclohexane.

Compounds wherein A=phenyl, Y=CH$_2$, Z=oxygen, r, s, and t=1:
1,1-bis[4-(4-aminophenoxy)phenyl]-4-(phenylmethyl)cyclohexane, 1,1-bis[4-(4-aminophenoxy)phenyl]-4-[(4-methylphenyl)methyl]cyclohexane, 1,1-bis[4-(4-aminophenoxy)phenyl]-4-[(4-ethylphenyl)methyl]cyclohexane, 1,1-bis[4-(4-aminophenoxy)phenyl]-4-[(4-propylphenyl)methyl]cyclohexane, 1,1-bis[4-(4-aminophenoxy)phenyl]-4-[(4-butylphenyl)methyl]cyclohexane, 1,1-bis[4-(4-aminophenoxy)phenyl]-4-[(4-pentylphenyl)methyl]cyclohexane, 1,1-bis[4-(4-aminophenoxy)phenyl]-4-[(4-hexylphenyl)methyl]cyclohexane, 1,1-bis[4-(4-aminophenoxy)phenyl]-4-[(4-heptylphenyl)methyl]cyclohexane, and 1,1-bis[4-(4-aminophenoxy)phenyl]-4-[(4-octylphenyl)methyl]cyclohexane.

Compounds wherein A=phenyl, Y=CH2, r, s=1, and t=0:
1,1-bis(4-aminophenyl)-4-(phenylmethyl)cyclohexane, 1,1-bis(4-aminophenyl)-4-[(4-methylphenyl)methyl]cyclohexane, 1,1-bis(4-aminophenyl)-4-[(4-ethylphenyl)methyl]cyclohexane, 1,1-bis(4-aminophenyl)-4-[(4-propylphenyl) methyl]cyclohexane, 1,1-bis(4-aminophenyl)-4-[(4-butylphenyl)methyl]cyclohexane, 1,1-bis(4-aminophenyl)-[4-butylpenyl)methyl]cyclohexane, 1,1-bis(4-aminophenyl)-4-[(4-pentylphenyl)methyl]cyclohexane, 1,1-bis(4-aminophenyl)-4-[(4-heptylphenyl)methyl]cyclohexane, and 1,1-bis(4-aminophenyl)-4-[(4-octylphenyl)methyl]cyclohexane.

Compounds wherein A=phenyl, Y=CH$_2$, Z=CH$_2$, r, s, t=1:
1,1-bis{4-[(4-aminophenyl)methyl]phenyl}-4-(phenylmethyl)cyclohexane, 1,1-bis{4-[(4-aminophenyl)methyl]phenyl}-4-[(4-methylphenyl)methyl]cyclohexane,1,1-bis{4-[(4-aminophenyl)methyl]phenyl)-4-[(4-ethylphenyl)methyl]cyclohexane, 1,1-bis{4-[(4-aminophenyl)methyl]phenyl}-4-[(4-propylphenyl) methyl]cyclohexane, 1,1-bis{4-[(4-aminophenyl)methyl]phenyl}-4-[(4-butylphenyl)methyl]cyclohexane, 1,1-bis{4-[(4-aminophenyl)methyl]phenyl}-4-[(4-pentylphenyl)methyl]cyclohexane, 1,1-bis{4-[(4-aminophenyl)methyl]phenyl}-4-[(4-hexylphenyl)methyl]cyclohexane, 1,1-bis{4-[(4-aminophenyl)methyl]phenyl}-4-[(4-heptylphenyl)methyl]cyclohexane, and 1,1-bis{4-[(4-aminophenyl)methyl]phenyl)-4-[(4-octylphenyl)methyl]cyclohexane.

Compounds wherein Z=CH$_2$, r=0 and t=1:
1,1-bis{4-[(4-aminophenyl)methyl]phenyl}cyclohexane, 1,1-bis{4-[(4-aminophenyl)methyl]phenyl}-4-methylcyclohexane, 1,1-bis{4-[(4-aminophenyl)methyl]phenyl}-4-ethylcyclohexane, 1,1-bis(4-[(4-aminophenyl)methyl]phenyl}-propylcyclohexane, 1,1-bis{4-[(4-aminophenyl)methyl]phenyl}-4-butylcyclohexane, 1,1-bis{4-[(4-aminophenyl)methyl]phenyl}-4-pentylcyclohexane, 1,1-bis{4-[(4-aminophenyl)methyl]phenyl}-4-hexylcyclohexane, 1,1-bis{4-[(4-aminophenyl)methyl]phenyl}-4-heptylcyclohexane, and 1,1-bis(4-((4-aminophenyl)methyl)phenyl)-4-octylcyclohexane.

Compounds wherein A=cyclohexyl, Y=CH$_2$, Z=CH$_2$, r, t=1, and s=2:
1,1-bis{4-[(4-aminophenyl)methyl]phenyl}-4-[2-(cyclohexylethylcyclohexane, 1,1-bis{4-[(4-aminophenyl)methyl]phenyl}-4-[2-(4-methyl-trans-cyclohexyl)ethyl]cyclohexane, 1,1-bis{4-[(4-aminophenyl)methyl]phenyl}-4-(2-[4-ethyl-trans-cyclohexyl)ethyl]cyclohexane, 1,1-bis{4-[(4-aminophenyl)methyl]phenyl}-4-[2-(4-propyl-trans-cyclohexyl)ethyl]cyclohexane, 1,1-bis{4-[(4-aminophenyl)methyl]phenyl}-4-[2-(4-butyl-trans-cyclohexyl)ethyl]cyclohexane, 1,1-bis{4-[(4-aminophenyl)methyl]phenyl}-4-[2-(4-pentyl-trans-cyclohexyl)ethyl]cyclohexane, 1,1-bis(4-[(4-aminophenyl)methyl]phenyl}-4-[2-(4-amyl-trans-cyclohexyl)ethyl]cyclohexane, 1,1-bis{4-((4-aminophenyl)methyl]phenyl}-4-[2-(4-hexyl-trans-cyclohexyl)ethyl]cyclohexane, 1,1-bis{4-[(4-aminophenyl)methyl]phenyl}-4-[2-(4-heptyl-trans-cyclohexyl)ethyl]cyclohexane, 1,1-bis-[(4-aminophenyl)methyl]phenyl}-4-[2-(4-octyl-trans-cyclohexyl)ethyl]cyclohexane, 1,1-bis{4-[(4-aminophenyl)methyl]phenyl}-4-[2-(4-nonyl-trans-cyclohexyl)ethyl]cyclohexane, and 1,1-bis{4-[(4-aminophenyl)methyl]phenyl}-4-[2-(4-dodecyl-trans-cyclohexyl)ethyl]cyclohexane.

The formulas (22-2) and (22-3) represent the compounds having a steroid group in the side chain group, but the steroid group is an example of various steroid groups already mentioned in the item of the groups represented by formula (21).

Specific examples of diamines represented by formula (23) can include the following compounds.

Compounds wherein X$^1$=O (oxygen) and u=1 : 2,2-bis[4-(4-aminophenoxy)phenyl]pentane, 2,2-bis[4-(4-aminophenoxy)phenyl]hexane, 2,2-bis[4-(4-aminophenoxy)phenyl]heptane, 2,2-bis[4-(4-aminophenoxy)phenyl]octane, 2,2-bis[4-(4-aminophenoxy)phenyl]nonane, 2,2-bis[4-(4-aminophenoxy)phenyl]decane, 2,2-bis[4-(4-aminophenoxy)phenyl]undecane, 2,2-bis[4-(4-aminophenoxy)phenyl]dodecane, 2,2-bis[4-(4-aminophenoxy)phenyl]tridecane, 2,2-bis[4-(4-aminophenoxy)phenyl]tetradecane, 2,2-bis[4-(4-aminophenoxy)phenyl]pentadecane, 2,2-bis[4-(4-aminophenoxy)phenyl]hexadecane, 2,2-bis[4-(4-aminophenoxy)phenyl]heptadecane, 2,2-bis[4-(4-aminophenoxy)phenyl]octadecane, and 2,2-bis[4-(4-aminophenoxy)phenyl]nonadecane.

Compounds wherein X$^1$=CH$_2$ and u=1 :
2,2-bis{4-[(4-aminophenyl)methyl]phenyl}pentane, 2,2-bis{4-[(4-aminophenyl)methyl]phenyl}hexane, 2,2-bis{4-[(4-aminophenyl)methyl]phenyl}heptane, 2,2-bis{4-[(4-aminophenyl)methyl]phenyl}octane, 2,2-bis{4-[(4-aminophenyl)methyl]phenyl}nonane, 2,2-bis{4-[(4-aminophenyl)methyl]phenyl}decane, 2,2-bis{4-[(4-aminophenyl)methyl]phenyl}undecane, 2,2-bis{4-[(4-aminophenyl)methyl]phenyl}dodecane, 2,2-bis{4-[(4-aminophenyl)methyl]phenyl}tridecane, 2,2-bis{4-[(4-aminophenyl)methyl]phenyl}tetradecane, 2,2-bis{4-[(4-aminophenyl)methyl]phenyl}pentadecane, 2,2-bis{4-[(4-aminophenyl)methyl]phenyl}hexadecane, 2,2-bis{4-[(4- aminophenyl)methyl]phenyl)heptadecane, 2,2-bis{4-[(4-aminophenyl)methyl]phenyl}octadecane, 2,2-bis{4-[(4-aminophenyl)methyl]phenyl}nonadecane, 2,2-bis{4-[(4-aminophenyl)methyl]phenyl}perfluoropentane, 2,2-bis{4-[(4-aminophenyl)methyl]phenyl}perfluorohexane, 2,2-bis{4-[(4-aminophenyl)methyl]phenyl}perfluoroheptane, 2,2-bis{4-[(4-aminophenyl)methyl]phenyl}perfluorooctane, 2,2-bis{4-[(4-aminophenyl)methyl]phenyl}perfluorononane, 2,2-bis{4-[(4-aminophenyl)methyl]phenyl}perfluorodecane, 2,2-bis{4-[(4-aminophenyl)methyl]phenyl}perfluoroundecane, 2,2-bis{4-[(4-aminophenyl)methyl]phenyl}perfluorododecane, 2,2-bis{4-[(4-aminophenyl)methyl]phenyl}perfluorotridecane, 2,2-bis{4-[(4-aminophenyl)methyl]phenyl}perfluorotetradecane, 2,2-bis{4-[(4-aminophenyl)methyl]phenyl}perfluoropentadecane, 2,2-bis{4-[(4-aminophenyl)methyl]phenyl}perfluorohexadecane, 2,2-bis{4-[(4-aminophenyl)methyl]phenyl}perfluoroheptadecane, 2,2-bis{4-[(4-aminophenyl)methyl]phenyl}perfluorooctadecane, and 2,2-bis{4-[(4-aminophenyl)methyl]phenyl}perfluorononadecane.

The above-recited compounds are examples of 2,2-bis substituted compounds, but needless to say, 1,1-bis substituted, 3,3-bis substituted, 4,4-bis substituted or 5,5-bis substituted compounds can be likewise included therein.

Specific examples of diamines represented by the formula (24) can include the following compounds. 4-[-(4-biphenyloxy)octyloxyl-1,3-diaminobenzene, 4-[3-(4-cyanobiphenyl-4'-oxy)propoxy]-1,3-diaminobenzene, 4-[12-(4-cyanobiphenyl-4'-oxy)dodecyloxy]-1,3-diaminobenzene, 4-[6-(4-methoxybiphenyl-4'-oxy)hexyloxy]-1,3-diaminobenzene, 4-[3-(4-fluorobiphenyl-4'-oxy)propoxy]-1,3-diaminobenzene, 1,4-diamino-3-[4-(4-alkylcyclohexyl)cyclohexyloxy]benzene, 1,4-diamino-3-[4-(4-alkylphenyl)cyclohexyloxy]benzene, 1,4-diamino-3-((4-alkylterphenyl)oxy)benzene, 1,4-diamino-(2-alkyl)benzene, 1,4-diamino-(2,5-dialkyl)benzene, 2-alkyloxy-1,4-diaminobenzene, dodecyl 2,4-diaminobenzoate, octyl 2,4-diaminobenzoate, and 1,5-diamino-2-octyloxycarbonylaminobenzene.

In the diamines represented by formula (24), $R^{22}$ or $R^{23}$ in the formula is selected from various steroid groups already mentioned for the formula (21), by which diamine compounds having the steroid groups as a substituent can be also included in the above specific examples.

Specific examples of diamines represented by the formula (25) can include the following compounds.
1-cyclohexyl-4-[4-(4-aminobenzyl)-2-aminophenyl]cyclohexane, 1-(4-methylcyclohexyl)-4-[4-(4-aminobenzyl)-2-aminophenyl]cyclohexane, 1-(4-propylcyclohexyl)-4-[4-(4-aminobenzyl)-2-aminophenyl]cyclohexane, 1-(4-pentylcyclohexyl)-4-[4-(4-aminobenzyl)-2-aminophenyl]cyclohexane, 1-(4-octylcyclohexyl)-4-[4-(4-aminobenzyl)-2-aminophenyl]cyclohexane, 1-(4-cylcyclohexyl)-4-[4-(4-aminobenzyl)-2-aminophenyl]cyclohexane, 1-(4-dodecylcyclohexyl)-4-[4-(4-aminobenzyl)-2-aminophenyl]cyclohexane, 1-decyclohexyl-4-[4-(3-aminobenzyl)-2-aminophenyl]cyclohexane, 1-(4-methylcyclohexyl)-4-[4-(3-aminobenzyl)-2-aminophenyl]cyclohexane, 1-(4-propylcyclohexyl)-4-[4-(3-aminobenzyl)-2-aminophenyl]cyclohexane, 1-(4-pentylcyclohexyl)-4-[4-(3-aminobenzyl)-2-aminophenyl]cyclohexane, 1-(4-octylcyclohexyl)-4-[4-(3-aminobenzyl)-2-aminophenyl]cyclohexane, 1-(4-decylcyclohexyl)-4-[4-(3-aminobenzyl)-2-aminophenyl]cyclohexane, and 1-(4-dodecylcyclohexyl)-4-[4-(3-aminobenzyl)-2-aminophenyl]cyclohexane.

When the amount of these diamines used is little or the side chain group provided in these diamines compounds is short, the pre-tilt angle is small. In that case, they are suitable for IPS elements, and especially for TN type TFT elements when the pre-tilt angle is approximately 3 to 8 degrees. Larger pre-tilt angle may be required in STN elements and ferroelectric liquid crystal display elements. In this case, it is desirable to use diamines having a side chain group of longer chain.

The above-recited compounds illustrate only specific examples of diamines represented by the formulas (22-1) to (22-4), (23), (24), and (25) (called sometimes "first diamine compound" hereafter), to which diamines relating to the present invention are not limited. Needless to say, there are other various embodiments within the scope which can achieve the objects of the present invention.

For instance, the above-mentioned diamines may be a combination of the first diamine compound having a side chain group of not less than 3 carbon atoms and a diamine compound having no side chain group of not less than 3 carbon atoms (sometimes called "second diamine compound" hereafter).

As the second diamine compounds, including diamine compounds represented by the formula (20), the following aromatic, alicyclic and aliphatic diamine compounds can be recited for example.

When the amount of these diamines used is little or the side chain group provided in these diamines compounds is short, the pre-tilt angle is small. In that case, they are suitable for IPS elements, and especially for TN type TFT elements when the pre-tilt angle is approximately 3 to 8 degrees. Larger pre-tilt angle may be required in STN elements and ferroelectric liquid crystal display elements. In this case, it is desirable to use diamines having a side chain group of longer chain.

The above-recited compounds illustrate only specific examples of diamines represented by the formulas (22-1) to (22-4), (23), (24), and (25) (called sometimes "first diamine compound" hereafter), to which diamines relating to the present invention are not limited. Needless to say, there are other various embodiments within the scope which can achieve the objects of the present invention.

For instance, the above-mentioned diamines may be a combination of the first diamine compound having a side chain group of not less than 3 carbon atoms and a diamine compound having no side chain group of not less than 3 carbon atoms (sometimes called "second diamine compound" hereafter).

As the second diamine compounds, including diamine compounds represented by the formula (20), the following aromatic, alicyclic and aliphatic diamine compounds can be recited for example.

Aromatic Diamine Compounds :
2,2-bis(4-aminophenyl)propane, 2,6-diaminopyridine, bis(4-aminophenyl)diethylsilane, bis(4-aminophenyl)diphenylsilane, bis(4-aminophenyl)ethylphosphine oxide, bis(4-aminophenyl)-N-butylamine, N,N-bis-(4-aminophenyl)-N-methylamine, N-(3-aminophenyl)-4-aminobenzamide, 3,3'-diaminodiphenylmethane, 3,3'-diaminodiphenylether, 3,3'-diaminodiphenylsulfone, 2,2-bis(3-aminophenyl)propane, 1,3-bis(3-aminophenyl)propane, 3,3'-diaminodiphenylsulfide, 2,3,5,6-tetramethyl-p-phenylenediamine, 2,5-dimethyl-p-phenylenediamine, p-phenylenediamine, m-phenylenediamine, p-xylenediamine, m-xylenediamine, p-xylylenediamine, m-xylylenediamine, 2,4-diaminotoluene,2,6-diaminotoluene, 1,2-bis(3-diaminophenyl)ethane, 1-bis(3-diaminophenyl)ethane, 4,4'-diaminodiphenylhexafluoropropane, 2,2-bis(4-aminophenyl)hexafluoropropane, 4,4'-diaminobenzophenone, 4,4'-diaminodiphenylsulfide, 4,4'-diaminodiphenylsulfone, 4,4'-diaminodiphenylether, 3,4'-diaminodiphenylether, 1,5-diaminonaphthalene, 2,6-diaminonaphthalene, bis[4-(4-aminophenoxy)phenyl]methane, 1,1-bis[4-(4-aminophenoxy)phenyl]ethane, 1,2-bis[4-(4-aminophenoxy)phenyl]ethane, 1,1-bis[4-(4-aminophenoxy)phenyl]propane, 2,2-bis[4-(4-aminophenoxy)phenyl]propane, 2,2-bis[4-(4-aminophenoxy)phenyl]butane, 4,4'-bis(4-aminophenoxy)diphenylketone, bis[4-(4-aminophenoxy)phenyl]sulfone, bis[4-(4-aminophenoxy)phenyl]sulfide, 1,3-bis[4-(4-aminophenoxy)phenyl]benzene, 1,4-bis[4-(4-aminophenoxy)phenyl]benzene, 4,4'-bis[4-(4-aminophenoxy)phenyl)biphenyl, 1,2-bis[4-(4-aminophenoxy)phenyl]cyclohexane, 1,3-bis[4-(4-aminophenoxy)phenyl]cyclohexane, 1,4-bis[4-(4-aminophenoxy)phenyl]cyclohexane, bis[4-(4-aminophenoxy)phenyl]hexafluoropropane, 2,2-bis[4-(2-aminophenoxy)phenyl]hexafluoropropane, 2,2-bis[4-(3-aminophenoxy)phenyl]hexafluoropropane, 2,2-bis[4-(3-carbamoyl-4-aminophenoxy)phenyl]hexafluoropropane, 2,2-bis(3-sulfamoyl-4-aminophenyl)hexafluoropropane, 2,2-bis(3-carboxy-4-aminophenyl)hexafluoropropane, 2,2-bis[4-(3-sulfamoyl-4-aminophenoxy)phenyl]hexafluoropropane, 2,2-bis[4-(3-carboxy-4-aminophenoxy)phenyl]hexafluoropropane, 1,3-bis[2,2-{4-(4-aminophenoxy)phenyl)hexafluoroisopropyl]benzene, 2,4-bis(β-amino-t-butyl)toluene, bis(p-β-methyl-γ-aminopentyl)benzene, bis-p-(1,1-dimethyl-5-aminopentyl)benzene, bis(p-β-amino-t-butylphenyl)ether, bis(4-aminobenzyloxy)methane, bis(4-aminobenzyloxy)ethane, bis(4-aminobenzyloxy)propane, and bis(4-aminobenzyloxy) cyclohexane.

Alicyclic Diamnine Compounds:

1,4-diaminodicyclohexane, 1,3-bis(aminomethyl)cyclohexane, 1,4-bis(aminomnethyl)cyclohexane, 4,4'-diaminodicyclohexylmethane, bis(2-methyl-4-aminocyclohexyl)methane, isophoronediamine, 2,5-bis(aminomethyl)-bicycloheptane, 2,6-bis(aminomethyl)-bicycloheptane, 2,3-diaminobicyclo[2.2.1]heptane, 2,5-diaminobicyclo[2.2.1]heptane, 2,5-diaminobicyclo[2.2.1]heptane, 2,6-diaminobicyclo[2.2.1]heptane, 2,7-diaminobicyclo [2.2.1]heptane, 2,3-diamino7-azabicyclo[2.2.1]heptane, 2,5-diamino-7-azabicyclo[2.2.1]heptane, 2,6-diamino-7-azabicyclo[2.2.1]heptane, 2,3-diamino-7-thiabicyclo[2.2.1]heptane, 2,5-diamino-7-thiabicyclo[2.2.1]heptane, 2,6-diamino-7-thiabicyclo[2.2.1]heptane, 2,3-diaminobicyclo[2.2.2]octane, 2,5-diaminobicyclo[2.2.2]octane, 2,6-diaminobicyclo[2.2.2]octane, 2,5-diaminobicyclo[2.2.2]oct-7-ene, 2,5-diamino-7-azabicyclo[2.2.2]octane, 2,5-diamino-7-oxabicyclo[2.2.2]octane, 2,5-diamino-7-thiabicyclo[2.2.2]octane, 2,6-diaminobicyclo[3.2.1]octane, 2,6-diaminoazabicyclo[3.2.1]octane, 2,6-diaminooxabicyclo[3.2.]octane, 2,6-diaminothiabicyclo[3.2.1]octane, 2,6-diaminobicyclo[3.2.2]nonane, 2,6-diaminobicyclo[3.2.2]non-8-ene) 2,6-diamino-8-azabicyclo[3.2.2]nonane, 2,6-diamino-8-oxabicyclo[3.2.2]nonane, and 2,6-diamino-8-thiabicyclo[3.2.2]nonane.

Aliphatic Diamines:

ethylenediamine, trimethylenediamine, tetramethylenediamine, pentamethylenediamine, hexaethylenediamine, and alkyllene diamines having an oxygen atom in the alkylene group.

Of these second diamine compounds, a combined use of aliphatic diamines in a large quantity may have an adverse effect on the alignment property of liquid crystal molecule. Therefore, the amount of aliphatic diamines used should be within the range which can avoid such adverse effect. Preferably, these second diamine compounds have the structure which does not contain in the skeleton oxygen and sulfur such as ester and ether groups, etc., in order to avoid a reduction in electrical properties of liquid crystal display element.

In diamines providing $R^{2'}$, the proportion of the first diamine compound and the second diamine compound varies depending on the variety of the former and the required pre-tilt angle, but usually the ratio of the first diamine compound/the second compound (mole %) is from 100/0 to 1/99, preferably 100/0 to 10/90, more preferably 100/0 to 20/80.

The N-substituted polyamide of formula (3) which is other component of the polymer ingredient is the polyamide in which part or all of H in the amide groups (CONH) is substituted by a monovalent organic radical. The mixed system of the present invention is more improved particularly in electrical properties than non-substituted polyamides. The use of the polyamide of formula (3) in combination with the polyamic acids of formulas (1) and (2) can solve the problem of the present invention.

For this purpose, it is preferable that the N-substituted polyamide has also a side chain group of not less than 3 carbon atoms. The methods of introducing such group into the N-substituted polyamide include a method of the side chain group into $R^5$ or $R^6$ (first method), a method of the side chain group into the dicarboxylic acid (second method) and a method of introducing the side chain group into the diamine (third method). Since the first method tends to worsen a resistance to liquid crystal property, second or third method is preferable.

The method using the diamine component having the side chain group (third method) can introduce stably the side chain group into a molecule. The diamine compounds represented by the formulas (22-1) to (22-4), (23), (24), and (25) are preferably used, since they provide a stable pre-tilt angle.

Needless to say, the above-mentioned three methods can respectively be used singly and in combination.

The dicarboxylic acids providing $R^3$ in the formula (3) may be those belonging to any group of the aromatic system (including its heterocyclic system), the alicyclic system (including its heterocyclic system) and the aliphatic system (noncyclic), but those having cyclic structure are preferable in keeping good alignment property of liquid crystal molecule. The dicarboxylic acids having said cyclic structure are used singly by species, and otherwise the alicyclic system and the aromatic system may be used in combination.

When using the aliphatic system (noncyclic), preferably having a short chain, it is preferably used in combination with the alicyclic system or/and the aromatic system. Moreover, the amount used should be within the scope which does not affect the alignment property.

Futhermore, it is preferable that $R^3$ has the structure containing no oxygen or sulfur atoms such as ester and ether groups which tend to lower the electrical properties of liquid crystal element. When the proportion of N-substituted polyamide incorporated is little even in the structure containing these atoms, the above-mentioned effect decreases, and therefore it does not become a problem so much.

Specific examples of dicarboxylic acids providing such $R^3$ can include the following compounds.

Aliphatic dicarboxylic acids such as malonic acid, oxalic acid, oxalic acid, dimethyl malonic acid, succinic acid, glutaric acid, adipic acid, muconic acid, 2-methyl adipic acid, trimethyl adipic acid, pimelic acid, 2,2-dimethyl glutaric acid, 3,3-diethyl succinic acid, azelanic acid, sebacic acid, suberic acid, etc.; alicyclic dicarboxylic acids such as 1,1-cyclopropane dicarboxylic acid, 1,2-cyclopropane dicarboxylic acid, 1,1-cyclobutane dicarboxylic acid, 1,2-cyclobutane dicarboxylic acid, 1,3-cyclobutane dicarboxylic acid, 3,4-diphenyl-1,2-cyclobutane dicarboxylic acid, 2,4-diphenyl-1,3-cyclobutane dicarboxylic acid, 3,4-bis(2-hydroxyphenyl)-1,2-cyclobutane dicarboxylic acid, 2,4-bis(2-hydroxyphenyl)-1,3-cyclobutane dicarboxylic acid, 1-cyclobutene-1,2-dicarboxylic acid, 1-cyclobutene-3,4-dicarboxylic acid, 1,1-cyclopentane dicarboxylic acid, 1,2-cyclopentane dicarboxylic acid, 1,3-cyclopentane dicarboxylic acid, 1,1-cyclohexane dicarboxylic acid, 1,2-cyclohexane dicarboxylic acid, 1,3-cyclohexane dicarboxylic acid, 1,4-cyclohexane dicarboxylic acid, 1,4-(2-norbornene)dicarboxylic acid, norbornene-2,3-dicarboxylic acid, bicyclo[2.2.2]octane-1,4-dicarboxylic acid, bicyclo[2.2.2]octane-2,3-dicarboxylic acid, 2,5-dioxo-1,4-bicyclo[2.2.2]octane dicarboxylic acid, 1,3-adamantane dicarboxylic acid, 4,8-dioxo-1,3-adamantane dicarboxylic acid, 2,6-spiro[3.3]heptane dicarboxylic acid, 1,3-adamantane diacetate, and camphoic acid; and aromatic dicarboxylic acids such as o-phthalic acid, isophthalic acid, terephthalic acid, 5-methylisophthalic acid, 5-tert-butylisophthalic acid,5-aminoisophthalic acid, 5-hydroxyisophthalic acid, 2,5-dimethylterephthalic acid, tetramethylterephthalic acid, 1,4-naphthalene dicarboxylic acid, 2,5-naphthalene dicarboxylic acid, 2,6-naphthalene dicarboxylic acid, 2,7-naphthalene dicarboxylic acid, 1,4-anthracene dicarboxylic acid, 1,4-anthraquinone dicarboxylic acid, 2,5-biphenyl dicarboxylic acid, 4,4'-biphenyl dicarboxylic acid, 1,5-biphenylene dicarboxylic acid, 4,4"-terphenyl dicarboxylic acid, 4,4'-diphenylmethane dicarboxylic acid, 4,4'-diphenylethane dicarboxylic acid, 4,4'-diphenylpropane dicarboxylic acid, 4,4'-diphenylhexafluoropropane dicarboxylic acid, 4,4'-diphenyl ether dicarboxylic acid, 4,4'-bibenzyl dicarboxylic acid, 4,4'-stilbene dicarboxylic acid, 4,4'-tolane dicarboxylic acid, 4,4'-carbonyl dibenzoic acid, 4,4'-sulfonyl dibenzoic acid, 4,4'-dithio dibenzoic acid, p-phenylene diacetic acid, 3,3'-p-phenylene dipropionic acid, 4-carboxy cinnamic acid, p-phenylene diacrylic acid, 3,3'-[4,4'-(methylenedi-p-phenylene)]dipropionic acid, 4,4'-[4,4'-(oxydi-p-phenylene)]dipropionic acid, 4,4'-[4,4'-(oxydi-p-phenylene)]dibutyric acid, (isopropylidenediphenylenedioxy)dibutyric acid, bis(p-carboxyphenyl) dimethylsilane, 1,5-(9-oxofluorene)dicarboxylic acid, 3,4-furandicarboxylic acid, 4,5-thiazole dicarboxylic acid, 2-phenyl-4,5-thiazole dicarboxylic acid, 1,2,5-thiadiazole-3,4-dicarboxylic acid, 1,2,5-oxadiazole-3,4-dicarboxylic acid, 2,3-pyridine dicarboxylic acid, 2,4-pyridine dicarboxylic acid, 2,5-pyridine dicarboxylic acid, 2,6-pyridine dicarboxylic acid, 3,4-pyridine dicarboxylic acid, 3,5-pyridine dicarboxylic acid, 3,6-pyridine dicarboxylic acid, etc. These dicarboxylic acids may be in the form of their acid dihalides.

The above-mentioned dicarboxylic acids or acid dihalides thereof (hereafter called "dicarboxylic acids" sometimes) are preferably dicarboxylic acids which can especially provide a polyamide of a linear structure, in maintaining the alignment property of liquid crystal molecule.

Of these, there are preferably used terephthalic acid, isoterephthalic acid, 1,4-cyclohexane dicarboxylic acid, 4,4'-biphenyl dicarboxylic acid, 4,4'-diphenylmethane dicarboxylic acid, 4,4'-diphenylethane dicarboxylic acid, 4,41-diphenylpropane dicarboxylic acid, 4,4'-diphenylhexafluoropropane dicarboxylic acid, 2,2-bis(phenyl)propane dicarboxylic acid, 4,4" terphenyl dicarboxylic acid, 2,6-naphthalene dicarboxylic acid, 2,5-pyridine dicarboxylic acid or their acid dihalides.

In order to increase the adhesive property or the like, part of these dicarboxylic acids may be used with a siloxane dicarboxylic acid represented by formula (26) or the acid dichloride thereof.

HOO C(CH2)$_v$—Si($R^{17}$,$R^{18}$)—[OSi($R^{17}$,$R^{18}$)]w—(CH2)x—COOH (26)

wherein $R^{17}$ and $R^{18}$ each independently represent an alkyl group of 1 to 12 carbon atoms, an alkoxy group, a phenyl group which may have a substituent or a cyclohexyl group which may have a substituent, and v, w and x are 1 to 5.

Regarding the dicarboxylic acids providing $R^3$, those having a side chain group of not less than 3 carbon atoms can also be recited as a specific example, in addition to the specific examples as given above. Examples of such dicarboxylic acids can include those represented by formula (27) or (28).

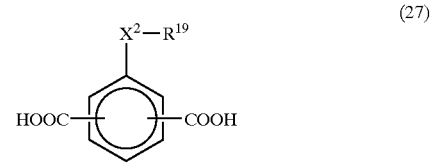

(27)

wherein $X^2$ represents a single bond, O, COO, NH, alkylene of 1 to 6 carbon atoms, OCO, NHCO, CONH, S, or $CH_2$, $R^{19}$ represents a hydrocarbon group or a perfluoroalkyl group of 3 to 20 carbon atoms, or a steroid group which may have a substituent.

About the above steroid group, various steroid groups as already mentioned in the item of group represented by formula (21) are likewise referred to.

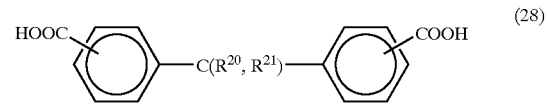

(28)

wherein $R^{20}$ and $R^{21}$ each independently represent an alkyl group of 1 to 12 carbon atoms, provided that the sum of the carbon numbers are not less than 4.

About the diamines providing $R^4$, the content mentioned above in connection with $R^{2'}$ in the formula (2) can apply as it is. As the organic groups $R^5$ and $R^6$ in said diamines, the aliphatic system, the aromatic system, the alicyclic system or various groups which can contain these systems are possible. These cyclic groups may be the heterocyclic system and the condensed system such as naphthalene, etc. These examples can include the groups represented by formula (21).

When diamine compounds having a side chain group of not less than 3 carbon atoms are used for $R^4$, an organic group having a relatively low carbon atom can be used as a monovalent organic group suitable for $R^5$ or $R^6$.

Specific examples of these monovalent organic groups can include the following groups.

Straight or branched-chain alkyl groups such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosil, isopropyl, isobutyl, sec-butyl, tert-butyl, isopentyl, neopentyl, tert-pentyl, 1-methylpentyl, 2-methylpentyl, 3-methylpentyl, 4-methylpentyl, isohexyl, 1-ethylpentyl, 2-ethylpentyl, 3-ethylpentyl, 4-ethylpentyl, 2,4-dimethylhexyl, 2,3,5-triethylheptyl, etc.;

organic groups having an unsaturated bond or a cyclo ring such as vinyl, ethynyl, 1-propenyl, 2-propenyl, isopropenyl, 2-butenyl, 1,3-butadienyl, 2-pentenyl, 2-penten-4-ynyl, 2-nonyl-2-butenyl, cyclopropyl, cyclobutyl, cyclopentyl, cyclohexyl, bicyclohexyl, cyclopropylmethyl, cyclobutylmethyl, cyclopentylmethyl, cyclohexylmethyl, bicyclohexylmethyl, 2-cyclopenten-1-yl, 2,4-cyclopentadien-1-yl, etc.;

organic groups having an aromatic ring such as phenyl, 2,6-dimethylphenyl, 2,6-diisopropylphenyl, biphenyl, triphenyl, terphenyl, benzyl, biphenylmethyl, triphenylmethyl, terphenylmethyl, 4-methylbenzyl, 4-(tert-butyl)benzyl, α-metylbenzyl, 1-naphthyl, 2-naphthyl, 9-anthrylmethyl, 5-phenyl-2,4-pentadienyl, etc.;

organic groups having steroid skeletons such as choresteryl, androsteryl, β-choresteryl, epiandrosteryl, erygosteryl, estryl, 11α-hydroxymethylsteryl, 11α-progesteryl, lanosteryl, melatolanyl, methyltestorosteryl, norethisteryl, pregnenonyl, β-sitosteryl, stigmasteryl, testosteryl, cholesterol acetic esters, etc.;

organic radicals containing oxygen such as methoxy, ethoxy, propyloxy, butyloxy, pentyloxy, hexyloxy, methoxymethyl, methoxyethyl, methoxypropyl, methoxybutyl, methoxypentyl, methoxyhexyl, ethoxymethyl, ethoxyethyl, ethoxypropyl, ethoxybutyl, ethoxypentyl, ethoxyhexyl, hexyloxymethyl, hexyloxyethyl, hexyloxypropyl, hexyloxybutyl, hexyloxypentyl, hexyloxyhexyl, phenoxy, benzyloxy, biphenyloxy, naphthyloxy, 4-methoxybenzyl, phenoxymethyl, naphthyloxy, 4-methoxybenzyl, phenoxymethyl, benzyloxymethyl, biphenyloxymethyl, naphthyloxymethyl, hydroxymethyl, hydroxyethyl, hydroxypropyl, hydroxybutyl, hydroxypentyl, hydroxyhexyl, furfuryl, (3-furyl)methyl, oxiranylmethyl, 2-methyloxiranylmethyl, 2-oxetanylmethyl, 3-oxetanylmethyl, oxolanylmethyl, dioxolanylmethyl, formyl, acetyl, benzoyl, methoxycarbonyl, phenylmethoxycarbonyl, etc.;

organic groups containing halogen such as trifluoromethyl, perfluoroethyl, n-perfluoropropyl, n-perfluorobutyl, n-perfluoropentyl, n-perfluorohexyl, n-perfluoroheptyl, n-perfluorooctyl, n-perfluorononyl, n-perfluorodecyl, n-perfluoroundecyl, n-perfluorododecyl, n-perfluorotradecyl, n-perfluorotetradecyl, n-perfluoropentadecyl, n-perfluorohexadecyl, n-perfluoroheptadecyl, n-perfluorooctadecyl, n-perfluorononadecyl, n-perfluoroeicosyl, 4-trifluoromethylbenzyl, etc.; and organic groups containing nitrogen, silicon or phosphor such as aminomethyl, aminoethyl, aminopropyl, aminobutyl, aminopentyl, aminohexyl, aminoheptyl, aminooctyl, aminononyl, aminodecyl, aminoundecyl, aminododecyl, aminotridecyl, aminotetradecyl, aminopentadecyl, aminohexadecyl, aminoheptadecyl, aminooctadecyl, aminononadecyl, aminoeicosyl, 2-aminoisopropyl, 3-aminoisobutyl, 2-pyridylmethyl, 3-pyridylmethyl, 4-pyridylmethyl, 2,2,6,6-tetramethyl-4-piperidinyl, 1,2,2,6,6-pentamethyl-4-piperidinyl, 2,2,6,6-tetramethyl-1-(2-propenyl)-4-piperedinyl, 1-methyl-2,5-dioxo-3-pyrrolidinyl, (1,2,3,6-tetrahydro-1,3-dimethyl-2,6-dioxo-7H-purin-7-yl)methyl, cyano, cyanomethyl, cyanoethyl, cyanopropyl, cyanophenyl, cyanobiphenyl, cyanoterphenyl, cyanobenzyl, cyanophenylmethyl, cyanobiphenylmethyl, cyanoterphenylmethyl, trimethylsilyl, triethylsilyl, triphenylsilyl, 4-trimethylsilylbenzyl, dimethoxyphosphinylmethyl, diethoxyphosphinylmethyl, etc.

Of these, there are preferably used aliphatic groups such as methyl, ethyl, n-propyl, n-butyl, n-pentyl, isopropyl, isobutyl, sec-butyl, tert-butyl, isopentyl, neopentyl, tert-pentyl, vinyl, ethynyl, 1-propenyl, 2-propenyl, isopropenyl, 2-butenyl, 1,3-butadienyl, 2-pentenyl, 2-penten-4-ynyl, trifluoromethyl, perfluoroethyl, etc.; alicyclic groups such as cyclopropyl, cyclobutyl, cyclopentyl, cyclopropylmethyl, cyclobutylmethyl, 2-cyclopenten-1-yl, 2,4-cyclopentadien-1-yl, cyclohexyl, cyclohexylmethyl, steroids, etc; and aromatic groups such as phenyl, benzyl, naphthyl, 9-anthraxylmethyl, etc.

If these monovalent organic groups have the same carbon number, cyclic groups are preferable rather than linear groups.

The monovalent organic groups providing $R^5$ and $R^6$ according to the present invention are not limited to those recited above. Needless to say, there are other various embodiments within the scope capable of achieving the objects of the present invention. These monovalent organic groups can be used alone or in combination with two or more species.

In the N-substituted polyamides, the percentage of the substitution of the above monovalent organic groups is suitably 30% or more, preferably 50% or more, and more preferably 70% or more. With less than 50% of the percentage of the substitution, the effect cannot be produced easily in respect of electrical properties of liquid crystal display element.

The N-substituted polyamides can be produced by either of the following two methods. One is a method of reacting a dicarboxylic acid with a diamine compound in which H in the amino group ($NH_2$) has been previously substituted by $R^5$ and/or R6 (hereafter called "pre-substitution method"). Other one is a method of reacting a diamine compound with a dicarboxylic acid, and substituting H in the amide group (CONH) in the resulting polyamide bond by $R^5$ and $R^6$ in the organic group (hereafter called "post-substitution method").

Either of the above methods is applicable, but the latter method is preferable since the reactivity is good, a polymer of high molecular weight tends to be produced, which can lead to good mechanical properties of the film per se and can alleviate the drawbacks that a film is scraped in the rubbing step providing an alignment property of liquid crystal molecule and the alignment property is distorted.

The substituted diamine compounds relating to the pre-substitution method are prepared readily by reference to known methods for organic synthesis, for example, a method of reducing a double bond of an imine prepared by dehydrocondensation of a diamine with an aldehyde such as propylaldehyde and benzaldehyde or a ketone such as methyl ethyl ketone and cyclohexanone, a method of reducing a carbonyl group of an amide with lithium aluminum hydride or the like, the amide being prepared by reacting a diamine with an acid chloride such as acetyl chloride and benzoic chloride, etc., and a method of reacting a N-substituted aniline such as N-methylaniline, N,N-diphenylamine or N-methyl-3-aminotoluene, etc. with formaldehyde in the presence of an acid catalyst to prepare a N,N'-substituted diaminodiphenylmethane.

The post-substitution method is performed by reacting a polyamide dissolved in a solvent such as dimethyl sulfoxide, N-methylpyrrolidone, N,N-dimethylformamide or N,N-dimethylacetamide, with a halogenide such as $R^5$—Cl, $R^5$—Br, $R^5$—I, $R^6$—Cl, $R^6$—Br, or $R^6$—I in the presence of a base such as sodium hydride, potassium hydride, sodium hydroxide, potassium hydroxide, or triethylamine. When the reactivity is low, it is preferable that H in the amide group (CONH) is previously extracted by sodium hydride, butyl lithium, etc., and subsequently reacting with the above halogenide.

In the preparation of the N-substituted polyamides, it is required in any event that substituted diamine compounds (for the pre-substitution method) or diamine compounds (for the post-substitution method) are reacted with dicarboxylic acids. This reaction can be performed by reacting each component mentioned above in the range of 20 to 30° C., if necessary, in the presence of a condensing agent such as $(PhO)_3P$, $(PhO)PCl_2$, $PhPOCl_2$ or $(C_3H_7)_3P(O)O$ etc., pyridine, if necessary a solvent such as dimethyl sulfoxide, N-methylpyrrolidone, N,N-dimethyl formamide or N,N-dimethylacetamide, etc.

When the reactivity is low, a dicarboxylic acid halide may be used in place of a dicarboxylic acid, and a N,N'-diacetyldiamine and N,N'-bis(trimethylsilyl)diamine may be used in place of diamines.

By the above-mentioned reaction, N-substituted polyamides (for the pre-substitution method) or intermediate products, polyamides (for the post-substitution method) are prepared. Since these polymers as prepared contain unreacted raw materials and condensing agent, etc., a purified polymer is preferably made by placing small portions of the resultant polymer into water, alcohols such as methanol, ethanol, isopropanol, etc. or hydrocarbons such as hexane, heptane, etc., to precipitate a polymer, and subsequently subjecting the precipitated polymer to filtration, washing and drying, and if necessary repeating a series of operations, precipitation-filtration-washing-drying.

The polymer ingredients of the present invention contain as an essential component the polymers represented by the formulas (1), (2) and (3).

The proportion of each polymer contained is suitable in the following. Based on the total amount of the polymer ingredient, the polymer of the formula (1) is 10 to 99.8% by weight, the polymers of the formulas (2) and (3) are 0.2 to 90% by weight in total, preferably the polymer of the formula (1) is 40 to 98% by weight, the polymers of the formulas (2) and (3) are 2 to 60% by weight in total, and more preferably the polymer of the formula (1) is 60 to 98%, the polymers of the formulas (2) and (3) are 1 to 39%, respectively.

If the polymer of the formula (1) is used in the proportion of not more than 10%, the effect cannot be produced easily, especially in respect of electrical properties of liquid crystal display element. If the polyamic acid of the formula (2) is used in the proportion less than 0.1%, the effect of the present invention decreases. If it is used in the proportion of not less than 90%, the effect of the present invention is difficult to obtain. If the N-substituted of the formula (3) is used in the proportion of not more than 0.1%, the effect decreases in electrical properties. If it is used in the proportion exceeding 90%, a problem may occur in respect of the alignment property of liquid crystal molecule, printing property (especially, cissing) or electrical properties.

The varnish composition of the present invention may contain other polymer (hereafter called "third polymer") in the range not impairing the characteristics of the present invention, in addition to such polymer ingredient. It is desired in the light of maintaining the characteristics of the present invention that the proportion of third polymer contained is generally not more than 50% by weight, preferably not more than 25% by weight, based on the total amount of polymer.

Examples of third polymer can include polyamides, polyamide-imides, N-substituted polyamide-imides wherein H in the amide group (CONH) is substituted by other group than hydrogen, soluble polyimides (preferably, those having a side chain group of not less than 3 carbon atoms), acrylic resins, epoxy resins and the like. Of these, N-substituted polyamide-imides or soluble polyimides are relatively preferable.

The varnish composition of the present invention comprises such polymer ingredient and a solvent for dissolving it as an essential component, and a total concentration of the polymer ingredient (proportion contained) is suitably 0.1 to 40% by weight.

In coating a varnish composition onto a substrate, an operation of reducing the concentration of polymer ingredient in the composition by preliminary dilution with a solvent may be required for the adjustment of coating thickness. If the concentration of polymer ingredient exceeds 40% by weight, the viscosity of composition is too high, thus causing adverse effects that the polymer ingredient cannot mix well with the composition and cannot be diluted as desired, even though a solvent is added. Therefore, it is not preferable. For keeping good coating thickness in the case of spinner and printing methods, not more than 10% by weight is usually used in many cases. For other coating methods, e.g. dipping method, the concentration lower than 10% by weight may be used.

On the other hand, less than 0.1% by weight of the polymer ingredient concentration tends to produce the problem that the thickness of the resultant liquid crystal aligning film is too thin.

Thus the concentration of polymer ingredient is suitably not less than 0.1% by weight, preferably 0.5 to 10% by weight, for conventional spinner and printing methods. However, depending on the method of coating a varnish, it may be used in a thinner concentration.

The solvent used with the above-mentioned polymer ingredient in the varnish composition of the invention is applicable without particular limitation, if it is capable of dissolving a polymer ingredient.

As such solvents, those conventionally used in the manufacturing process and application of a polyamic acid or a soluble polyimide can be used. They may be selected suitably according to the purpose of use.

Examples of these solvents can include aprotic, polar organic solvents which are good solvents to polyamic acids and N-substituted polyamides. For instance, N-methyl-2-pyrrolidone, dimethylimidazolidinone, N-methylcaprolactam, N-methylpropioneamide, N,N-dimethylacetamide, dimethyl sulfoxide, N,N-dimethylformamide, N,N-diethylformamide, diethyl acetamide, or gamma-butyrolactone can be used. Moreover, other solvents used for improving the coating property can include, for example, alkyl lactates, 3-methyl-3-methoxy butanol, tetralin, isophorone, ethylene glycol monoalkyl ethers such as ethylene glycol monobutyl ether, etc., diethylene glycol monoalkyl ethers such as diethylene glycol monoethyl ether, etc., ethylene glycol monoalkyls or phenyl acetate, triethylene glycol monoalkyl ethers, propylene glycol monoalkyl ethers such as propylene glycol monobutyl ether, etc., dialkyl malonates such as diethyl malonate, dipropylene glycol monoalkyl ethers such as dipropylene glycol monomethyl ether, or ester compounds such as these acetates.

The varnish composition of the invention thus prepared is suitable mainly for the formation of the liquid crystal aligning film for TFT, and it can provide a moderate pre-tilt. Therefore, the present varnish composition is also useful in the formation of the liquid crystal aligning film for conventional 90° TN elements, STN elements, ferroelectric liquid crystal, or antiferroelectric liquid crystal display elements. Further, the varnish composition can be used for a protective coat, an insulating coat, etc., because of its excellent electrical properties.

The formation of liquid crystal aligning film is performed by the step of coating the varnish composition onto a substrate and the subsequent steps of drying and heat-treating required for dehydration and ring closure reactions.

As a coating method, spinner, printing, dipping and dropping methods, etc. are generally known. These methods are likewise applicable to the present invention. As methods of carrying out the drying and heat-treating steps required for dehydration and ring closure reactions, a method of heat-treating in oven or an infrared oven, a method of heat-treating on a hot plate, etc. are generally known. These methods are likewise applicable to the present invention.

Preferably, the drying step can be performed under relatively low temperatures within the range in which a solvent can vaporize. Preferably, the heat-treating step is generally performed at a temperature of 150 to 300 C.

The varnish composition of the invention can contain various kinds of additives if necessary. For example, if a promotion of imidization is desired, a catalyst meeting the purpose may be incorporated. If an improvement in coating property is desired, a surface active agent meeting the purpose may be incorporated. If an improvement in anti-static property is needed, an antistatic agent may be incorporated. If an improvement in adhesion to a substrate is desired, coupling agents such as silane, titanium and epoxy coupling agents, etc.

The liquid crystal composition used for the liquid crystal display element of the invention is prepared by mixing a liquid crystalline compound selected from the group consisting of compounds represented by the formulas (9) to (19) in accordance with the intended use.

Further, known compounds can be mixed in order to adjust a threshold voltage, a liquid crystal phase temperature range, an optical anisotropy, a dielectric anisotropy, viscosity, etc. Moreover, the atom constituting these compounds may be replaced by the isotope.

As an example of the above-mentioned liquid crystalline compound, the following compounds can be recited with regard to those represented by the formulas (9) to (11).

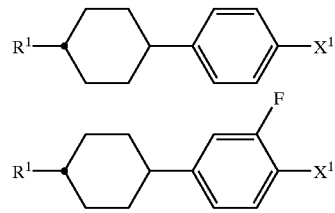

-continued

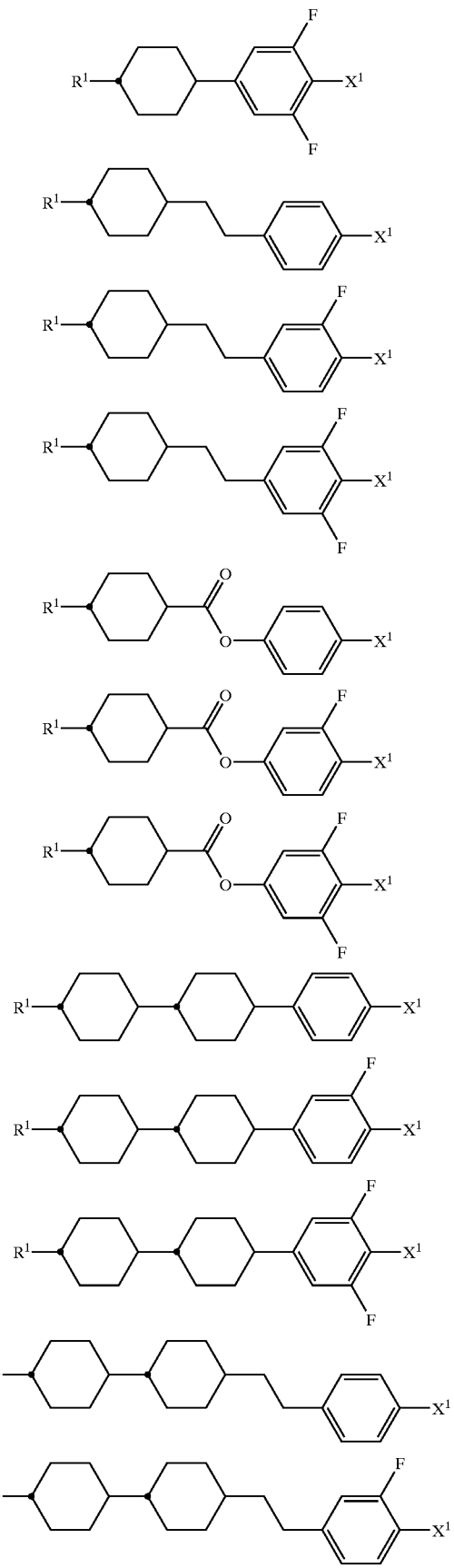

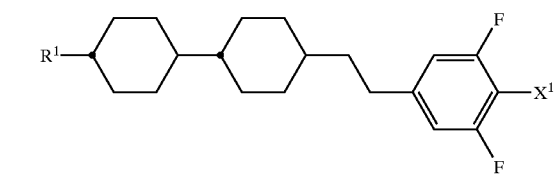
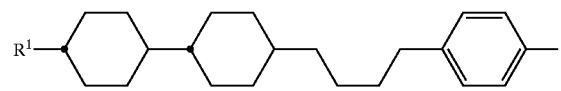
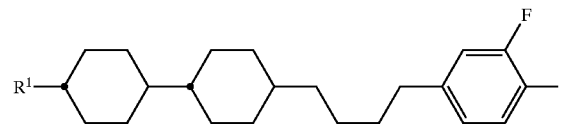
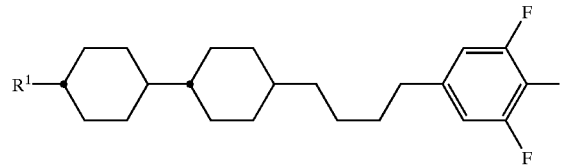
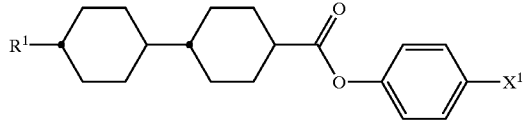
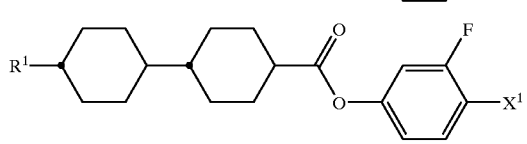
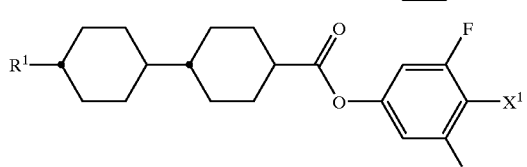
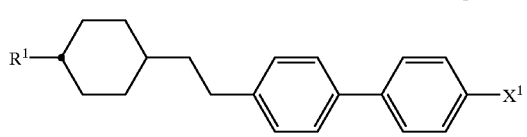
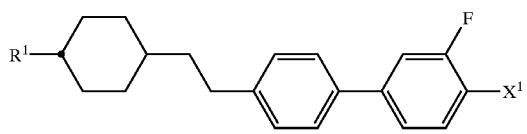
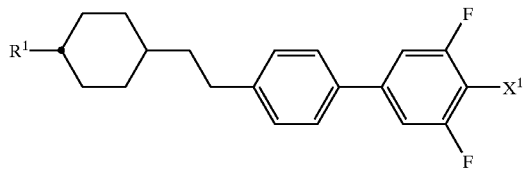
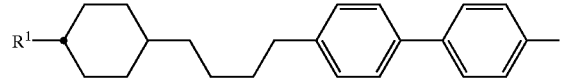
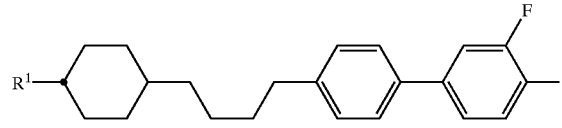
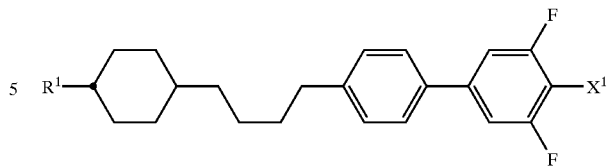
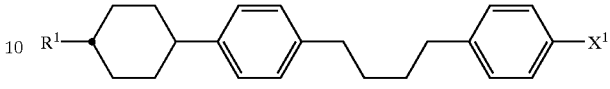
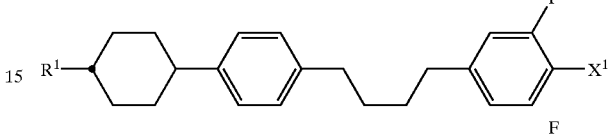
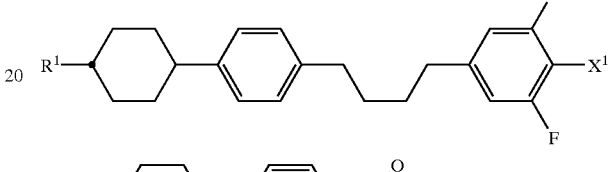
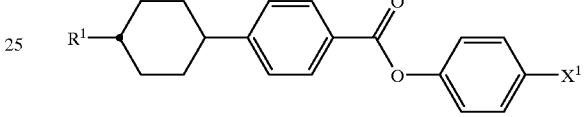
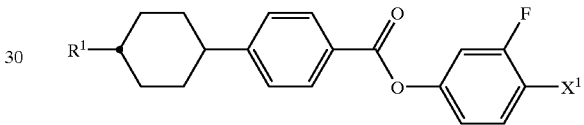
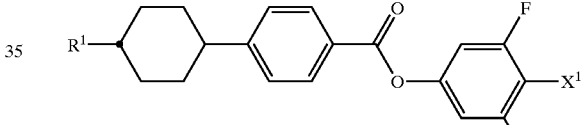
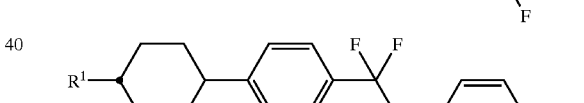
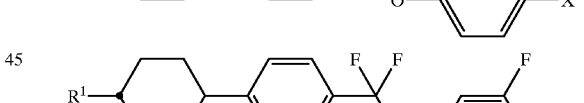
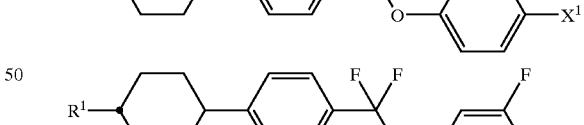
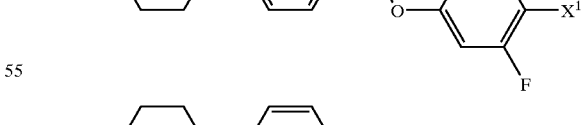
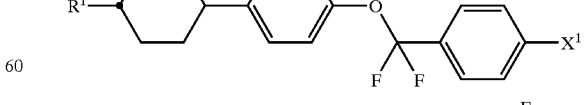
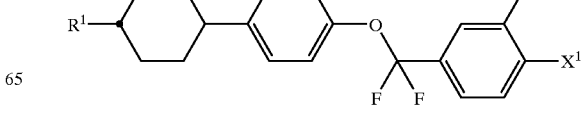

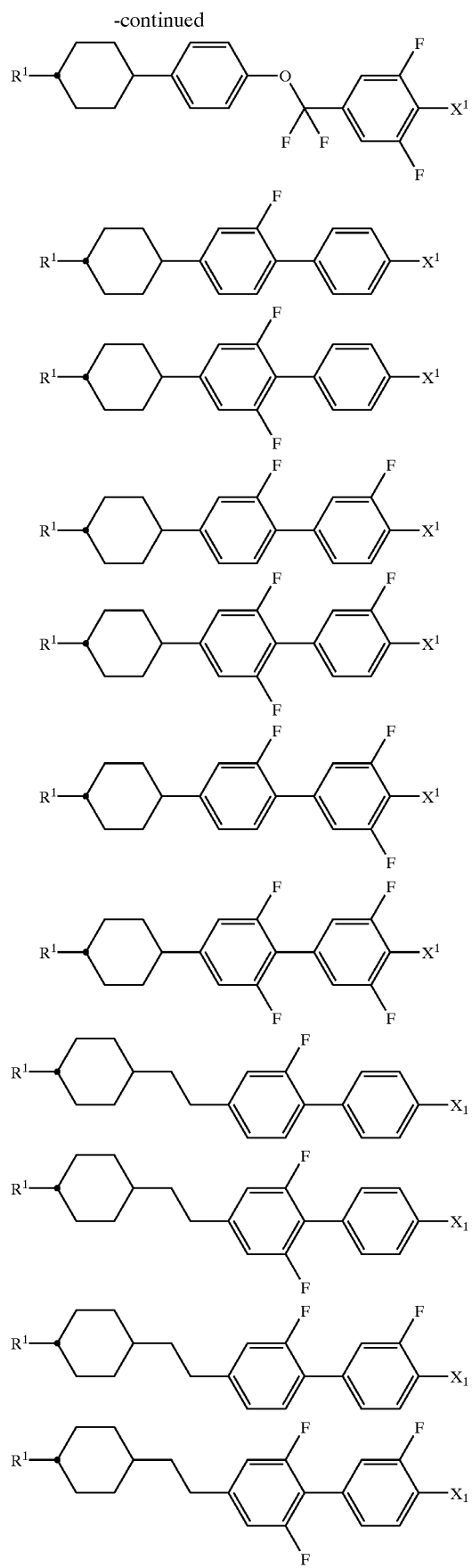
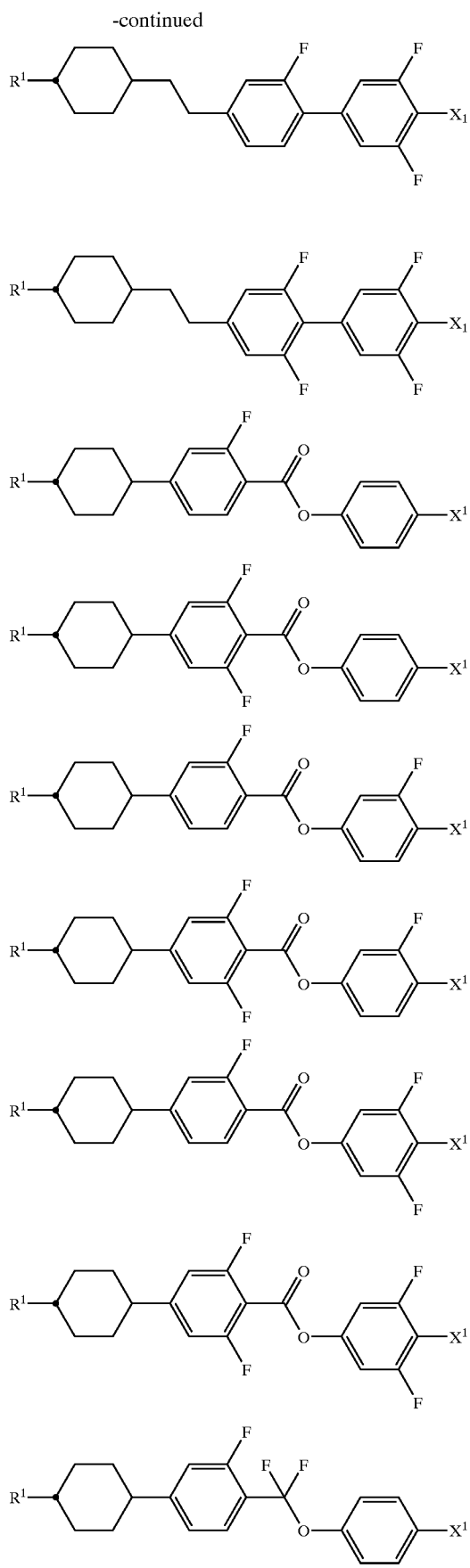

-continued
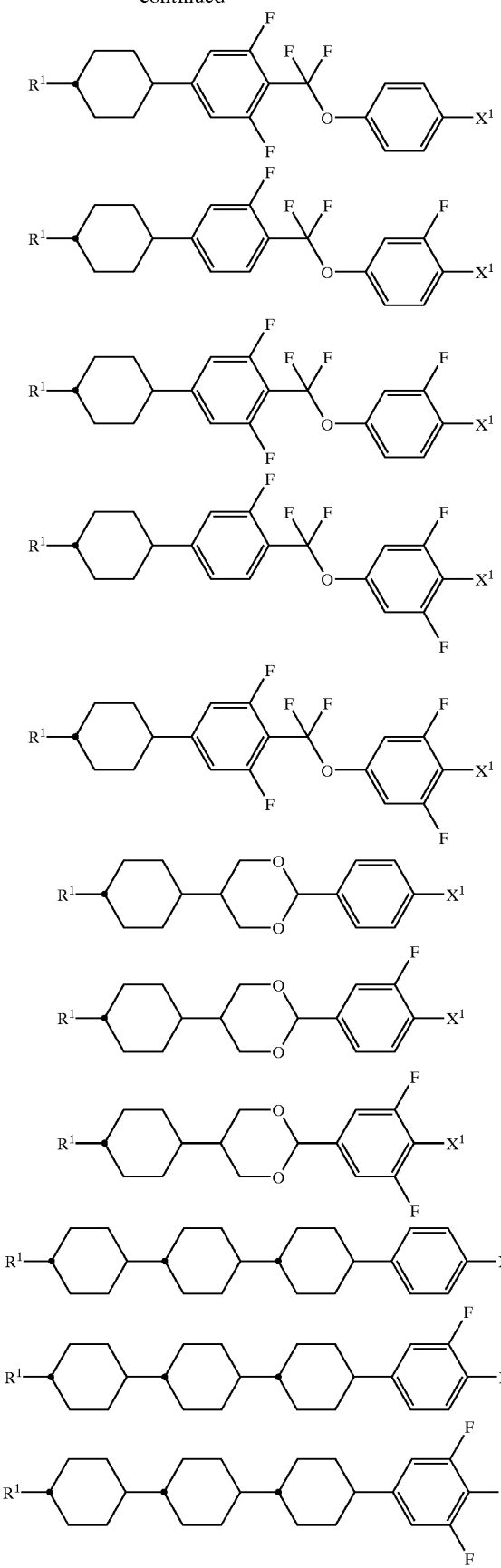
-continued
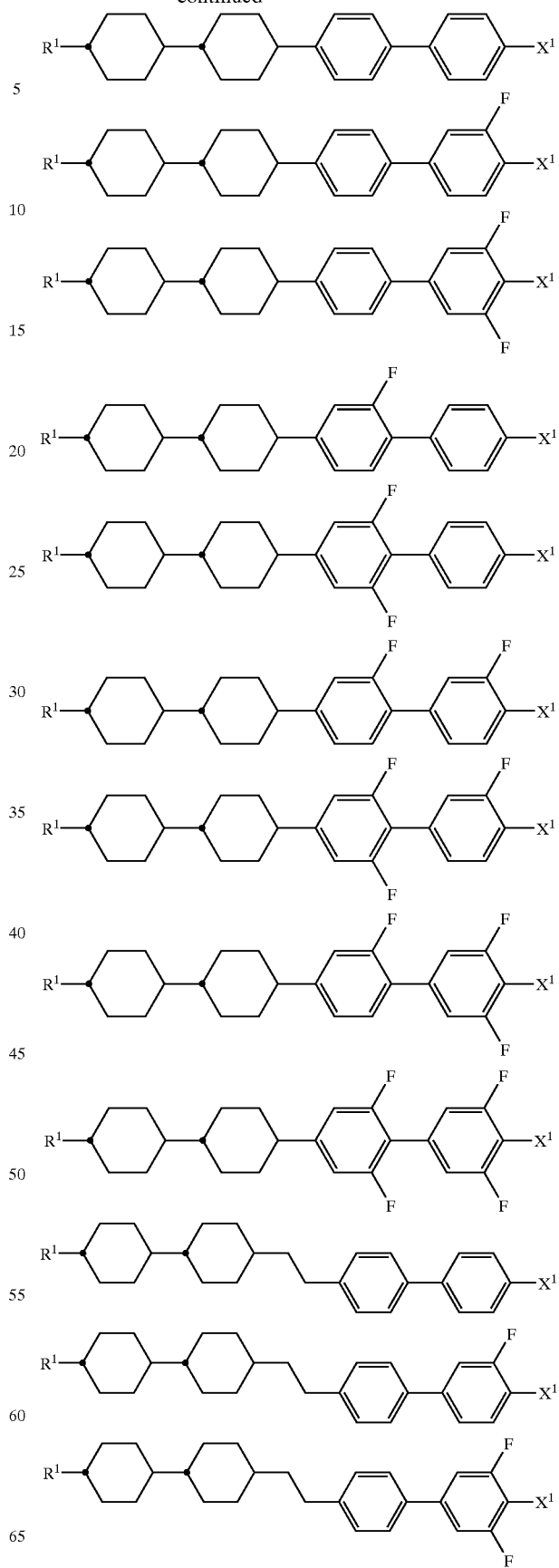

-continued

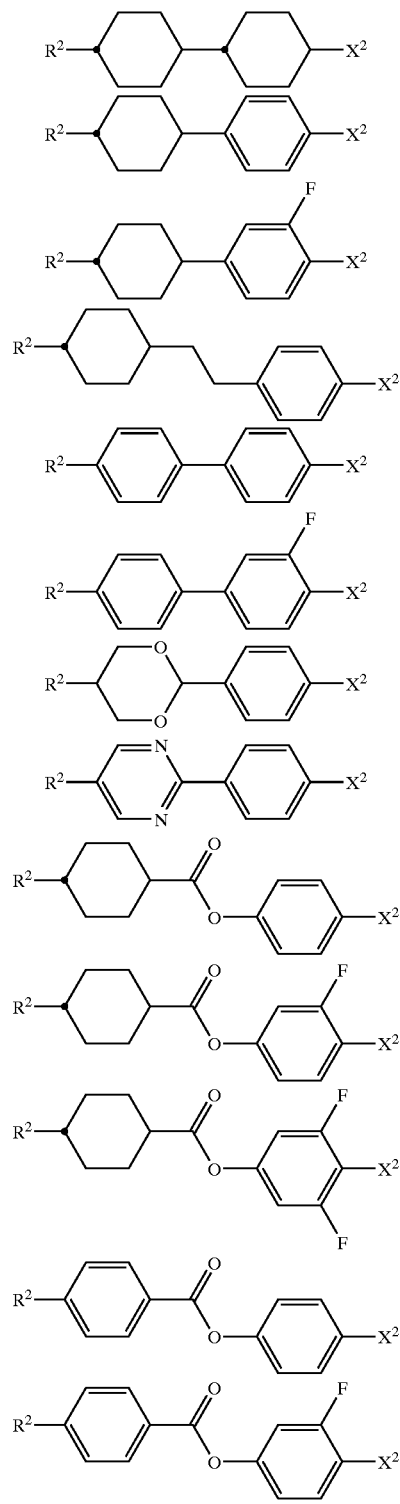

In the above formulas, $R^1$ and $X^1$ denote the same meaning as mentioned above.

The compounds represented by the formulas (9) to (11) have a positive dielectric anisotropy, very excellent thermal and chemical stability, and they are very useful in the preparation of a liquid crystal composition for TFT in which a high reliability is especially required such as high voltage holding ratio and high specific resistance.

In the preparation of the liquid crystal composition for TFT, the used amount of the compound represented by the formulas (9) to (11) ranges from 0.1 to 99.9% by weight, preferably 10 to 97% by weight, more preferably 40 to 95% by weight, based on the total weight of the liquid crystal composition. The compound represented by the formulas (17) to (19) may be further contained for the viscosity adjustment of the composition.

In the preparation of the liquid crystal composition for STN or TN, the compounds represented by the formulas (9) to (11) can be used, but the amount used is preferably not more than 50% by weight.

Regarding the formulas (12) and (13), the following compounds can be recited.

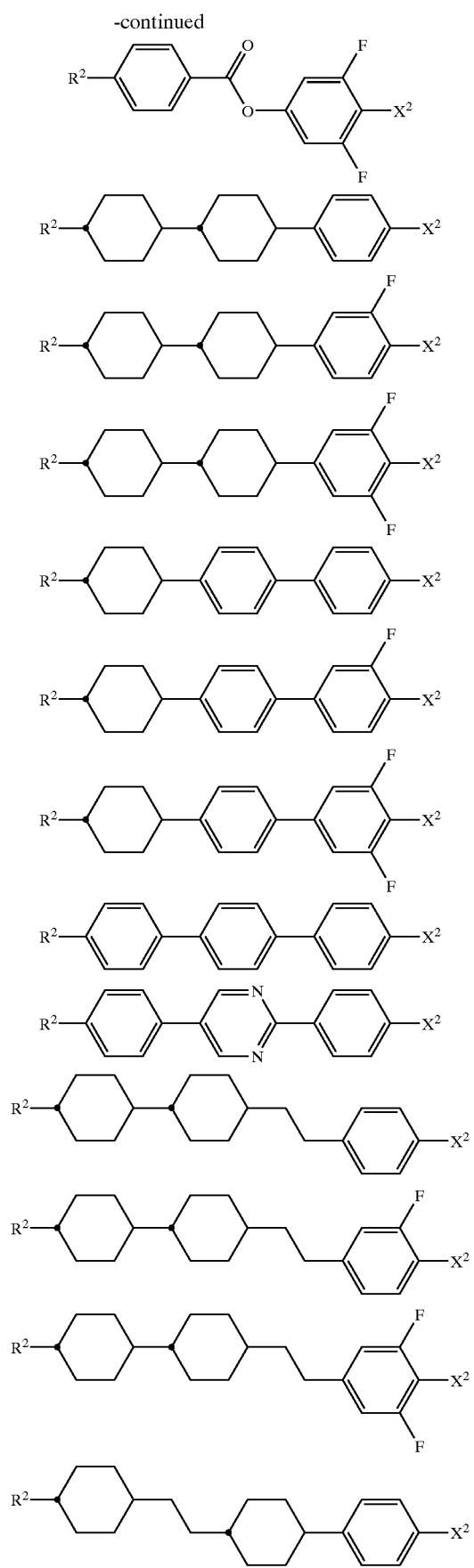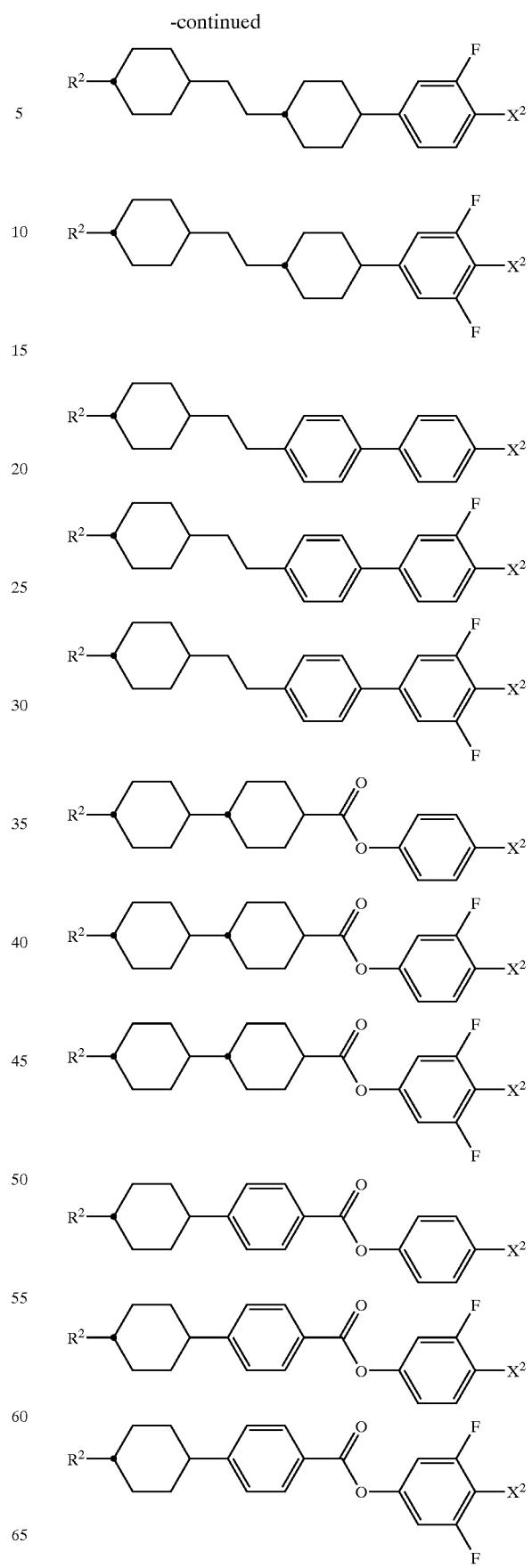

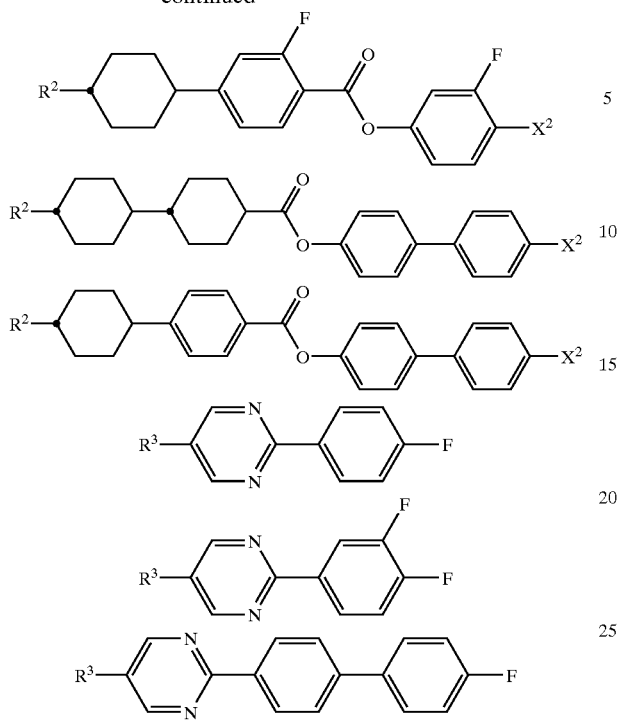

In the above formulas, $R^2$, $R^3$ and $X^2$ denote the same meaning as mentioned above.

The compounds represented by the formulas (12) and (13) have positive and high dielectric anisotropy, and so they are used especially for reducing a threshold voltage of the liquid crystal composition. Further, they are used for adjusting an optical anisotropy, broadening a nematic range such as an increase in clearing point, etc. Furthermore, they are used for improving the steepness in voltage-transmittance characteristics of the liquid crystal composition for STN or TN.

The compounds represented by the formulas (12) and (13) are especially useful for the preparation of the liquid crystal composition for STN or TN.

When the amount of the compound represented by the formulas (12) and (13) increases in the liquid crystal composition, the threshold voltage of liquid crystal composition reduces, but the viscosity increases. Accordingly, it is advantageous for low voltage drive to use these compounds in large quantities, so long as the viscosity of liquid crystal composition satisfies the required value. In the preparation of the liquid crystal composition for STN or TFT, the used amount of the compound represented by the formulas (12) and (13) ranges from 0.1 to 99.9% by weight, preferably 10 to 97% by weight, more preferably 40 to 95% by weight.

Regarding the formulas (14) to (16), the following compounds can be recited.

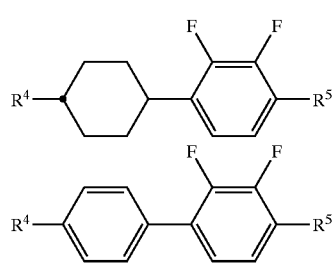

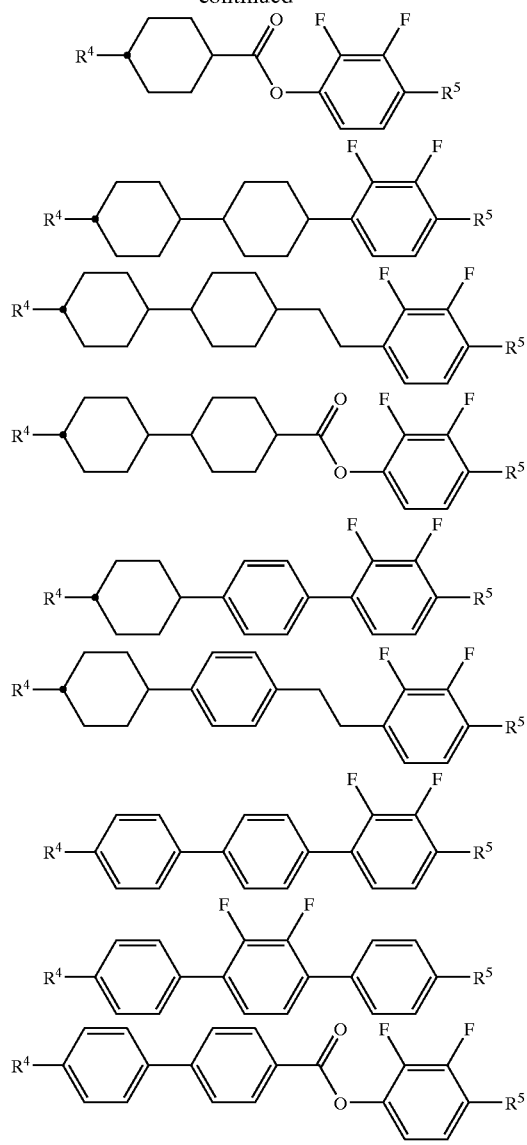

In the above formulas, $R^4$ and $R^5$ denote the same meaning as mentioned above.

The compounds represented by the formulas (14) to (16) are those wherein the dielectric anisotropy is negative. Of these, the compound represented by the formula (14) is a bicyclic compound, and therefore used mainly for the purpose of adjusting a threshold voltage, viscosity and optical anisotropy. The compound represented by the formula (15) is used for the purpose of extending a nematic phase range such as increasing a clearing point, etc., or for the purpose of adjusting an optical anisotropy. The compound represented by the formula (16) is used for the purpose of reducing a threshold voltage and increasing an optical anisotropy, in addition to the purpose of extending a nematic phase range.

The compounds represented by the formulas (14) to (16) are used mainly in the liquid crystal composition wherein the dielectric anisotropy is negative. If the amount used is increased, the threshold voltage of the composition reduces and the viscosity increases. Thus it is preferable to use the compound in small amount, as far as the value required for the threshold voltage is satisfied. However, less than 40% by weight may make a voltage driving impossible, since the absolute value of the dielectric anisotropy is not more than 5.

The amount of compounds of the formulas (14) to (16) used is suitably not less than 40% by weight, preferably 50 to 95% by weight. Optionally, the compounds represented by the formulas (14) to (16) may be incorporated in the composition wherein the dielectric anisotropy is positive for the purpose of controlling the elastic constant and the voltage-transmittance curve of the composition. In this case, the amount used is preferably not more than 30% by weight.

Regarding the formulas (17) to (19), the following compounds can be recited.

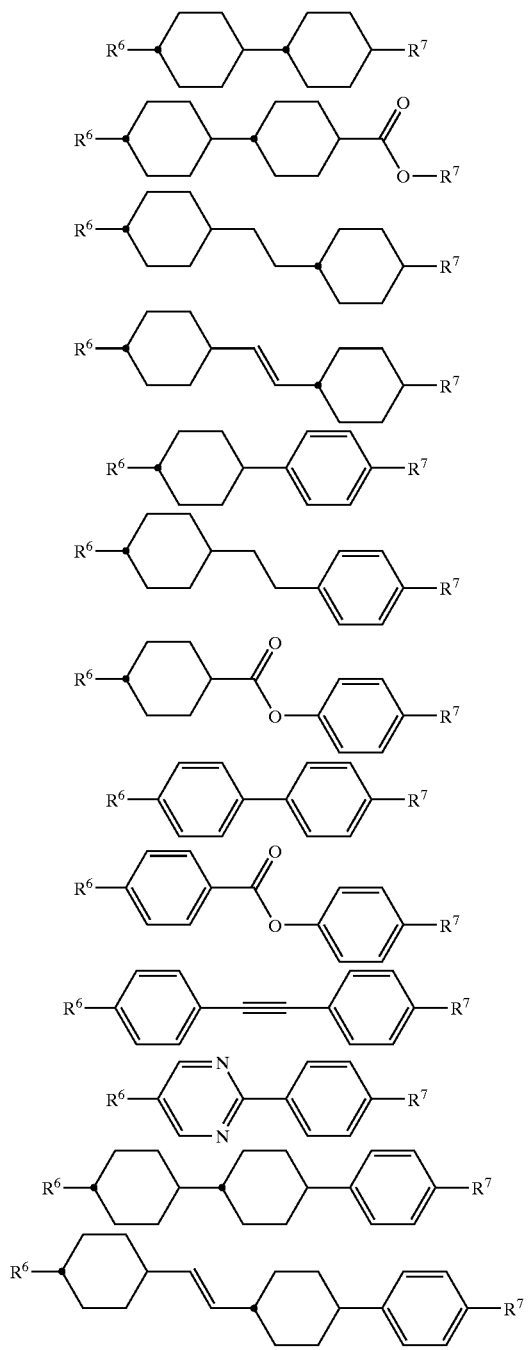

-continued

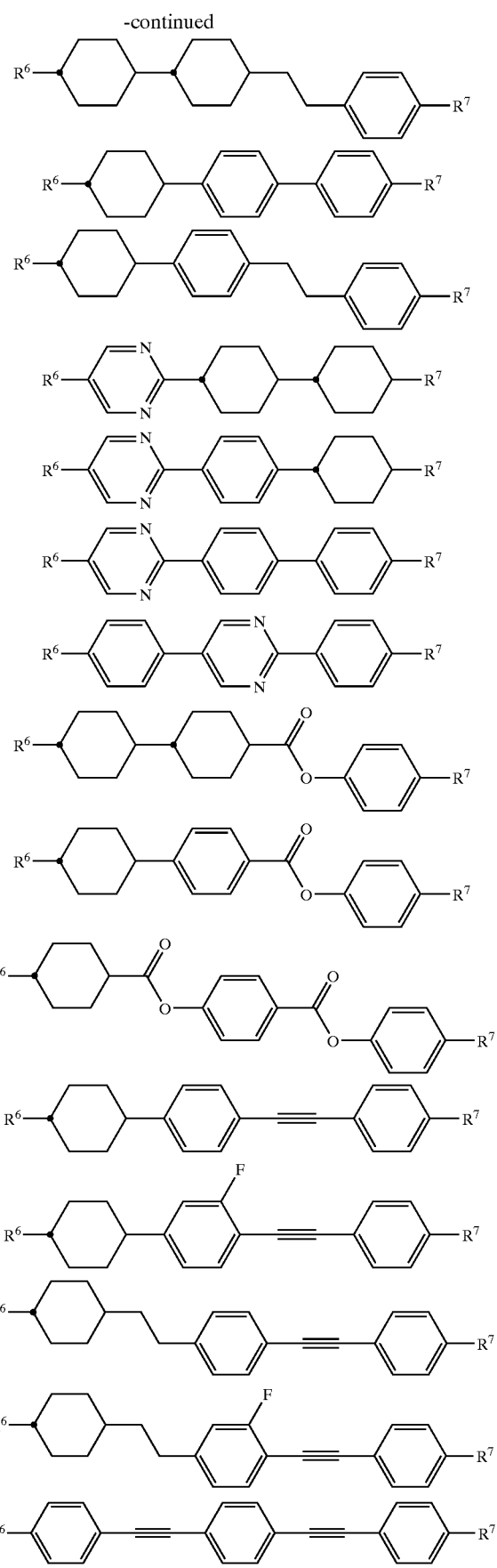

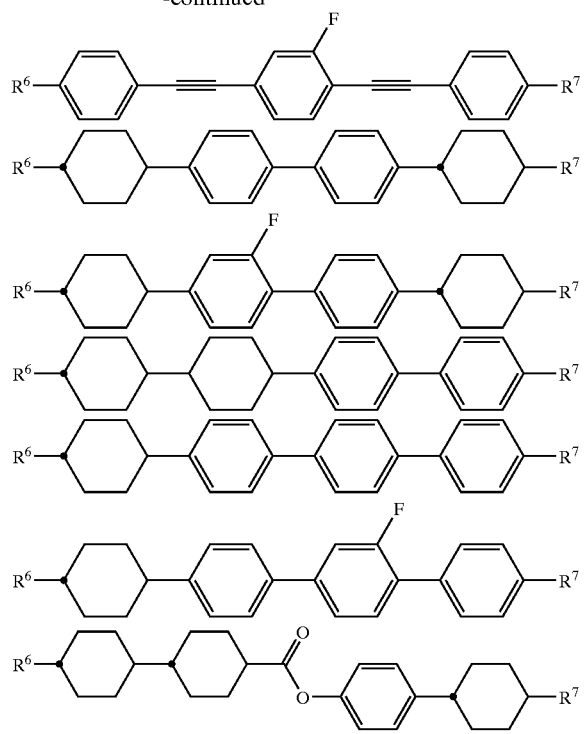

In the above formulas, $R^6$ and $R^7$ denote the same meaning as mentioned above.

The compounds represented by the formulas (17) to (19) are those small in the absolute value of the dielectric anisotropy and close to neutrality. Of these, the compound represented by the formula (17) is used mainly for the purpose of adjusting the viscosity or optical anisotropy. The compounds represented by the formulas (18) and (19) are used for the purpose of extending a nematic phase range such as increasing a clearing point, etc., or adjusting the optical anisotropy.

When the used amount of the compound represented by the formulas (17) to (19) is increased, the threshold voltage of the liquid crystal composition increases and the velocity reduces. Accordingly, it is desirable to use the compounds in large quantities, as long as the value required for the threshold voltage of the liquid crystal composition is satisfied.

In the preparation of the liquid crystal composition for TFT, a suitable amount of the compound represented by the formulas (17) to (19) used is preferably not more than 40% by weight, and more preferably not more than 35% by weight. In the preparation of the liquid crystal composition for STN or TN, a suitable amount of the compound represented by the formulas (17) to (19) used is preferably not more than 70% by weight, and more preferably not more than 60% by weight.

In the liquid crystal display element of the present invention, except for the special case of the liquid crystal composition for OCB (Optically Compensated Birefringence) mode, etc., an optically active compound is usually added for the purpose of adjusting a helical pitch to match a twist angle by inducing a helical structure to the liquid crystal composition, or preventing a reverse twist. For such purpose, any known optically active compounds can be used. The following optically active compounds can be recited as a preferable example.

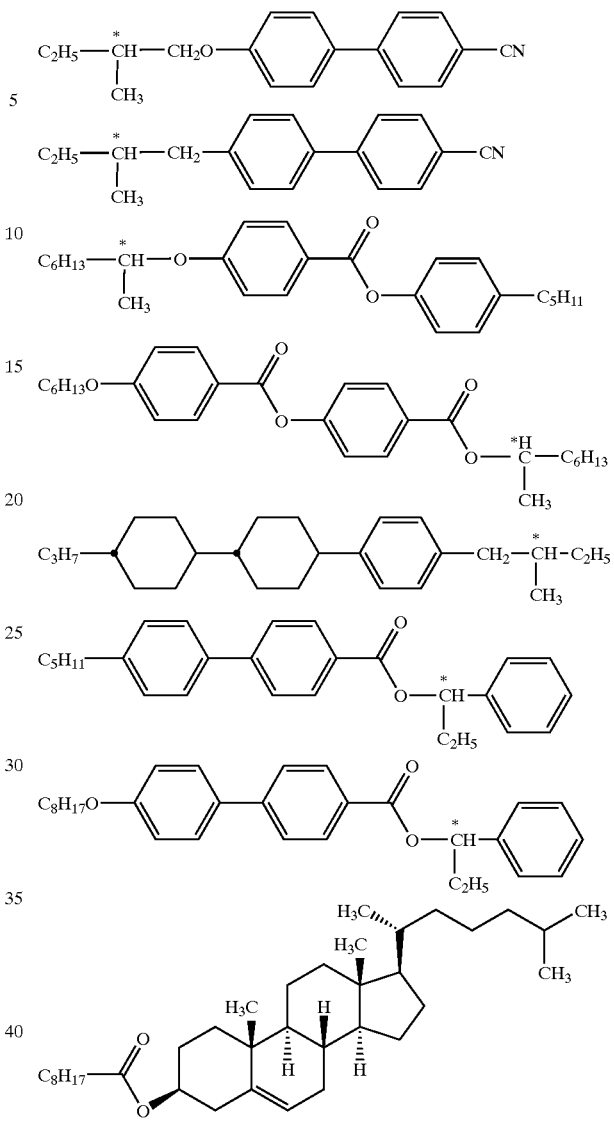

For the liquid crystal composition used in the liquid crystal display element of the present invention, the pitch of twist is usually adjusted by adding these optically active compounds. For the liquid crystal composition for TFT and TN, the twist pitch is preferably adjusted to the range of 40 to 200μm. For the liquid crystal composition for STN, it is preferably adjusted to the range of 6 to 20 μm. For the liquid crystal composition for bistable TN mode, it is preferably adjusted to the range of 1.5 to 4μm.

Further, two or more optically active compounds may be added for the purpose of adjusting a temperature dependence of pitch.

The liquid crystal composition used in the liquid crystal display element of the invention can be generally prepared by methods conventional per se, for example, a method for dissolving various components mutually at elevated temperatures. The liquid crystal display element of the invention is improved and optimized in accordance with the intended use, by adding suitable additives to the liquid crystal composition to be used, if required. Although such additives are well known to those skilled in the art and fully described in the literature, etc., there are usually added a chiral dopant, etc. to induce a helical structure of liquid crystal, and adjust necessary twist angle, preventing a reverse twist. Further, addition of dichroic dyes such as merocyanines, styryls, azo, azomethines, azoxy, quinophthalones, anthraquinones, tetrazines, etc. can prepare a liquid crystal composition for liquid crystal display element of a guest-host (GH) mode.

The liquid crystal compositions of the present invention are also suitably used for a NCAP prepared by microcapsulating a nematic liquid crystal, a polymer dispersed liquid crystal device (PDLCD) represented by a polymer network liquid crystal display device (PNLCD) which is prepared by forming a three-dimensional network polymer in liquid crystals, and further liquid crystal display devices of birefringence controlled mode (ECB) and dynamic scattering (DS) mode.

Examples are given below. In each Example, raw materials used, solvents and polymer ingredients are designated by the abbreviations shown in the following item 1. The amount, proportion and concentration of each component are by weight unless otherwise indicated. The synthesis of the polymer ingredient is performed by the process shown in the following item 2. The formulation of varnish composition for the formation of alignment film is carried out by the method shown in the following item 3. The preparation of cell for the evaluation of alignment film is carried out by the method shown in the following item 4. The evaluation of liquid crystal cell is performed by the method shown in the following item 5.

1. Raw materials used

1) Tetracarboxylic dianhydrides

| | |
|---|---|
| Pyromellitic dianhydride | PMDA |
| Cyclobutane tetracarboxylic dianhydride | CBDA |

2) Dicarboxylic acids

| | |
|---|---|
| Terephthalic acid | TPE |
| 1,4-Dicarboxycyclohexane | DCCh |

3) Diamine compounds

| | |
|---|---|
| 4,4'-Diaminodiphenylmethane | DPM |
| 4,4'-Diaminodiphenylethane | DPEt |
| 4,4'-Diaminodiphenylpropane | DPP |
| 4,4'-Diaminodiphenylether | DPEr |
| 1,1-Bis[4-(4-aminophenylmethyl)phenyl]-4-n-butyl cyclohexane | 4ChB1B |
| 1,1-Bis[4-(4-aminophenylmethyl)phenyl] cyclohexane | ChB1B |
| 1,1-Bis[4-(4-aminophenoxy)phenyl]-4-(4-pentylcyclohexyl)cyclohexane | 5ChChBOB |

4) Solvents

| | |
|---|---|
| N-Methyl-2-pyrrolidone | NMP |
| γ-Butyrolactone | BL |
| Butyl cellosolve | BC |

5) Polymers

| | |
|---|---|
| Polyamic acid A | PA acid A |
| Polyamic acid B | PA acid B |
| Polyamide | PA |
| N-substituted polyamide | NPA |

2. Synthesis of polymers

1) Synthesis of polyamic acid

A four-necked 500 ml flask equipped with a thermometer, a stirrer, an inlet for introducing raw materials and an inlet for introducing nitrogen gas was charged with 4.8908 g of DPM and 120.0 g of dehydrated NMP, and the mixture was stirred and dissolved under dry nitrogen gas stream. While keeping the temperature of the reaction system within the range of 5 to 70° C., 2.6902 g of PMDA and 2.4190 g of CBDA were added and reacted. Subsequently, 70.0 g of butylcellosolve were added and the mixture was reacted for 24 hours to afford 200 g of a polyamic acid (PA acid B1) varnish with a polymer concentration of 5%. The weight average molecular weight of the resultant polymer was found to be 75000.

A varnish of 5% polymer concentration containing a polyamic acid having a molecular weight as shown in Table 1 (PA acids B2, A1 to A4) was prepared in the same manner as mentioned above except for using a combination of the diamine component and the tetracarboxylic acid dianhydride as shown in Table 1.

2) Synthesis of Polyamide

A four-necked 500 ml flask equipped with a thermometer, a stirrer, an inlet for introducing raw materials and an inlet for introducing nitrogen gas was charged with 3.2156 g of TPA, 1.9185 g of DPM and 4.8655 g of 4ChB1B. To the mixture were added 8.663 g of dehydrated NMP and 9.33 g of pyridine, this mixture was elevated to 60° C. to form an uniform solution. To the solution were added sequentially 12.010 g of triphenyl phosphite, 4 g of lithium chloride and 12 g of calcium chloride, and subsequently the mixture was reacted at a temperature of 100 to 140° C. for 24 hours. The resulting reaction solution was reprecipitated once with methanol and once with purified water, and dried under reduced pressure to afford 10 g of a polyamide (PA1). The molecular weight of this polymer was found to be 150000.

A polyamide having a molecular weight as shown in Table 2 (PA2 to PA4) was prepared in the same manner as mentioned above except for using a combination of the dicarboxylic acid and the diamine component as shown in Table 2.

3) Synthesis of N-substituted Polyamides

A four-necked 200 ml flask equipped with a thermometer, a stirrer, an inlet for introducing raw materials and an inlet for introducing nitrogen gas was charged with 5.026 g of polyamide (PAI) and 26.39 g of dehydrated NMP, and the mixture was stirred at room temperature for some time, 0.934 g of sodium hydride was added and stirring was continued for additional 40 minutes. To this solution was 3.037 g of methyl iodide, and the solution was reacted for additional one hour. The resulting reaction solution was reprecipitated once with methanol and once with purified water in the same manner as mentioned in the above item 2), and subsequently dried under reduced pressure to afford N-substituted polyamide (NPA1).

Each N-substituted PA having a molecular weight as shown in Table 3 (NPA2 to NPA4) was prepared in the same manner as mentioned above except for using a combination of the polyamide and the substituent as shown in Table 3. For the NPA4, benzyl bromide was used as a compound providing a substituent.

TABLE 1

Composition of Polyamic Acids A and B
Molar Fraction (mole %)

| Polymer | Tetracarboxylic Acid Dianhydride | | Diamine Component | | | | | Molecular Weight |
|---|---|---|---|---|---|---|---|---|
| | | | Formula (4) | | Formula (6) | | | |
| | PMDA | CBDA | DPM | DPEt | ChB1B | 4ChB1B | 5ChChBOB | |
| PA acid B1 | 25 | 25 | 50 | | | | | 75000 |
| PA acid B2 | | 50 | 50 | | | | | 50000 |
| PA acid A1 | 50 | | 32.5 | | | | 17.5 | 100000 |
| PA acid A2 | 50 | | | 20 | | 30 | | 60000 |
| PA acid A3 | 50 | | 32.5 | | | | 17.5 | 80000 |
| PA acid A4 | 50 | | | 20 | 30 | | | 150000 |

TABLE 2

Composition of Polyamide
Molar Fraction (mole %)

| Polymer | Dicarboxylic Acid | | Diamine Component | | | | Molecular Weight |
|---|---|---|---|---|---|---|---|
| | | | Formula (4) | | Formula (6) | | |
| | TPA | ChDC | DPM | DPEt | 4ChB1B | 5ChChBOB | |
| PA1 | 50 | | 32.5 | | 17.5 | | 150000 |
| PA2 | | 50 | 32.5 | | 17.5 | | 83000 |
| PA3 | 50 | | | 32.5 | | 17.5 | 200000 |
| PA4 | 50 | | 32.5 | | 17.5 | | 135000 |

TABLE 3

Composition of N-substituted Polyamide
Molar Fraction (mole %)

| Polymer | Dicarboxylic Acid | | Diamine Component | | | | Substituent | Molecular Weight |
|---|---|---|---|---|---|---|---|---|
| | | | Formula (4) | | Formula (6) | | | |
| | TPA | ChDC | DPM | DPEt | 4ChB1B | 5ChChBOB | | |
| NPA1 | 50 | | 32.5 | | 17.5 | | Methyl | 70000 |
| NPA2 | | 50 | 32.5 | | 17.5 | | Methyl | 100000 |
| NPA3 | 50 | | | 32.5 | | 17.5 | Methyl | 63000 |
| NPA4 | 50 | | 32.5 | | 17.5 | | Benzyl | 65000 |

3. Formulation of Varnish for Aligning Film Preparation
1) Formulation of Polyamic Acid Varnish The varnish with 5% polymer concentration prepared in the above item 2.1) was diluted to 3% polymer concentration to prepare a varnish for aligning film preparation.

2) Formulation of Polyamide Varnish

The polyamide prepared in the above item 2.2) was initially dissolved in NMP, to which BC was added to formulate a varnish comprising 5% polyamide, 60% NMP and 35% BC which was then diluted to prepare a varnish for aligning film preparation with 3% polyamide concentration.

3) For N-substituted polyamide alone

A varnish was formulated in the same manner as mentioned in 2) above.

4) Formulation of Mixed Varnish

Initially, individual varnish solution with 5% polymer concentration which was formulated every polymer ingredients was mixed under the ratio shown in the column of polymer composition in the table relating to each Example (including Comparative Example). Subsequently, the mixture was diluted to 3% polymer concentration to prepare a varnish for aligning film preparation.

4. Preparation of Cell for Aligning Film Evaluation

1) Preparation of Cell for Evaluation of Residual Charge and Voltage Holding Ratio Each coating varnish was coated with a spinner on a transparent electrode (a glass substrate provided with ITO), which was then pre-baked at 80° C. for about 5 minutes, and heat-treated at 200° C. for 30 minutes to prepare an aligning film. The surface of the substrate having the aligning film formed thereon was rubbed with a rubbing apparatus to carry out an alignment treatment. Subsequently, a gap material for 7 μm was sprayed to the substrate, and the circumference excluding a liquid crystal injecting hole was sealed with an epoxy curing agent while placing the aligning film-formed surface inside to prepare an anti-parallel cell of 7 μm gap.

Into this cell, a liquid crystal composition comprising the following components (NI point: 81.3° C., birefringence rate: 0.092) was injected, the injecting hole was sealed with a light curing agent, and cured with UV irradiation. Subsequently, heat-treatment was performed at 110° C. for 30 minutes, to prepare a cell for the evaluation of residual charge and voltage holding ratio.

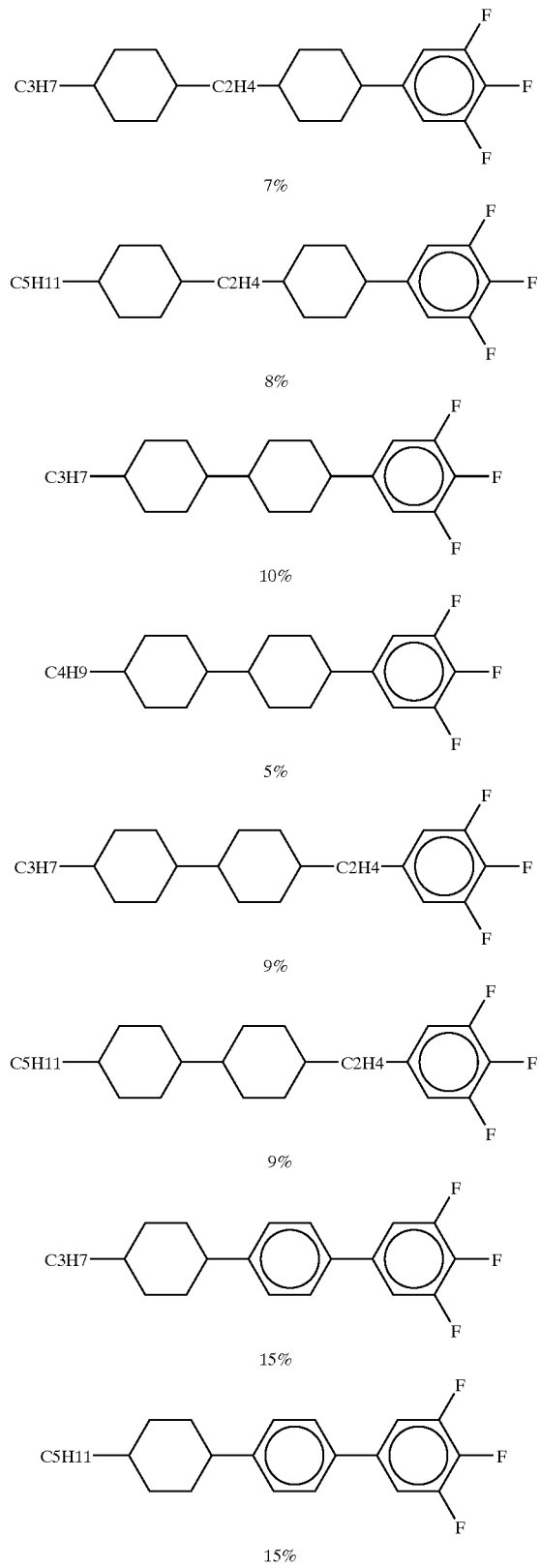

2) Preparation of Cell for Image Sticking Evaluation

By the same procedure as mentioned above for the preparation of cell for the evaluation of residual charge and voltage holding ratio, but replacing a gap material for 7 μm by a gap material for 9 μm, replacing a liquid crystal composition by the composition further containing 0.25% cholesteryl nonanoate as a chiral agent and replacing an anti-parallel cell by 90° twist cell, preparation of a cell of 9 μm gap, injection of a liquid crystal composition and subsequent treatment were carried out to prepare a cell for the evaluation of image sticking.

3) Preparation of Cell for Pre-tilt Angle Measurement

By the same procedure as mentioned above for the preparation of cell for the evaluation of residual charge and voltage holding ratio, but using a gap material for 20 μm instead of a gap material for 7 μm, preparation of an anti-parallel cell having a cell thickness of 20 μm, injection of a liquid crystal composition and subsequent treatment were carried out to prepare a cell for the measurement of pre-tilt angle.

5. Evaluation of Liquid Crystal Cell

1) Method of Measuring Residual Charge

Figure 1:
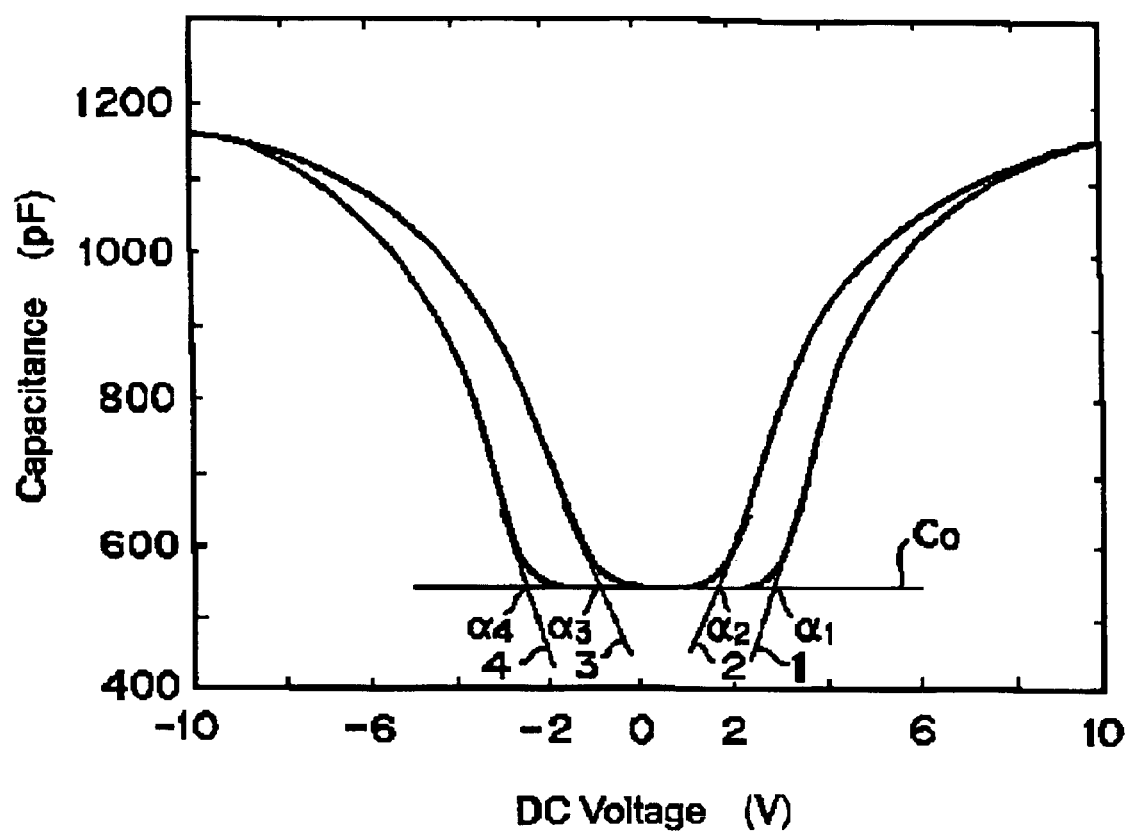
FIG. 1 is a graphical diagram of capacitance verses DC voltage showing a C-V hysteresis.
Figure 2:
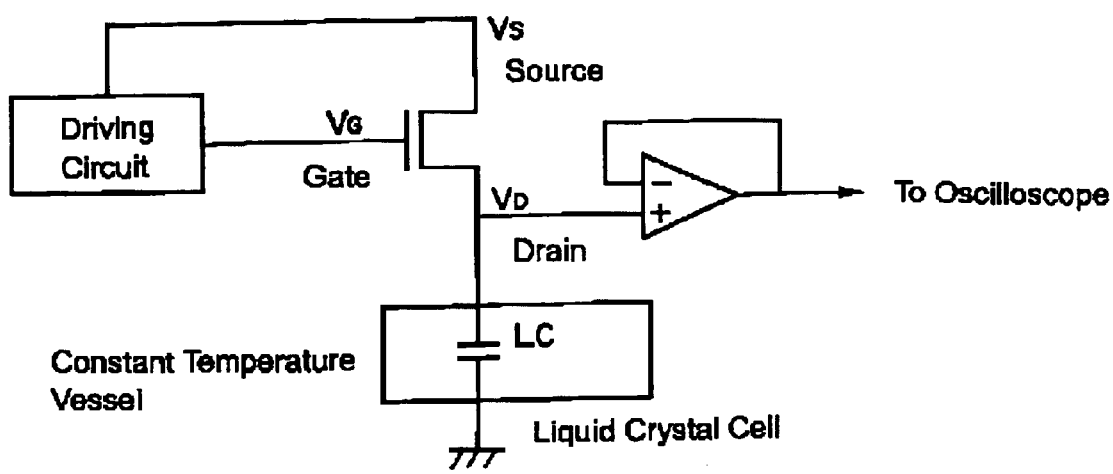
FIG. 2 is a circuit diagram for measuring voltage bolding ratios.

FIG. 1 is a diagram showing a C-V hysteresis, FIG. 2 is a circuit diagram used for measuring voltage holding ratios and FIG. 3 is a diagram showing a square wave Vs of a gate pulse width of 69 µs, a frequency of 60 HZ and an amplitude of ±4.5V and a wave form Vd read from an oscilloscope when Vs is applied to the source of a circuit shown in FIG. 2. The residual charge was determined by measuring the C-V characteristics shown in FIG. 1. More specifically, an alternating current of 50 mV and 1 kHZ was applied to a liquid crystal cell, on which triangular waves of a direct current (DC) having a frequency of 0.0036 Hz were overlapped, and the DC voltages were swept as 0V→+10V→0V→−10V→0V and the width of hysteresis shown in FIG. 1 was determined as a residual charge from the following equation. The measurement of residual charge was carried out at 60° C.

Residual charge $(V) = (|\alpha 1 - \alpha 2| + |\alpha 4 - \alpha 3|)/2$

2) Measuring Method of Voltage Holding Ratio

The voltage holding ratio was determined by reading from an oscilloscope the drain voltage ($V_D$) varied by applying square waves (Vs) of gate width 69 µs, frequency 60 HZ and amplitude ±4.5V, as FIGS. 1 and 2 show.

If the voltage holding ratio is 100%, $V_D$ shown in FIG. 3 will be rectangular as shown by dotted lines, but normally it decreases as shown by the solid line gradually approaching 0.

The voltage holding ratio was calculated from the area indicated by oblique lines and the area indicated by dotted lines, and is expressed by the percentage of the area indicated by oblique lines. Therefore, 100% is the maximum value of the voltage holding ratio. The measurement of voltage holding ratio was carried out at 60° C.

3) Evaluation Method of Image Sticking

DC voltage 5V was applied at 60° C. for 3 hours to the cell for image sticking evaluation as prepared above. Subsequently, AC voltage 4V (frequency 0.01 HZ) was applied at a room temperature, and an occurrence of image sticking was evaluated by visual observation under crossed nicols. Evaluation of image sticking was judged as follows. ○: No image sticking Δ: with some image sticking X: with image sticking

4) Measuring Method of Pre-tilt Angle

A pre-tilt angle of liquid crystal was measured by conventional crystal rotation method.

5) Evaluation Method of Coating Property

An occurrence of cissing was evaluated upon coating the varnish on a transparent electrode with a spinner which was effected in the preparation of cell for evaluation of aligning film as mentioned above. The acceptance criterion is as follows. ○: no cissing Δ: occurrence of cissing in the periphery of substrate X: cissing concentrated in the center area of substrate or with its tendency

6) Evaluation Method of Alignment Property

The alignment property was evaluated by observing the cell used in the measurement of pre-tilt angle under polarizing microscope for the presence or absence of domain. The domain is not practical at the level of Δ. ○: No domain Δ: with domain (few) X: with domain (many)

COMPARATIVE EXAMPLES 1 to 11

A varnish with a 3% concentration containing singly, as a polymer ingredient, each polymer shown in the column of polymer in Table 4 was used to prepare a cell for evaluation of aligning film by the method mentioned in the above item 4. The resultant cell was evaluated by the method mentioned in the above item 5. Regarding the cell for which the pre-tilt angle could not be measured because of its poor alignment property, an evaluation for other items was ceased.

As is evident from the evaluation results in Table 4, when the varnish containing singly each polymer outside the scope of the present invention was used as an aligning film material, undesirable effects are inevitable. Of the properties of liquid crystal cell, especially the image sticking and alignment property become poor and the coating property upon the preparation of liquid crystal cell becomes poor.

TABLE 4

Evaluation of Each Polymer

| Comparative Example No. | Polymer | pretilt Angle (°) | Voltage Holding Ratio (%) | Residual Charge (mV) | Image Sticking | Alignment Property | Coating Property |
|---|---|---|---|---|---|---|---|
| 1 | PA acid B1 | 1.0 | 98.0 | 180 | x | ○ | ○ |
| 2 | PA acid A1 | 5.7 | 96.2 | 580 | x | ○ | ○ |
| 3 | PA acid A2 | 2.8 | 96.5 | 630 | x | ○ | ○ |
| 4 | PA acid A3 | 7.5 | 95.5 | 840 | x | ○ | ○ |
| 5 | PA1 | 7.0 | 94.1 | 433 | x | ○ | Δ |
| 6 | PA2 | 4.8 | 94.8 | 358 | x | ○ | Δ |
| 7 | PA3 | 7.5 | 93.8 | 682 | x | ○ | Δ |
| 8 | NPA1*1 | NM | — | — | — | x | ○ |
| 9 | NPA2*1 | NM | — | — | — | x | ○ |
| 10 | NPA3*1 | NM | — | — | — | x | ○ |
| 11 | NPA4*1 | NM | — | — | — | x | ○ |

NM: Not measurable
*1: Regarding the pretilt of the sample used herein, an interference peak does not come out, resulting in incapability of calculation (A poor alignment is considered to be the cause.).

COMPARATIVE EXAMPLES 12 TO 23

The formulation of varnish, preparation of cell evaluation of the resultant cell were carried out in the same manner as in Comparative Examples 1 to 11, but changing a polymer ingredient from a polymer alone to a mixed system of two polymers shown in the column of polymer composition in Table 5.

The mixed system of polymers is divided broadly into the first group wherein polyamic acid B was mixed with polyamic acid A having a pendant group (Comparative Examples 12 to 18) and the second group wherein polyamic acid B was mixed with polyamide or N-substituted polyamide (Comparative Examples 19 to 23), which are outside the scope of the present invention.

As is evident from the evaluation result in Table 4, the first group was considerably improved in voltage holding ratio and residual charge, but in the image sticking, it is still in problem level.

Of the second group, the group wherein polyamic acid B was mixed with polyamide (Comparative Examples 22, 23) has a defect in the alignment property, in addition to increased residual charge. The group wherein polyamic acid B was mixed with N-substituted polyamide (Comparative Examples 19, 20, 21) has small residual charge, good image sticking, but has still a defect in the alignment property of liquid crystal.

TABLE 5

Comparative Example: Evaluation of Mixed System

| Comp. Examp. No. | Polymer Composition PA acid B/Mixed Polymer = mixed ratio (weight ratio) | pretilt Angle (°) | Voltage Holding Ratio (%) | Residual Charge (mV) | Image Sticking | Alignment Property | Coating Property |
|---|---|---|---|---|---|---|---|
| 12 | PA acid B1/PA acid A1 = 90/10 | 6.3 | 98.2 | 9 | x | ○ | ○ |
| 13 | PA acid B1/PA acid A1 = 80/20 | 6.2 | 98.0 | 21 | x | ○ | ○ |
| 14 | PA acid B1/PA acid A2 = 90/10 | 2.6 | 98.2 | 10 | x | ○ | ○ |
| 15 | PA acid B1/PA acid A2 = 80/20 | 3.1 | 97.9 | 25 | x | ○ | ○ |
| 16 | PA acid B1/PA acid A3 = 90/10 | 9.1 | 97.8 | 18 | x | ○ | ○ |
| 17 | PA acid B1/PA acid A3 = 80/20 | 8.9 | 97.5 | 75 | x | ○ | ○ |
| 18 | PA acid B3/PA acid A1 = 90/10 | 6.2 | 98.1 | 35 | x | ○ | ○ |
| 19 | PA acid B1/NPA1 = 90/10 | 2.2 | 98.4 | 10 | ○ | Δ | ○ |
| 20 | PA acid B1/NPA2 = 90/10 | 2.3 | 98.5 | 4 | ○ | Δ | ○ |
| 21 | PA acid B1/NPA3 = 90/10 | 4.5 | 98.3 | 20 | ○ | Δ | ○ |
| 22 | PA acid B1/PA1 = 90/10 | 1.8 | 97.5 | 121 | x | Δ | ○ |
| 23 | PA acid B1/PA2 = 90/10 | 1.6 | 97.8 | 155 | x | Δ | ○ |

EXAMPLES 1 TO 6

The formulation of varnish, preparation of cell evaluation of the resultant cell were carried out in the same manner as in Comparative Examples 1 to 11, but replacing a polymer ingredient by the ingredient within the scope of the present invention, for example, a mixed system three polymers shown in the column of polymer composition Table 6.

As is evident from the evaluation result in Table 6, all examples show excellent properties over all evaluation items and provide a liquid crystal aligning film of well-balanced properties.

TABLE 6

Example: Evaluation of Mixed System

| Examp. No. | Varnish Composition (Wt. %) PA Acids | | | | | pretilt Angle (°) | Voltage Holding Ratio (%) | Residual Charge (mV) | Image Sticking | Alignment Property | Coating Property |
|---|---|---|---|---|---|---|---|---|---|---|---|
| | B1 | B2 | A3 | A4 | NPA1 | | | | | | |
| 1 | 90 |    | 5  |    | 5  | 8.2 | 99.2 | 4  | ○ | ○ | ○ |
| 2 | 85 |    | 5  |    | 10 | 9.2 | 98.9 | 6  | ○ | ○ | ○ |
| 3 | 80 |    | 5  |    | 15 | 9.5 | 98.8 | 9  | ○ | ○ | ○ |
| 4 | —  | 85 | 5  |    | 10 | 8.5 | 98.3 | 13 | ○ | ○ | ○ |
| 5 | —  | 80 | 10 |    | 10 | 9.5 | 98.0 | 22 | ○ | ○ | ○ |
| 6 | 80 |    |    | 5  | 10 | 2.4 | 98.5 | 4  | ○ | ○ | ○ |

EXAMPLES 6', 7 to 15

The formulation of varnish, preparation of cell and evaluation of the resultant cell were carried out in the same manner as in Examples 1 to 6, but changing kinds and mixed ratios of polyamic acids B, polyamic acids A and N-substituted polyamides.

As is evident from the evaluation result in Table 7, all examples show excellent properties over all evaluation items and provide a liquid crystal aligning film of well-balanced properties.

Examples 6', 7 and 8 show small value in the pre-tilt angle, but such result is clearly due to the fact that the amount of polyamic acids A mixed is little.

This shows that the amount of polyamic acids A mixed should better be increased if larger pre-tilt angle is desired. In other words, it shows that a desired adjustment of pre-tilt angle can be performed by varying the amount of polyamic acids A mixed.

polyamic acid B1 constant and changing the mixed ratio of polyamic acid A1 and N-substituted polyamide (Examples 16 to 19).

Regarding the varnish wherein the mixed ratio of either polyamic acid A1 or N-substituted polyamide is 0, the evaluation was carried out in the same manner as mentioned above (Comparative Examples 24 and 25).

As is evident from the evaluation result in Table 8, Examples 16 to 19 show excellent properties over all evaluation items and provide a liquid crystal aligning film of well-balanced properties.

On the other hand, Comparative Examples 24 and 25 showed similar defects as in the Comparative Examples already mentioned.

TABLE 7

Example: Evaluation of Mixed System

| Examp. No. | Varnish Composition (Wt. %) PA Acids | | | | NPA3 (NPA4) | pretilt Angle (°) | Voltage Holding Ratio (%) | Residual Charge (mV) | Image Sticking | Alignment Property | Coating Property |
|---|---|---|---|---|---|---|---|---|---|---|---|
| | B1 | A2 | NPA1 | NPA2 | | | | | | | |
| 6 | 94 | 1 | 5 | | | 2.7 | 99.2 | 4 | ○ | ○ | ○ |
| 7 | 89 | 1 | 10 | | | 2.7 | 98.8 | 9 | ○ | ○ | ○ |
| 8 | 79 | 1 | 20 | | | 2.5 | 98.1 | 13 | ○ | ○ | ○ |
| 9 | 82 | 8 | 10 | | | 5.3 | 99.1 | 23 | ○ | ○ | ○ |
| 10 | 72 | 8 | 20 | | | 5.4 | 98.5 | 17 | ○ | ○ | ○ |
| 11 | 68 | 12 | 20 | | | 5.9 | 98.2 | 26 | ○ | ○ | ○ |
| 12 | 80 | 15 | 5 | | | 6.4 | 98.3 | 8 | ○ | ○ | ○ |
| 13 | 80 | 10 | | 10 | | 5.4 | 99.4 | 4 | ○ | ○ | ○ |
| 14 | 80 | 10 | | | 10 | 7.8 | 98.8 | 10 | ○ | ○ | ○ |
| 15 | 80 | 10 | | | (10) | 6.0 | 98.6 | 8 | ○ | ○ | ○ |

EXAMPLES 16 TO 19, COMPARATIVE EXAMPLES 24 AND 25

The formulation of varnish, preparation of cell evaluation of the resultant cell were carried out in the same manner as in Examples 1 to 6, but making the concentration of

TABLE 8

Examples & Comparative Examples: Evaluation of Mixed System

| Examp. & Comp. Examp. No. | Varnish Composition (Wt. %) PA Acids | | | pretilt Angle (°) | Voltage Holding Ratio (%) | Residual Charge (mV) | Image Sticking | Alignment Property | Coating Property |
|---|---|---|---|---|---|---|---|---|---|
| | B1 | A1 | NPA3 | | | | | | |
| Comp. 24 | 80 | 20 | 0 | 6.2 | 98.0 | 21 | x | ○ | ○ |
| Examp. 16 | 80 | 16 | 4 | 6.0 | 98.6 | 16 | ○ | ○ | ○ |
| Examp. 17 | 80 | 12 | 8 | 5.9 | 98.8 | 13 | ○ | ○ | ○ |
| Examp. 18 | 80 | 8 | 12 | 5.6 | 98.8 | 17 | ○ | ○ | ○ |
| Examp. 19 | 80 | 4 | 16 | 5.4 | 99.0 | 18 | ○ | ○ | ○ |
| Comp. 25 | 80 | 0 | 20 | 5.1 | 98.5 | 20 | ○ | Δ | ○ |

Industrial Applicability

As explained above, the present invention can provide a varnish composition which can achieve well-balanced improvements in various properties including electrical properties such as residual charge, a voltage holding ratio and image sticking, a pre-tilt angle, coating property alignment property, and so on, which are desired for a liquid crystal aligning film formed.

What is claimed is:

1. A varnish composition which comprises:

a polymer ingredient containing polyamic acid B represented by formula (1):

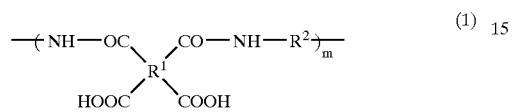

wherein $R^1$ is a tetravalent organic radical derived from tetracarboxylic acids, and $R^2$ is a divalent organic radical derived from diamines, and m is a natural number;

a polyamic acid A represented by formula (2), having a side chain of not less than 3 carbon atoms:

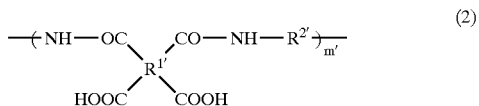

wherein $R^{1'}$ is a tetravalent organic radical derived from tetracarboxylic acids, $R^{2'}$ is a divalent organic radical derived from diamines, at least one of the tetravalent and divalent organic radicals has a side chain of not less than 3 carbon atoms, and m' is a natural number;

an N-substituted polyamide represented by formula (3):

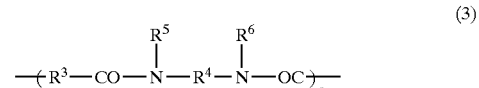

wherein $R^3$ is a divalent organic radical derived from dicarboxylic acids; $R^4$ is a divalent organic radical derived from diamines; $R^5$ and $R^6$ represent a monovalent organic radical or hydrogen in which the percentage of the substitution of the monovalent organic radical is not less than 30% and the organic radical may be plural species, and n is a natural number; and a solvent for dissolving the polymer ingredients so that the varnish composition contains 0.1 to 40% by weight of the polymer ingredient.

2. The varnish composition of claim 1 wherein the polymer ingredient contains 10 to 99.8% by weight of the polyamic acid B represented by formula (1), and 0.2 to 90% by weight of the combination of the polyamic acid A represented by formula (2) and the N-substituted polyamide represented by formula (3), based on the total amount of the polymer ingredient.

3. The varnish composition of claim 1 wherein the polymer ingredient contains the polyamic acid B represented by formula (1) in the range of 40 to 98% by weight, the polyamic acid A represented by formula (2) and the N-substituted polyamide represented by formula (3), in the range of 1 to 59% by weight respectively, based on the total amount of the polymer ingredient.

4. The varnish composition of any one of claims 1, 2 or 3 wherein $R^1$ in the formula (1) contains as an essential component a tetravalent organic radical derived from alicyclic tetracarboxylic acids.

5. The varnish composition of any one of claims 1, 2 or 3 wherein $R^1$ in the formula (1) contains 10 to 100 mole % of a tetravalent organic radical of an alicyclic system, based on the total amount of the tetravalent organic radical $R^1$ derived from tetracarboxylic acids, and $R^2$ contains as a main component at least one of radicals represented by formula (4):

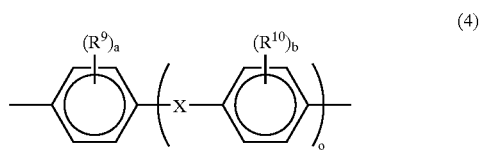

wherein X represents a single bond, $CH_2$, $CH_2CH_2$, $CH_2CH_2CH_2$, $CH_2CH_2CH_2CH_2$, or $C(CH_3)_2$, $R^9$ and $R^{10}$ each independently represent hydrogen or a lower alkyl group, a and b are individually 1 to 2, and o is 0 to 3, provided that when o is 2 to 3, and each X may be the same or different from each other.

6. The varnish composition of any one of claims 1, 2 or 3 wherein $R^1$ in formula (1) contains 10 to 100 mole % of a tetravalent radical derived from cyclobutane tetracarboxylic acids, based on the total amount of the tetravalent organic radical $R^1$ derived from tetracarboxylic acids, and $R^2$ contains as a main component at least one of radicals selected from divalent radicals derived from 4,4'-diaminodiphenylmethane, 4,4'-diaminodiphenylethane, 1,4-bis[2-(4-aminophenyl)ethyl]benzene, 1,4-bis(4-aminophenyl-methyl)benzene, 1,3-bis[4-(4-aminophenylmethyl)phenyl]propane, or bis[4-(4-aminophenyl-methyl)phenyl]methane.

7. The varnish composition of any one of claims 1, 2 or 3 wherein $R^{1'}$ in formula (2) contains as an essential component a tetravalent organic radical derived from aromatic or/and alicyclic or/and aliphatic tetracarboxylic acids.

8. The varnish composition of claim 7 wherein $R^{2'}$ in formula (2) is a divalent organic radical having a side chain group of not less than 3 carbon atoms and the content of the radical is 1 to 100 mole % based on the total amount of the divalent organic radical $R^2$.

9. The varnish composition of any one of claims 1, 2 or 3 wherein:

$R^3$ in formula (3) contains as a main component at least one divalent organic radical derived from dicarboxylic acids selected from the group consisting of terephthalic acid, isoterephthalic acid, 1,4-cyclohexanedicarboxylic acid, 4,4'-biphenyldicarboxylic acid, 4,4'-diphenylmethanedi-carboxylic acid, 4,4'-diphenylethanedicarboxylic acid, 4,4'-diphenylpropanedicarboxylic acid, 4,4'-diphenylhexafluoropropanedicarboxylic acid, 2,2-bis(phenyl) propanedicarboxylic acid, 4,4'-terphenyldicarboxylic acid, 2,6-naphthalenedicarboxylic acid, and 2,5-pyridinedicarboxylic acid, and $R^4$ contains:

a) 1 to 100 mole % of at least one divalent organic radical represented by the following formulas (5-1) to (5-4), (6), (7), or (8):

(5-1)
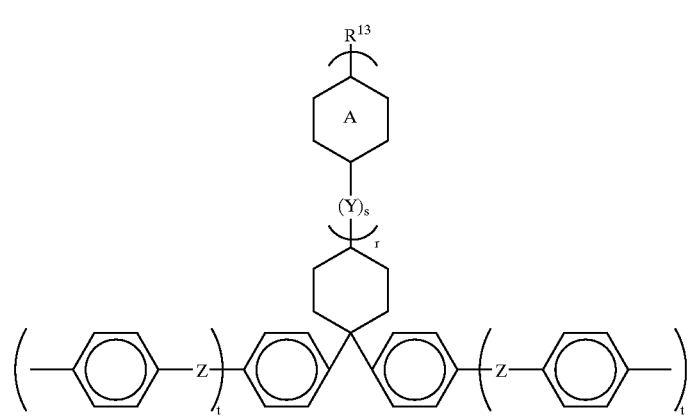
(5-2)
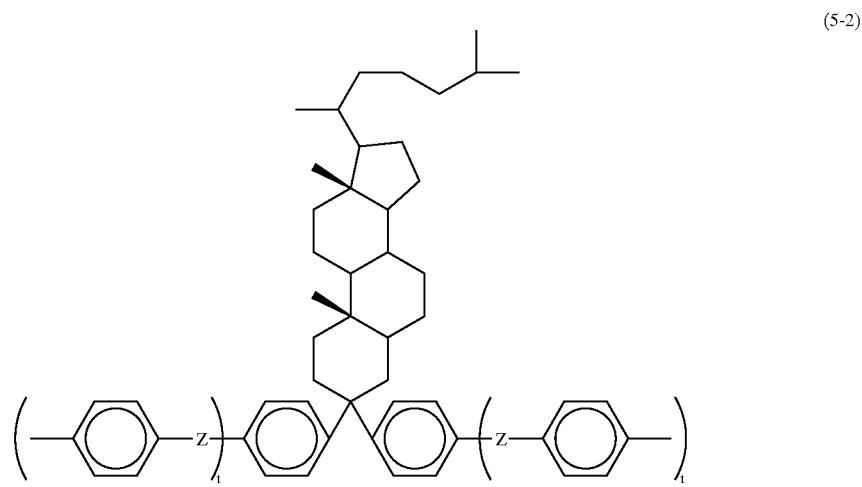
(5-3)
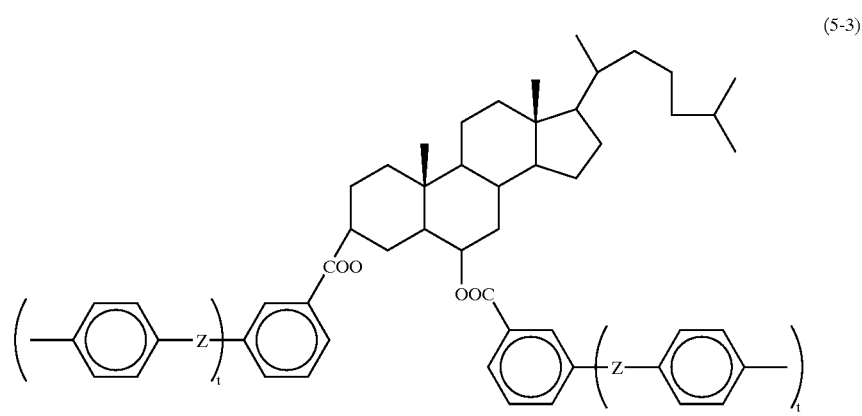
(5-4)
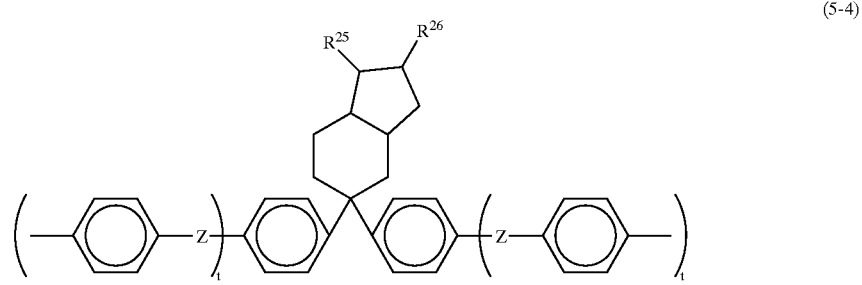

-continued

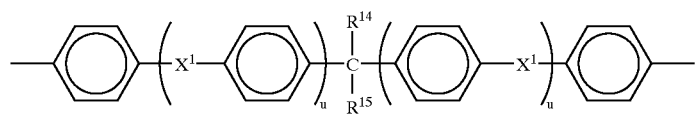
(6)

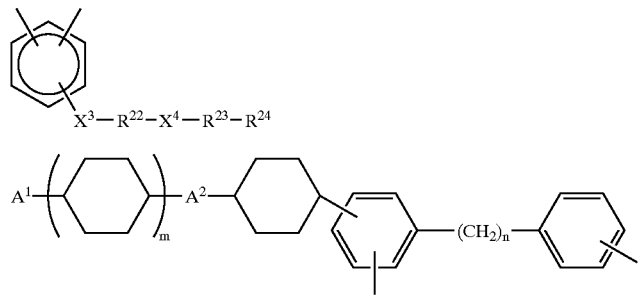
(7)

(8)

wherein $R^{13}$, $R^{25}$ and $R^{26}$ each independently represent hydrogen or an alkyl group of 1 to 12 carbon atoms; Y represents a single bond or $CH_2$; ring A represents a benzene ring or a cyclohexane ring; Z represents a single bond, $CH_2$, $CH_2CH_2$, or oxygen; r is a positive number of 0 to 3; s is a positive number of 0 to 5; t is a positive number of 0 to 3, provided that when t is 2 to 3, each Z may be the same or different from each other, and further provided that hydrogen on any benzene or cyclohexane ring may be replaced by a lower alkyl group; $X^1$ represents a single bond, $CH_2$, $CH_2CH_2$ or oxygen; $R^{14}$ and $R^{15}$ each independently represent hydrogen, an alkyl group or a perfluoroalkyl group of 1 to 12 carbon atoms, in which at least one of them represents an alkyl group or a perfluoroalkyl group of not less than 3 carbon atoms; u is 0 to 3, provided that when u is 2 to 3, each $X^1$ may be the same or different from each other, and further, provided that hydrogen on any benzene ring may be replaced by a lower alkyl group; $X^3$ and $X^4$ each independently represent a single bond, O COO, OCO, NH, CONH, or $(CH_2)_n$; $R^{22}$ and $R^{23}$ each independently represent a single bond, a group of 1 to 3 rings having an aromatic ring or/and an alicyclic ring or a steroid group, provided that when $R^{22}$ or/and $R^{23}$ have 2 or 3 rings, these rings may be bonded with $X^3$ and $X^4$; $R^{24}$ represents hydrogen, fluorine, hydrocarbon group, fluorinated hydrocarbon group, an alkoxy group, a cyano group or OH group; $A^1$ is hydrogen or a straight- or branched-chain alkyl group of 1 to 12 carbon atoms in which one methylene or any non-adjacent methylene may be replaced by oxygen; $A^2$ is a single bond or an alkylene group of 1 to 5 carbon atoms in which one methylene or any non-adjacent methylene may be replaced by oxygen; m is 0 to 3; and n is 1 to 5; the steroid skeleton in formulas (5-2) and (5-3) may be the one wherein any ring is reduced, enlarged or cleaved, the one wherein it contains a three-membered ring, the one wherein an unsaturated bond in any position is increased or decreased, or the one wherein hydrogen or an alkyl group in any position may be replaced by any monovalent organic group; and b) 99 to 0 mole % of at least one of divalent organic radicals represented by the following formula (4), based on the total amount of the divalent organic radical $R^4$, and $R^5$ and $R^6$ contain at least one of monovalent organic radicals selected from a lower alkyl group, phenyl, benzyl, cyclohexyl, cyclohexylmethyl, naphthyl, or 9-anthrylmethyl, the percentage of the substitution of which is not less than 80%:

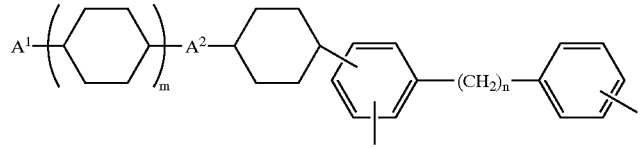
(4)

wherein X represents a single bond, $CH_2$, $CH_2CH_2$, $CH_2CH_2CH_2$, $CH_2CH_2CH_2CH_2$ or $C(CH_3)_2$; $R^9$ and $R^{10}$ each independently represent hydrogen or a lower alkyl group; a and b are individually 1 to 2; and o is 0 to 3, provided that when o is 2 to 3, each X may be the same or different from each other.

10. The varnish composition of any one of claims 1, 2 or 3 wherein $R^3$ in formula (3) contains as a main component a divalent organic radical derived from aromatic or/and alicyclic or/and aliphatic dicarboxylic acids, $R^4$ contains as a main component a divalent organic radical derived from aromatic or/and alicyclic or/and aliphatic diamines, $R^5$ and $R^6$ represent a monovalent organic radical or hydrogen in which a percentage of the substitution of the monovalent organic radical is not less than 50%, the organic radical may be plural species, and at least one of $R^3$, $R^4$, $R^5$, or $R^6$ is a radical having a side chain group of not less than 3 carbon atoms, and n is a natural number.

11. The varnish composition of claim 10 wherein $R^4$ in formula (3) is a diamine radical having a side chain group of not less than 3 carbon atoms, the content of which is 1 to 100 mole % based on the total amount of the diamine radicals $R^4$, and $R^5$ and $R^6$ represent the monovalent organic radical, the percentage of the substitution of which is not less than 70%.

12. The varnish composition of any one of claims 1, 2 or 3 wherein:

$R^{1'}$ in formula (2) contains as an essential component a tetravalent organic radical derived from pyromellitic acid or/and a cyclobutanetetracarboxylic acid, and $R^{2'}$ contains:

a) 1 to 100 mole % of at least one divalent organic radical represented by the following formulas (5-1) to (5-4), (6), (7), or (8):

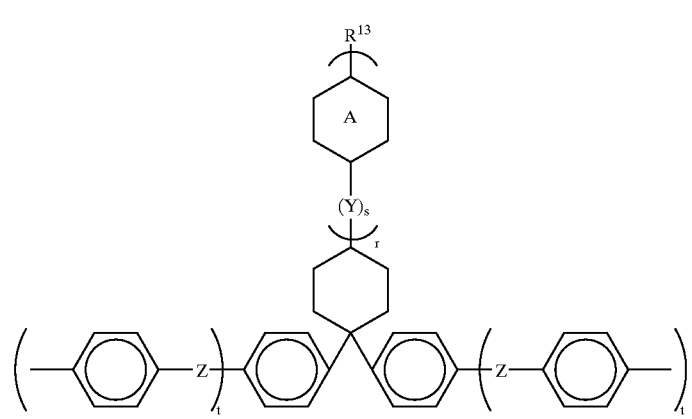
(5-1)
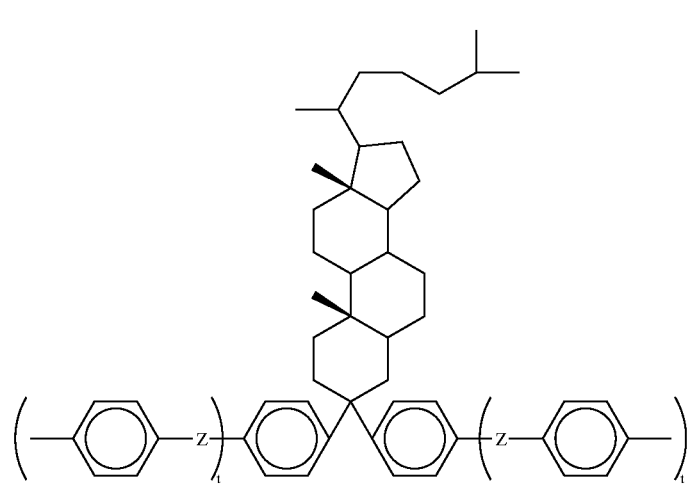
(5-2)
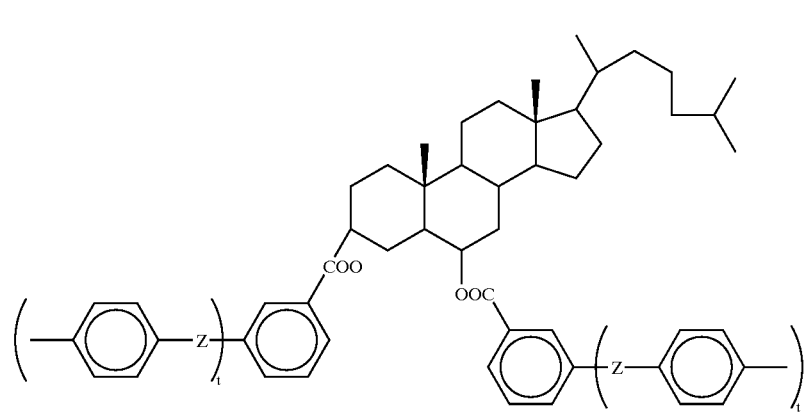
(5-3)
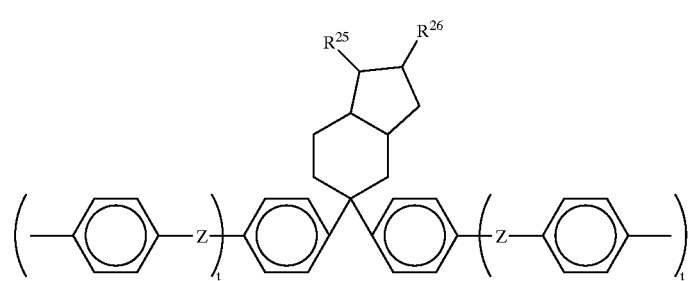
(5-4)

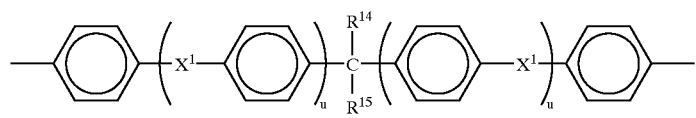

(6)

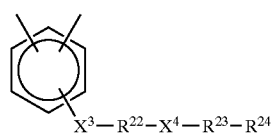

(7)

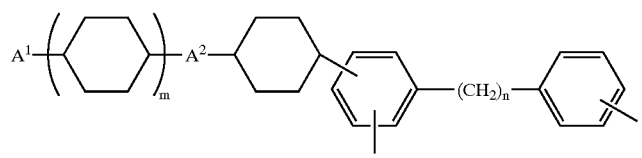

(8)

wherein $R^{13}$, $R^{25}$ and $R^{26}$ each independently represent hydrogen or an alkyl group of 1 to 12 carbon atoms; Y represents a single bond or $CH_2$; ring A represents a benzene ring or a cyclohexane ring; Z represents a single bond, $CH_2$, $CH_2CH_2$, or oxygen; r is a positive number of 0 to 3; s is a positive number of 0 to 5; t is a positive number of 0 to 3, provided that when t is 2 to 3, each Z may be the same or different from each other, and further provided that hydrogen on any benzene or cyclohexane ring may be replaced by a lower alkyl group; $X^1$ represents a single bond, $CH_2$, $CH_2CH_2$, or oxygen; $R^{14}$ and $R^{15}$ each independently represent hydrogen, an alkyl group or a perfluoroalkyl group of 1 to 12 carbon atoms, at least one of them represents an alkyl group or a perfluoroalkyl group of not less than 3 carbon atoms; u is 0 to 3, provided that when u is 2 to 3, each $X^1$ may be the same or different from each other, and further provided that hydrogen on any benzene ring may be replaced by a lower alkyl group; $X^3$ and $X^4$ each independently represent a single bond, O, COO, OCO, NH, CONH, or $(CH_2)_n$; $R^{22}$ and $R^{23}$ each independently represent a single bond, a group of 1 to 3 rings having an aromatic ring or/and an alicyclic ring or a steroid group, provided that when $R^{22}$ or/and $R^{23}$ have 2 or 3 rings, these rings may be bonded with $X^3$ and $X^4$; $R^{24}$ represents hydrogen, fluorine, hydrocarbon group, fluorinated hydrocarbon group, an alkoxy group, a cyano group or OH group; $A^1$ is hydrogen or a straight or branched-chain alkyl group of 1 to 12 carbon atoms in which one methylene or any non-adjacent methylene may be replaced by oxygen; $A^2$ is a single bond or an alkylene group of 1 to 5 carbon atoms in which one methylene or any non-adjacent methylene may be replaced by oxygen; m is 0 to 3; and n is 1 to 5; the steroid skeleton in formulas (5-2) and (5-3) may be the one wherein any ring is reduced, enlarged or cleaved, the one wherein it contains a three-membered ring, the one wherein an unsaturated bond in any position is increased or decreased, or the one wherein hydrogen or an alkyl group in any position may be replaced by any monovalent organic group; and b) 99 to 0 mole % of at least one of divalent organic radicals represented by the following formula (4), based on the total amount of the divalent organic radical $R^{2'}$:

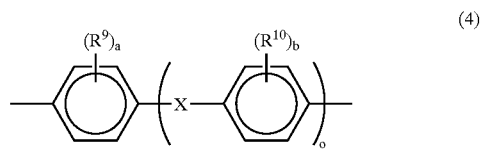

(4)

wherein X represents a single bond, $CH_2$, $CH_2CH_2$, $CH_2CH_2CH_2$, $CH_2CH_2CH_2CH_2$, or $C(CH_3)_2$; $R^9$ and $R^{10}$ each independently represent hydrogen or a lower alkyl group; a and b are 1 to 2 respectively; and o is 0 to 3, provided that when o is 2 to 3, each X may be the same or different from each other.

13. A varnish composition for a liquid crystal aligning film defined in any one of claims 1, 2 or 3.

14. A liquid crystal display element using a varnish composition defined in claim 13.

15. A liquid crystal display element wherein a liquid crystal composition containing at least one of liquid crystalline compounds represented by formulas (9), (10) and (11) is applied to the liquid crystal display element defined in claim 14:

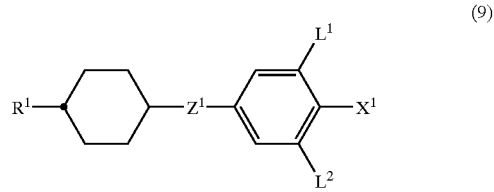

(9)

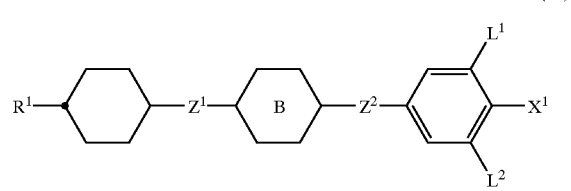

(10)

-continued

(11)
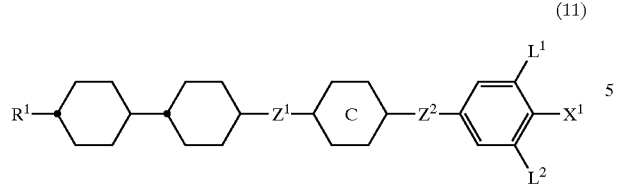

(14)
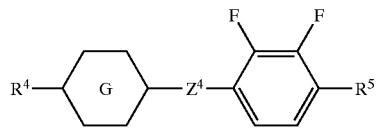

(15)

(16)
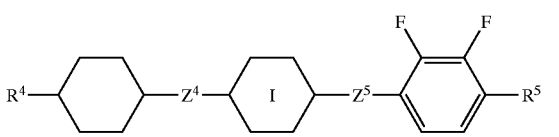
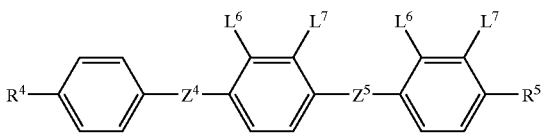

wherein $R^1$ represents an alkyl group of 1–10 carbon atoms in which any non-adjacent methylene may be replaced by —O— or —CH=CH— in which any hydrogen may be replaced by fluorine; $X^1$ represents fluorine, chlorine, —OCF$_3$, —OCF$_2$H, —CF$_3$, —CF$_2$H, —CFH$_2$, —OCF$_2$CF$_2$H, or —OCF$_2$CFHCF$_3$; $L^1$ and $L^2$ each independently represent hydrogen or fluorine; $Z^1$ and $Z^2$ each independently represent 1,2-ethylene, 1,4-butylene, —COO—, —CF$_2$O—, —OCF$_2$—, —CH=CH—, or a single bond; ring B represents trans-1,4-cyclohexylene, 1,3-dioxane-2,5-diyl or 1,4-phenylene in which hydrogen may be replaced by fluorine; ring C represents trans-1,4-cyclohexylene or 1,4-phenylene in which hydrogen may be replaced by flourine.

16. A liquid crystal display element wherein a liquid crystal composition containing at least one of liquid crystalline compounds represented by formulas (12) and (13) is applied to the liquid crystal display element defined in claim 14:

wherein $R^4$ and $R^5$ each independently represent an alkyl group of 1 to 10 carbon atoms in which any non-adjacent methylene may be replaced by —O— or —CH=CH— and any hydrogen may be replaced by fluorine; rings G and I each independently represent trans-1,4-cyclohexylene or 1,4-phenylene; $L^6$ and $L^7$ each independently represent hydrogen or fluorine, but does not represent hydrogen at the same time; $Z^4$ and $Z^5$ each independently represent 1,2-ethylene, —COO— or a single bond.

18. A liquid crystal display element wherein a liquid crystal composition containing as a first component at least one of liquid crystalline compounds represented by formulas (9), (10) and (11):

(9)
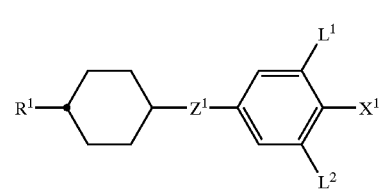

(12)
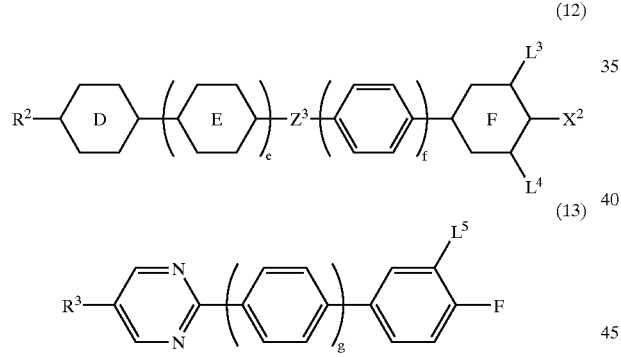

(10)
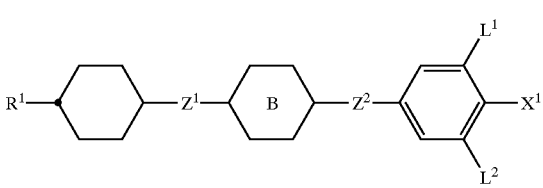

(13)

wherein $R^2$ and $R^3$ each independently represent an alkyl group of 1 to 10 carbon atoms in which any non-adjacent methylene may be replaced by —O— or —CH=CH— in which any hydrogen may be replaced by fluorine; $X^2$ represents —CN or —C≡C—CN; ring D represents trans-1,4-cyclohexylene, 1,4-phenylene, 1,3-dioxane-2,5-diyl, or pyrimidine-2,5-diyl; ring E represents trans-1,4cyclohexylene, pyrimidine-2,5-diyl or 1,4-phenylene in which hydrogen may be replaced by fluorine; ring F represents tran-1,4-cyclohexylene or 1,4-phenylene, $Z^3$ represents 1,2-ethylene, —COO— or a single bond; $L^3$, $L^4$ and $L^5$ each independently represent hydrogen or fluorine; e, f and g each independently represent 0 or 1.

17. A liquid crystal display element wherein a liquid crystal composition containing at least one of liquid crystalline compounds represented by formulas (14), (15) and (16) is applied to the liquid crystal display element defined in claim 14:

wherein $R^1$ represents an alkyl group of 1–10 carbon atoms in which any non-adjacent methylene may be replaced by —O— or —CH=CH— in which any hydrogen may be replaced by fluorine; $X^1$ represents fluorine, chlorine, —OCF$_3$, —OCF$_2$H, —CF$_3$, —CF$_2$H, —CFH$_2$, —OCF$_2$CF$_2$H, or —OCF$_2$CFHCF$_3$; $L^1$ and $L^2$ each independently represent hydrogen or fluorine; $Z^1$ and $Z^2$ each independently represent 1,2-ethylene, 1,4-butylene, —COO—, —CF$_2$O—, —OCF$_2$—, —CH=CH—, or a single bond; ring B represents trans-1,4-cyclohexylene, 1,3-dioxane-2,5-diyl or 1,4-phenylene in which hydrogen may be replaced by fluorine; ring C represents trans-1,4-cyclohexylene or 1,4-phenylene in which hydrogen may be replaced by fluorine; and as a second component at least one of liquid crystalline compounds represented by formulas (17), (18) and (19)

is applied to the liquid crystal display element defined claim 14:

$$R^6-\boxed{J}-Z^6-\boxed{K}-Z^7-R^7 \quad (17)$$

$$R^6-\boxed{J}-Z^6-\boxed{K}-Z^7-\boxed{M}-R^7 \quad (18)$$

$$R^6-\boxed{\phantom{x}}-\boxed{J}-Z^6-\boxed{K}-\boxed{M}-R^7 \quad (19)$$

wherein $R^6$ and $R^7$ each independently represent an alkyl group of 1 to 10 carbon atoms in which any non-adjacent methylene may be replaced by —O— or —CH=CH— and any hydrogen may be replaced by fluorine; ring J, ring K and ring M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH— or a single bond.

19. A liquid crystal display element wherein a liquid crystal composition containing as a first component at least one of liquid crystalline compounds represented by formulas (12) and (13):

$$R^2-\boxed{D}-(\boxed{E})_e-Z^3-(\boxed{\phantom{x}})_f-\boxed{F}\genfrac{}{}{0pt}{}{L^3}{L^4}-X^2 \quad (12)$$

$$R^3-\boxed{\begin{array}{c}N\\\phantom{x}\\N\end{array}}-(\boxed{\phantom{x}})_g-\boxed{\phantom{x}}\genfrac{}{}{0pt}{}{L^5}{F} \quad (13)$$

wherein $R^2$ and $R^3$ each independently represent an alkyl group of 1 to 10 carbon atoms in which any non-adjacent methylene may be replaced by —O— —CH=CH— in which any hydrogen may be replaced by fluorine; $X^2$ represents —CN or —C≡C—CN; ring D represents trans-1,4-cyclohexylene, 1,4-phenylene, 1,3-dioxane-2,5-diyl, or pyrimidine-2,5-diyl; ring E represents trans-1,4-cyclohexylene, pyrimidine-2,5-diyl or 1,4-phenylene in which hydrogen may be replaced by fluorine; ring F represents tran-1,4-cyclohexylene or 1,4-phenylene, $Z^3$ represents 1,2-ethylene, —COO— or a single bond; $L^3$, $L^4$ and $L^5$ each independently represent hydrogen or fluorine; e, f and g each independently represent 0 or 1; and as a second component at least one of liquid crystalline compounds represented by formulas (17), (18) and (19):

$$R^6-\boxed{J}-Z^6-\boxed{K}-Z^7-R^7 \quad (17)$$

$$R^6-\boxed{J}-Z^6-\boxed{K}-Z^7-\boxed{M}-R^7 \quad (18)$$

$$R^6-\boxed{\phantom{x}}-\boxed{J}-Z^6-\boxed{K}-\boxed{M}-R^7 \quad (19)$$

wherein $R^6$ and $R^7$ each independently represent an alkyl group of 1 to 10 carbon atoms in which any non-adjacent methylene may be replaced by —O— or —CH=CH— and any hydrogen may be replaced by fluorine; ring J, ring K and ring M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH— or a single bond;

is applied to the liquid crystal display element defined in claim 14.

20. A liquid crystal display element wherein a liquid crystal composition containing as a first component at least one of liquid crystalline compounds represented by formulas (14), (15) and (16):

$$R^4-\boxed{G}-Z^4-\boxed{\phantom{x}}\genfrac{}{}{0pt}{}{F\ F}{\phantom{x}}-R^5 \quad (14)$$

$$R^4-\boxed{\phantom{x}}-Z^4-\boxed{I}-Z^5-\boxed{\phantom{x}}\genfrac{}{}{0pt}{}{F\ F}{\phantom{x}}-R^5 \quad (15)$$

$$R^4-\boxed{\phantom{x}}-Z^4-\boxed{\phantom{x}}\genfrac{}{}{0pt}{}{L^6\ L^7}{\phantom{x}}-Z^5-\boxed{\phantom{x}}\genfrac{}{}{0pt}{}{L^6\ L^7}{\phantom{x}}-R^5 \quad (16)$$

wherein $R^4$ and $R^5$ each independently represent an alkyl group of 1 to 10 carbon atoms in which any non-adjacent methylene may be replaced by —O— or —CH=CH— and any hydrogen may be replaced by fluorine; rings G and I each independently represent trans-1,4-cyclohexylene or 1,4-phenylene; $L^6$ and $L^7$ each independently represent hydrogen or fluorine, but does not represent hydrogen at the same time; $Z^4$ and $Z^5$ each independently represent 1,2-ethylene, —COO— or a single bond; and as a second component at least one of liquid crystalline compounds represented by formulas (17), (18) and (19):

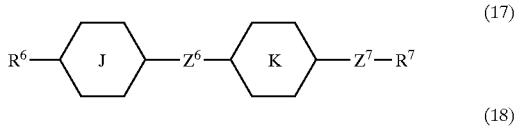

(17)

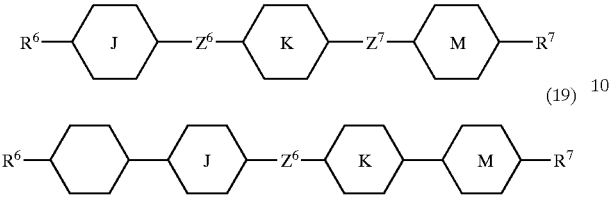

(18)

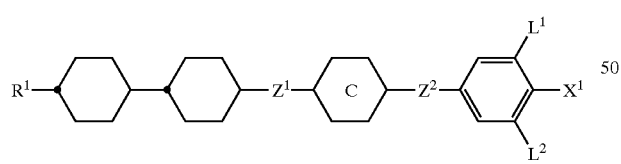

(19)

wherein $R^6$ and $R^7$ each independently represent an alkyl group of 1 to 10 carbon atoms in which any non-adjacent methylene may be replaced by —O— or —CH=CH— and any hydrogen may be replaced by fluorine; ring J, ring K and ring M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH— or a single bond;

is applied to the liquid crystal display element defined in claim 14.

21. A liquid crystal display element wherein a liquid crystal composition containing as a first component at least one of liquid crystalline compounds represented by formulas (9), (10) and (11):

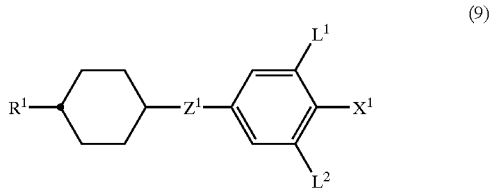

(9)

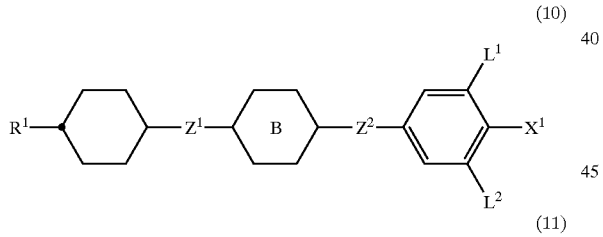

(10)

(11)

wherein $R^1$ represents an alkyl group of 1–10 carbon atoms in which any non-adjacent methylene may be replaced by —O— or —CH=CH— in which any hydrogen may be replaced by fluorine; $X^1$ represents fluorine, chlorine, —OCF$_3$, —OCF$_2$H, —CF$_3$, —CF$_2$H, —CFH$_2$, —OCF$_2$CF$_2$H, or —OCF$_2$CFHCF$_3$; $L^1$ and $L^2$ each independently represent hydrogen or fluorine; $Z^1$ and $Z^2$ each independently represent 1,2-ethylene, 1,4-butylene, —COO—, —CF$_2$O—, —OCF$_2$—, —CH=CH—, or a single bond; ring B represents trans-1,4-cyclohexylene, 1,3-dioxane-2,5-diyl or 1,4-phenylene in which hydrogen may be replaced by fluorine; ring C represents trans-1,4-cyclohexylene or 1,4-phenylene in which hydrogen may be replaced by fluorine;

as a second component at least one of liquid crystalline compounds represented by formulas (12) and (13):

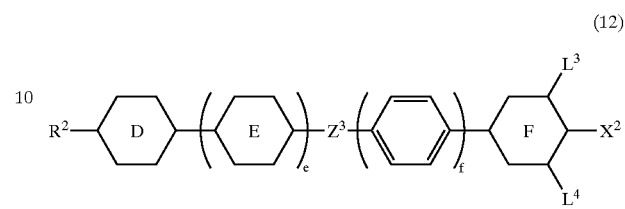

(12)

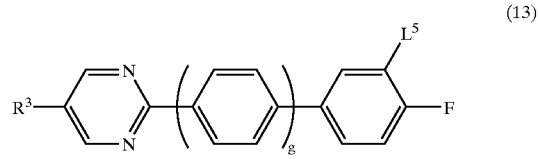

(13)

wherein $R^2$ and $R^3$ each independently represent an alkyl group of 1 to 10 carbon atoms in which any non-adjacent methylene may be replaced by —O— or —CH=CH— in which any hydrogen may be replaced by fluorine; $X^2$ represents —CN or —C≡C—CN; ring D represents trans-1,4-cyclohexylene, 1,4-phenylene, 1,3-dioxane-2,5-diyl, or pyrimidine-2,5-diyl; ring E represents trans-1,4-cyclohexylene, pyrimidine-2,5-diyl or 1,4phenylene in which hydrogen may be replaced by fluorine; ring F represents tran-1,4-cyclohexylene or 1,4-phenylene, $Z^3$ represents 1,2-ethylene, —COO— or a single bond; $L^3$, $L^4$ and $L^5$ each independently represent hydrogen or fluorine; e, f and g each independently represent 0 or 1; and as a third component at least one of liquid crystalline compounds represented by formulas (17), (18) and (19):

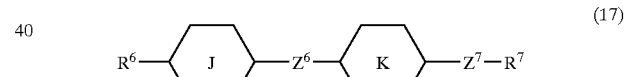

(17)

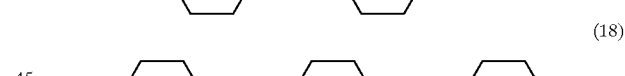

(18)

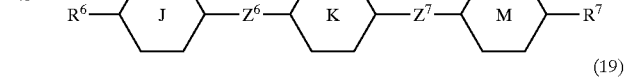

(19)

wherein $R^6$ and $R^7$ each independently represent an alkyl group of 1 to 10 carbon atoms in which any non-adjacent methylene may be replaced by —O— or —CH=CH— and any hydrogen may be replaced by fluorine; ring J, ring K and ring M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH— or a single bond;

is applied to the liquid crystal display element defined in claim 14.

* * * * *